United States Patent
Jha et al.

(10) Patent No.: US 11,490,282 B2
(45) Date of Patent: Nov. 1, 2022

(54) METHOD AND APPARATUS FOR ACCESSING NEW RADIO (NR) SERVICE IN MULTI-RAT DUAL CONNECTIVITY (DC)

(71) Applicant: SAMSUNG ELECTRONICS CO., LTD., Suwon-si (KR)

(72) Inventors: Kailash Kumar Jha, Karnataka (IN); Nitesh Pushpak Shah, Karnataka (IN); Alok Kumar Jangid, Karnataka (IN); Nishant Nishant, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 16/924,829

(22) Filed: Jul. 9, 2020

(65) Prior Publication Data

US 2021/0044993 A1 Feb. 11, 2021

(30) Foreign Application Priority Data

Jul. 9, 2019 (IN) .............................. 201941027480

(51) Int. Cl.
*H04W 24/10* (2009.01)
*H04W 76/15* (2018.01)
(Continued)

(52) U.S. Cl.
CPC ....... *H04W 24/10* (2013.01); *H04W 36/0069* (2018.08); *H04W 36/0083* (2013.01); *H04W 36/30* (2013.01); *H04W 76/15* (2018.02)

(58) Field of Classification Search
CPC . H04W 24/10; H04W 76/15; H04W 36/0069; H04W 36/0083; H04W 36/30; H04W 76/27
See application file for complete search history.

(56) References Cited

U.S. PATENT DOCUMENTS 10,129,801 B2 11/2018 Wang et al.
2018/0124784 A1 5/2018 Kumar et al.
(Continued)

FOREIGN PATENT DOCUMENTS

WO 2014169841 A1 10/2014
WO 2018/151642 A1 8/2018

OTHER PUBLICATIONS

3GPP TS 38.331 V15.6.0, "3rd Generation Partnership Project; Technical Specification Group Radio Access Network; NR; Radio Resource Control (RRC) protocol specification (Release 15)," Jun. 2019, total 521 pages.

(Continued)

*Primary Examiner* — Shukri Taha
(74) *Attorney, Agent, or Firm* — Sughrue Mion, PLLC

(57) ABSTRACT

Provided is a methods and apparatus for accessing New Radio (NR) services in a multi-RAT dual connectivity (DC). A method includes: selecting an anchor band cell as a primary cell for a User Equipment (UE) to access NR services in an Evolved UMTS Terrestrial Radio Access Network (E-UTRAN)-NR dual connectivity (ENDC). The method also includes prioritizing anchor band cells for the UE to perform cell search or cell reselection in the ENDC scenario. The method further includes selecting an NR DC band cell as the primary cell for the UE to access NR DC services in an NR DC. The method further includes prioritizing the NR DC band cells for the UE to perform cell search or cell reselection in the NR DC scenario, when the UE is an RRC idle state.

14 Claims, 32 Drawing Sheets

(51) Int. Cl.
*H04W 36/00* (2009.01)
*H04W 36/30* (2009.01)

(56) References Cited

U.S. PATENT DOCUMENTS

| | | |
|---|---|---|
| 2018/0152944 A1 | 5/2018 | Kumar et al. |
| 2019/0104453 A1 | 4/2019 | Dhanapal et al. |
| 2019/0190686 A1 | 6/2019 | Ye et al. |
| 2019/0373523 A1 | 12/2019 | Panchal et al. |
| 2020/0337054 A1* | 10/2020 | Kwok .................. H04W 76/27 |

OTHER PUBLICATIONS

Huawei et al., "CR on 37.340 for s-Measure in NR-DC," R2-1907516, 3GPP TSG-RAN WG2 #106, May 2019, total 6 pages.
Communication dated Oct. 15, 2020, issued by the International Searching Authority in counterpart International Application No. PCT/KR2020/009006 (PCT/ISA/220, 210, 237).

* cited by examiner

FIG. 17A

|  | Index | E-UTRAN DL ARFCN | Cell id | Band | Anchor |
|---|---|---|---|---|---|
| eNB1 | 1 | 3000 | 1 | Band7 | No |
| eNB2 | 2 | 5179 | 2 | Band12 | No |
| eNB3 | 3 | 300 | 3 | Band1 | Yes |
| eNB4 | 4 | 1400 | 4 | Band3 | Yes |

FIG. 17B

|  | Index | E-UTRAN DL ARFCN | Cell id | Band | Anchor |
|---|---|---|---|---|---|
| eNB3 | 1 | 300 | 3 | Band1 | Yes |
| eNB4 | 2 | 1400 | 4 | Band13 | Yes |
| eNB1 | 3 | 3000 | 1 | Band7 | No |
| eNB2 | 4 | 5179 | 2 | Band12 | No |

FIG. 18

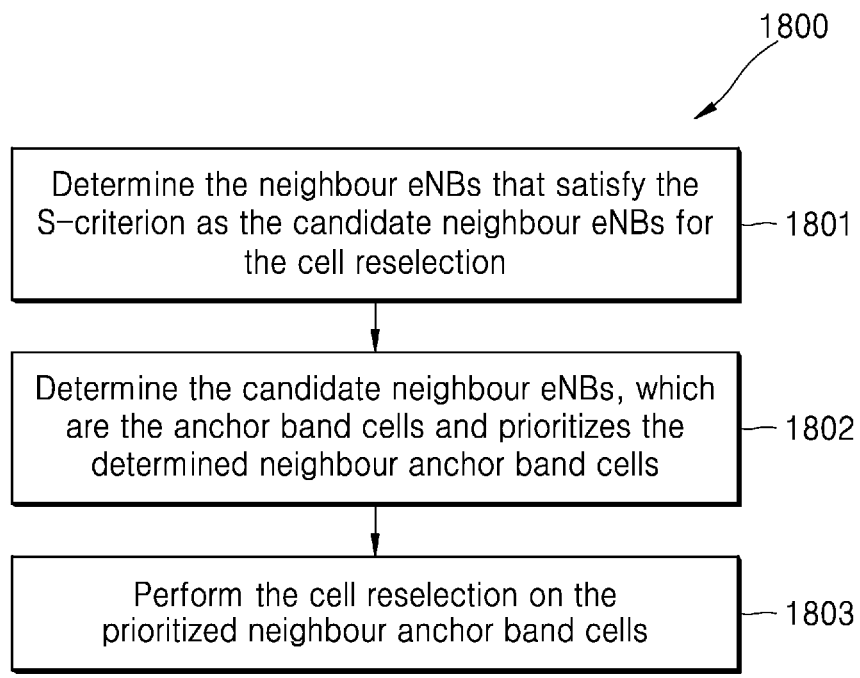

Determine the neighbour eNBs that satisfy the S-criterion as the candidate neighbour eNBs for the cell reselection — 1801

Determine the candidate neighbour eNBs, which are the anchor band cells and prioritizes the determined neighbour anchor band cells — 1802

Perform the cell reselection on the prioritized neighbour anchor band cells — 1803

FIG. 19A

|  | Rank | E-UTRAN DL ARFCN | Cell id | Band | Anchor |
|---|---|---|---|---|---|
| eNB1 | 1 | 3000 | 1 | Band7 | No |
| eNB2 | 2 | 5179 | 2 | Band12 | No |
| eNB3 | 3 | 300 | 3 | Band1 | Yes |
| eNB4 | 4 | 1400 | 4 | Band3 | Yes |

FIG. 19B

|  | Rank | E-UTRAN DL ARFCN | Cell id | Band | Anchor |
|---|---|---|---|---|---|
| eNB3 | 1 | 300 | 3 | Band1 | Yes |
| eNB4 | 2 | 1400 | 4 | Band13 | Yes |
| eNB1 | 3 | 3000 | 1 | Band7 | No |
| eNB2 | 4 | 5179 | 2 | Band12 | No |

METHOD AND APPARATUS FOR ACCESSING NEW RADIO (NR) SERVICE IN MULTI-RAT DUAL CONNECTIVITY (DC)

CROSS REFERENCE TO THE RELATED APPLICATION

This application is based on and claims priority from Indian Provisional Application 201941027480 as filed on Jul. 9, 2019, and Complete Specification for the provisionally filed application number 201941027480 has been filed with the Indian Patent Office on Jun. 29, 2020, the contents of which are incorporated herein by reference.

BACKGROUND

1. Field

Apparatuses and methods of example embodiments of the inventive concept relate to wireless networks, and more particularly, to accessing New Radio (NR) services in multiple-Radio Access Technology (multi-RAT) dual connectivity.

2. Description of the Related Art

To meet demand for wireless data traffic having increased since deployment of $4^{th}$ generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G systems, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. Such an IoT environment may provide intelligent Internet technology services that create a new value to a human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with the foregoing technologies, various attempts have been made to apply 5G communication systems to IoT networks. For example, technologies such as sensor network, machine-type communication (MTC), and machine-to-machine (M2M) communication may be implemented by beamforming, MIMO, and array antennas. Application of a cloud RAN as the above-described big data processing technology may also be considered to be as an example of convergence between the 5G technology and the IoT technology.

SUMMARY

According to an embodiment, there is provided a method for accessing at least one New Radio (NR) service by a user equipment (UE) in a communication network supporting multiple-Radio Access Technology (multi-RAT) dual connectivity (DC). The method may include: determining whether a serving cell is an anchor band cell or a non-anchor band cell; determining whether at least one secondary cell for the DC is the anchor band cell or the non-anchor band cell when the serving cell is the non-anchor band cell; reporting at least one event to the serving cell to perform a handover of the UE to the secondary cell; and accessing the NR service by connecting with the secondary cell as a new serving cell.

The communication network may be one of an NR non-standalone (NSA) network supporting Evolved UMTS Terrestrial Radio Access Network (E-UTRAN)-NR DC (ENDC) and an NR standalone network supporting NR DC.

The serving cell is a primary cell (PCell) in view of the secondary cell (SCell), when a Carrier Aggregation (CA) mode is enabled in the UE, wherein the serving cell is the PCell and the secondary cell is at least one neighbor anchor band cell, when the CA mode is disabled in the UE.

In the embodiment, when the communication network is the NR NSA network, the anchor band cell is an ENDC anchor band cell, and when the communication network is the NR standalone network, the anchor band cell is an NR DC band cell.

In the embodiment, the determining whether the secondary cell is the anchor band cell or the non-anchor band cell may include: receiving configurations of a plurality of neighbor cells from the serving cell; and determining at least one neighbor anchor band cell and/or at least one neighbor non-anchor band cell from the neighbor cells using the received configurations, wherein the secondary cell is one of the neighbor anchor band cell.

In the embodiment, the reporting the event to the serving cell to perform the handover of the UE to the secondary cell may include: performing a measurement operation on at least one factor of the serving cell and the secondary cell to obtain measured values of the serving cell and the secondary cell after determining the secondary cell is the anchor band cell, wherein the factor comprises at least one of a Reference Signals Received Power (RSRP) and a Reference Signals Received Quality (RSRQ); comparing a difference between a measured value of the serving cell and a measured value of the secondary cell with a measurement threshold; performing one of: preparing a measurement report comprising the measured value of the serving cell and the measured value of the secondary cell for an event A2, based on the difference being greater than the measurement threshold;

and preparing a modified measurement report by decreasing the measured value of the serving cell and increasing the measured value of the secondary cell for the event A2 based on the difference being less than or equal to the measurement threshold; and sending the measurement report or the modified measurement report for the event A2 to the serving cell to perform the handover of the UE to the secondary cell.

In the embodiment, the method may further include: receiving a handover command to the secondary cell from the serving cell when the serving cell and the secondary cell are swapped based on the measurement report or the modified measurement report; and initiating the handover to the secondary cell as the new serving cell, wherein the secondary cell supports at least one NR cell.

In the embodiment, the reporting the event to the serving cell to perform the handover of the UE to the secondary cell may further include: performing a measurement operation on at least one factor of at least one neighbor anchor band cell to obtain a measured value of the neighbor anchor band cell; preparing a measurement report comprising the measured value of only the neighbor anchor band cell, among the neighbor anchor band cell and at least one neighbor non-anchor band cell, for events A3 and/or A5; and sending the measurement report to the serving cell to perform the handover of the UE to the neighbor anchor band cell, wherein the secondary cell is one of the neighbor anchor band cell.

In the embodiment, the method may further include: receiving a handover command to handover to the neighbor anchor band cell from the serving cell when the serving cell determines the neighbor anchor band cell as the new serving cell for the UE based on the received measurement report; and initiating the handover to the neighbor anchor band cell, wherein the neighbor anchor band cell supports at least one NR cell.

In the embodiment, the preparing the measurement report and the sending the measurement report to the serving cell may include one of: delaying preparing and sending the measurement report to the serving cell, when a measured value of at least one neighbor non-anchor band cell satisfies the events A3 and/or A5; and decreasing the measured value of the neighbor non-anchor band cell compared to a measured value of the neighbor anchor band cell, and sending the measurement report including the measured value of the neighbor anchor band cell and the decreased measured value of the neighbor non-anchor band cell to the serving cell, when the measured value of the neighbor non-anchor band cell satisfies the events A3 and/or A5.

In the embodiment, the method may further include: determining, by the UE, whether the serving is the anchor band cell, when the UE wants to access at least one communication service other than the NR service in the CA mode, determining, by the UE, the secondary that is the non-anchor band cell, if the serving cell is the anchor band cell, reporting, by the UE, the measurement report for the event A2 to the serving cell to perform the handover of the UE to the secondary cell, wherein the measurement report includes a measured value of the serving cell and a measured value of the secondary cell, and accessing, by the UE, the communication service other than the NR service by connecting with the secondary cell that is the non-anchor band cell.

In the embodiment, the method may further include: checking a plurality of cells for a cell selection when the UE is in a Radio Resource Control (RRC) idle state, identifying at least one anchor band cell from the cells, and prioritizing selection of the anchor band cell.

In the embodiment, the prioritizing selection of the anchor band cell may include: determining if the cells satisfy a cell selection criterion (S-Criterion), wherein the cells include one of a plurality of eNodeBs (eNBs) and a plurality of gNodeBs (gNBs), determining the anchor band cell from the cells that satisfy the S-Criterion, and prioritizing the anchor band cell by assigning a higher rank to the anchor band cell compared to other cells.

In the embodiment, the method may further include: performing, by the UE in the NR NSA network supporting the ENDC, a forced Radio Resource Reestablishment (RRE) by camping onto a previous secondary cell, when the serving cell is the non-anchor band cell and the previous secondary cell is the anchor band cell with which the UE is connected in at least one previous session; and connecting with the previous secondary that is the anchor band cell for accessing the NR service, on performing the forced RRE.

According to an embodiment, there is provided a method for accessing at least one NR service in a communication network supporting NR DC. The method may include: connecting, by a UE, with a Master Cell Group (MCG) and a Secondary Cell Group (SCG) combination in a Carrier Aggregation (CA) mode, determining, by the UE, if the connected MCG and the SCG combination is a stable NR DC combination, determining, by the UE, a stable cell from the MCG and the SCG using at least one heuristic learning model, if the connected MCG and the SCG combination is an unstable NR DC combination, preparing, by the UE, a measurement report including a measured value of the stable cell, sending, by the UE, the measurement report to the MCG for an events A3 and/or A5, receiving, by the UE, a handover command to at least one gNB supported by the stable cell, when the MCG switches the gNB supported by the stable cell as a new MCG for the UE based on the received measurement report of the UE, and connecting, by the UE, with the gNB supported by the stable cell as the new MCG and the stable cell as the SCG for accessing the NR service.

In the embodiment, the determining, by the UE, if the MCG and the SCG combination is the stable NR DC combination, may include: determining the MCG and SCG combination is the stable NR DC combination, if the MCG and SCG support a same frequency range, and determining the MCG and SCG combination is an unstable NR DC combination, if the MCG and SCG support different frequency ranges.

According to an embodiment, there is provided a method for handling connectivity of an ENDC capable Fifth Generation (5G) UE. The method may include: detecting that the UE is connected to a first cell as a Primary Cell (PCell) and a second cell as a Secondary Cell (SCell), determining that the first cell supports a non-anchor band and the second cell supports an anchor band, sending a measurement report to the first cell indicating the availability of the anchor band in the second cell, and switching to the second cell as the PCell and to the first cell as the SCell.

According to an embodiment, there is provided a method for handling connectivity of a UE in a communication network supporting multi-RAT DC. The method may include: checking, by a serving cell, if the UE supports DC for adding a CA carrier component for the UE, wherein the DC includes one of ENDC and NR DC, performing, by the serving cell, a handover of the UE to a secondary cell by switching a secondary carrier component (SCC) to a primary carrier component (PCC) for the UE, if the serving cell is a non-anchor band cell, and adding, by the serving cell, the SCC for the UE to access at least one NR service.

In the embodiment, the method may further include: receiving, by the serving cell, a measurement report of at least one neighbor anchor band cell from the UE, when the serving cell is the non-anchor band cell and the UE is in a mobility state, checking, by the serving cell, if the UE supports the DC, after receiving the measurement report from the UE, and performing, by the serving cell, a handover of the UE to one of the neighbor anchor band cell, if the UE supports the DC.

According to an embodiment, there is provide a UE in a communication network supporting multi-RAT DC. The UE may include: a memory, a processor coupled to the memory, and configured to: determine if a serving cell is an anchor band cell, when the UE wants to access at least one New Radio (NR) service, determine whether at least one secondary cell for the DC is the anchor band cell or the non-anchor band cell, in response to the determination that the serving cell is the non-anchor band cell; report at least one event to the serving cell to perform a handover of the UE to the secondary cell; and enable the UE to access a New Radio (NR) service by connecting with the secondary cell as a new serving cell.

In the embodiment, the communication network is one of an NR non-standalone (NSA) network supporting the ENDC and a NR standalone network supporting NR DC.

In the embodiment, the serving cell is a primary cell (PCell) in view of the secondary cell (SCell) when the CA mode is enabled in the UE, and the serving cell is the PCell and the secondary cell is at least one neighbor anchor band cell when the CA mode is disabled in the UE.

In the embodiment, when the communication network is the NR NSA network, the anchor band cell is an ENDC anchor band cell, and when the communication network is the NR standalone network, the anchor band cell is an NR DC band cell.

In the embodiment, the processor may be further configured to determine that the secondary cell is the anchor band cell by: receiving configurations of a plurality of neighbor cells from the serving cell; and determining at least one neighbor anchor band cell and/or at least one neighbor non-anchor band cell from the neighbor cells using the received configurations, wherein the secondary cell is one of the neighbor anchor band cell.

In the embodiment, the processor may be further configured to report the at event to the serving cell to perform the handover of the UE to the secondary cell by: performing a measurement operation on at least one factor of the serving cell and the secondary cell to obtain measured values of the serving cell and the secondary cell after determining the secondary cell is the anchor band cell, wherein the factor comprises at least one of a Reference Signals Received Power (RSRP) and a Reference Signals Received Quality (RSRQ); comparing a difference between a measured value of the serving cell and a measured value of the secondary cell with a measurement threshold; performing one of: preparing a measurement report comprising the measured value of the serving cell and the measured value of the secondary cell for an event A2, based on the difference being greater than the measurement threshold; and preparing a modified measurement report by decreasing the measured value of the serving cell and increasing the measured value of the secondary cell for the event A2 based on the difference being less than or equal to the measurement threshold; and sending the measurement report or the modified measurement report for the event A2 to the serving cell to perform the handover of the UE to the secondary cell.

In the embodiment, the processor may be further configured to: receive a handover command to the secondary cell from the serving cell when the serving cell and the secondary cell are swapped based on the measurement report or the modified measurement report; and initiate the handover to the secondary cell as the new serving cell, wherein the secondary cell supports at least one NR cell.

In the embodiment, the processor may be further configured to report the event to the serving cell to perform the handover of the UE to the secondary cell by: performing a measurement operation on at least one factor of at least one neighbor anchor band cell to obtain a measured value of the neighbor anchor band cell; preparing a measurement report comprising the measured value of only the neighbor anchor band cell, among the neighbor anchor band cell and at least one neighbor non-anchor band cell, for events A3 and/or A5; and sending the measurement report to the serving cell to perform the handover of the UE to the neighbor anchor band cell, wherein the secondary cell is one of the neighbor anchor band cell.

In the embodiment, the processor may be further configured to: receive a handover command to handover to the neighbor anchor band cell from the serving cell when the serving cell determines the neighbor anchor band cell as the new serving cell for the UE based on the received measurement report; and initiate the handover to the neighbor anchor band cell, wherein the neighbor anchor band cell supports at least one NR cell.

In the embodiment, the processor may be configured to prepare and send the measurement report by performing one of: delaying preparing and sending the measurement report to the serving cell, when a measured value of at least one neighbor non-anchor band cell satisfies the events A3 and/or A5; and decreasing the measured value of the neighbor non-anchor band cell compared to a measured value of the neighbor anchor band cell, and sending the measurement report including the measured value of the neighbor anchor band cell and the decreased measured value of the neighbor non-anchor band cell to the serving cell, when the measured value of the neighbor non-anchor band cell satisfies the events A3 and/or A5.

In the embodiment, the processor may be further configured to: determine if the serving cell is the anchor band cell, when the UE wants to access at least one communication service other than the NR service in the CA mode, determine the secondary cell that is the non-anchor band cell, if the serving cell is the anchor band cell, report the measurement report for the event A2 to the serving cell to perform the handover of the UE to the secondary cell, wherein the measurement report includes a measured value of the serving cell and a measured value of the secondary cell, and access the at communication service other than the NR service by connecting with the secondary cell that is the non-anchor band cell.

In the embodiment, the processor may be further configured to: check a plurality of cells for a cell selection, when the UE is in a Radio Resource Control (RRC) idle state, identify at least one anchor band cell from the cells, and prioritize selection of the anchor band cell.

In the embodiment, the processor may be configured to prioritize the anchor band cell by: determining if the cells satisfy a cell selection criterion (S-Criterion), wherein the cells include one of a plurality of eNBs and a plurality of gNBs, determining the anchor band cell from the cells that satisfies the S-Criterion, and prioritizing the anchor band cell by assigning a higher rank to the anchor band cell compared to other cells.

In the embodiment, the processor may be further configured to: perform an RRE by enabling the UE to camp onto a previous secondary cell as a new serving cell in the NR NSA network, when the serving cell is the non-anchor band cell and the previous secondary cell is the anchor band cell with which the UE is connected in at least one previous session, and enable the UE to connect with the previous secondary cell that is the anchor band cell for accessing the at least one NR service, on performing the forced RRE.

According to an embodiment, there is provide a UE in a communication network supporting NR DC. The UE may include: a memory, and a processor coupled to the memory and configured to: enable the UE to connect with an MCG and an SCG in the CA mode, determine if the connected MCG and the SCG combination is a stable NR DC combination, determine a stable cell from the MCG and the SCG using at least one heuristic learning model, if the connected MCG and the SCG combination is an unstable NR DC combination, prepare a measurement report including a measured value of the stable cell, send the measurement report to the MCG for events A3 and/or A5, receive a handover command to at least one gNB supported by the stable cell, when the MCG switches the gNB supported by the stable cell as a new MCG for the UE based on the received measurement report of the UE, and connect with the gNB supported by the stable cell as the new MCG and the stable cell as the SCG for accessing at least one NR service.

In the embodiment, the processor may be further configured to: determine the MCG and SCG combination is the stable NR DC combination, if the MCG and SCG support a same frequency range, and determine the MCG and SCG combination is an unstable NR DC combination, if the MCG and SCG support different frequency ranges.

According to an embodiment, there is provided an ENDC capable 5G UE which may include: a memory, a processor coupled to the memory and configured to: detect that the UE is connected to a first cell as a Primary Cell (PCell) and a second cell as a Secondary Cell (SCell), determine that the first cell supports a non-anchor band and the second cell supports an anchor band, send a measurement report to the first cell indicating the availability of the anchor band in the second cell, and switch to the second cell as the PCell and to the first cell as the SCell.

According to an embodiment, there is provided a communication network supporting multi-RAT DC. The communication network may include: a plurality of UEs, and a plurality of cells, wherein a serving cell of the cells is configured to: check if a UE supports DC for adding a CA carrier component for the UE, wherein the DC includes one of ENDC and NR DC, perform a handover of the UE to a second cell by switching an SCC to a PCC for the UE, if the serving cell is a non-anchor band cell, and add the SCC for the UE to access at least one NR service.

In the embodiment, the serving cell may be further configured to: receive a measurement report of at least one neighbor anchor band cell from the UE, when the serving cell is the non-anchor band cell and the UE is in a mobility state, determine whether the UE supports the DC, after receiving the measurement report from the UE, and perform a handover of the UE to one of the neighbor anchor band cell, if the UE supports the DC.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the inventive concept without departing from the spirit thereof, and the example embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIGS. 17A and 17B are example tables depicting an order of prioritized ENDC anchor band cells for cell selection in an NR NSA network supporting ENDC, according to embodiments;

FIG. 18 is a flow diagram depicting a method for prioritizing ENDC anchor band cells for cell reselection in an NR NSA network supporting ENDC, according to embodiments;

FIGS. 19A and 19B are example tables depicting an order of prioritized ENDC anchor band cells for cell reselection in an NR NSA network supporting ENDC, according to embodiments;

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Dual connectivity exploits heterogeneous nature of communication networks, in which a user equipment (UE) can be connected to both a primary cell/node and a secondary cell/node simultaneously for accessing at least one service. The 3rd Generation Partnership Project (3GPP) proposed different modes of dual connectivity between Radio Access Technologies (RATs) namely: an Evolved UMTS Terrestrial Radio Access Network (E-UTRAN)-New Radio (NR) dual connectivity (ENDC), and an NR dual connectivity.

The ENDC enables the UE to connect with cells/Base Stations (BSs) (eNodeBs (eNBs)) of a Long Term Evolution (LTE) network and cells (gNodeBs (gNBs)) of a NR network for at least one service. The service can be an LTE service or an NR service. An eNodeB (eNB) may support at least one anchor band and at least one non-anchor band. The anchor band can be a specific frequency range, which may support the gNBs of the NR network for the dual connectivity. The non-anchor band can be another specific frequency band, which may not support the gNBs of the NR network. According to an embodiment, the UE may access the NR services by camping onto the anchor band supported by the eNB of the LTE network. However, the UE may not be able to access the NR services, if the UE camps onto the non-anchor band supported by the eNB of the LTE network. Further, this embodiment does not provide any methods that enable the UE to select the anchor band for accessing the NR services. Thus, the UE may camp onto the non-anchor bands multiple times, in which case, the UE is unable to access the NR services.

Figure 1A:
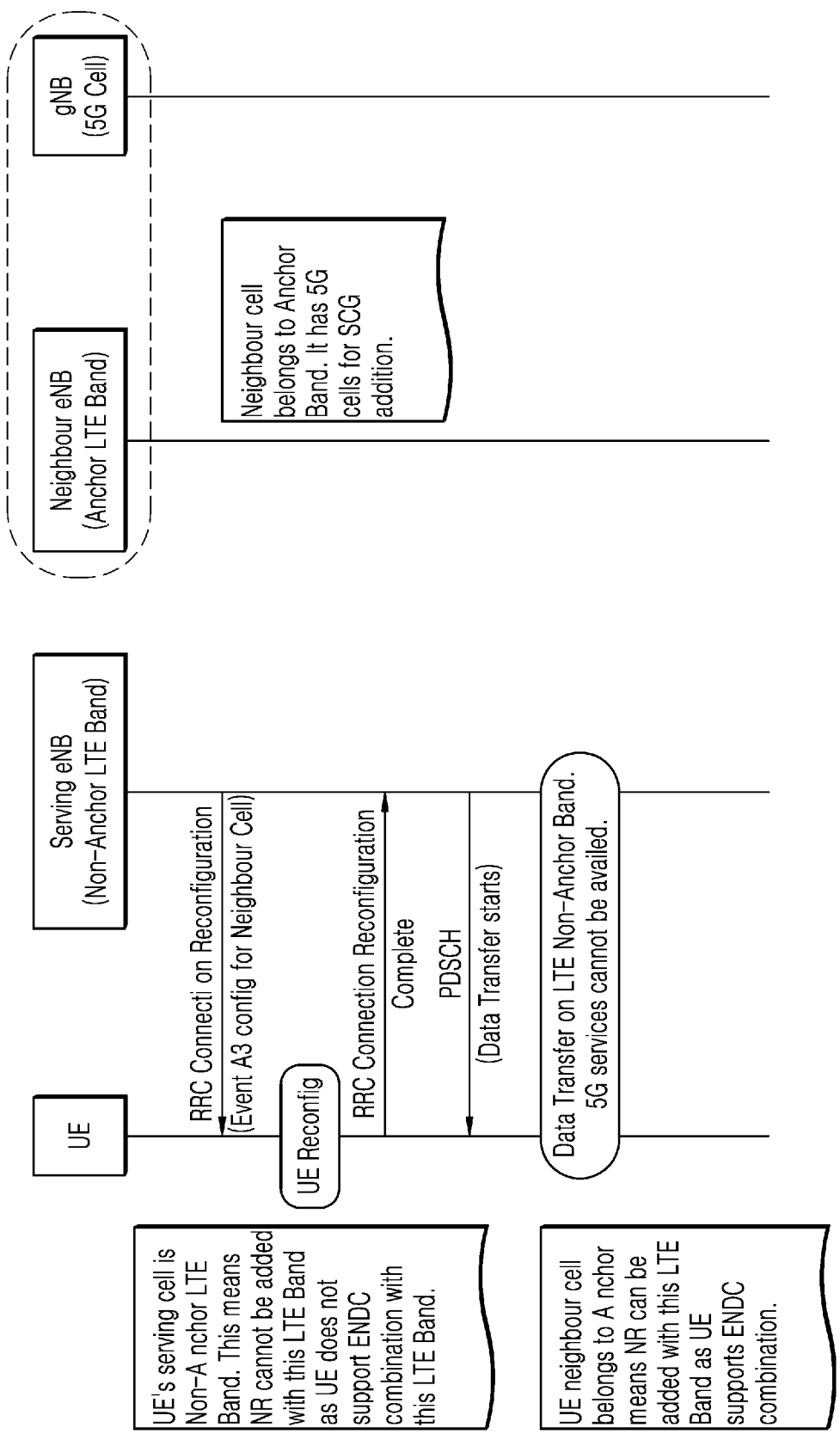
FIGS. 1A and 1B are example diagrams depicting an example method for accessing New Radio (NR) services using Evolved UMTS Terrestrial Radio Access Network (E-UTRAN)-New Radio (NR) dual connectivity (ENDC), according to embodiments.
Figure 1B:
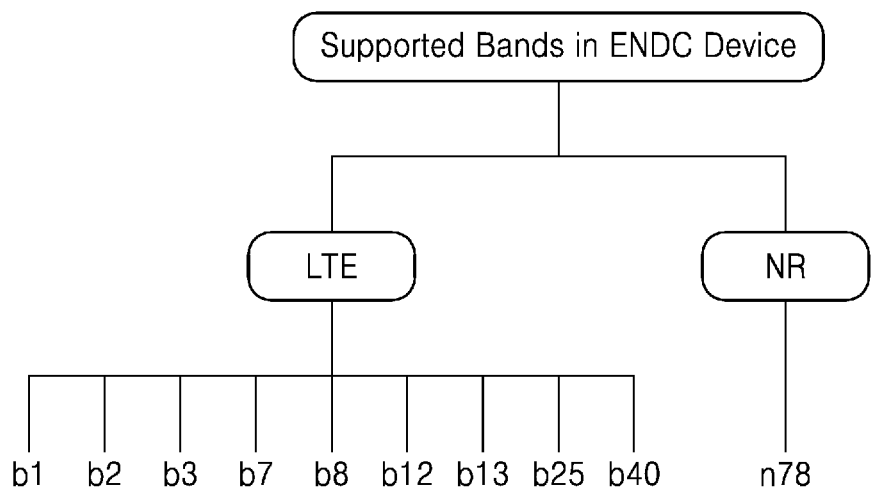

FIGS. 1A and 1B are example diagrams depicting an example method for accessing NR services using ENDC. As depicted in FIG. 1A, a UE is connected to an eNB of an LTE network (hereinafter referred as a serving eNB). The eNB may support at least one anchor band and at least one non-anchor band. In such a scenario, the UE may camp onto the anchor band of the serving eNB to access NR services. However, if the UE camps onto the non-anchor band of the serving eNB, then the UE may not be able to access the NR services.

Consider an example scenario as depicted in FIG. 1B, wherein the serving eNB supports anchor bands (B1, B3, B7, B25, and B40) for dual connectivity and supports non-anchor bands (B2, B8, B12, and B13). In such a scenario, the UE may access NR services, if the UE camps onto any one of the B1, B3, B7, B5, and B40 anchor bands that are supported by the serving eNB. The UE may not be able to access the services of the NR network, if the UE camps onto one of the non-anchor bands (B2, B8, B12, and B13). However, this method does not enable the UE to determine and select one of the anchor bands for accessing the NR services.

Figure 2A:
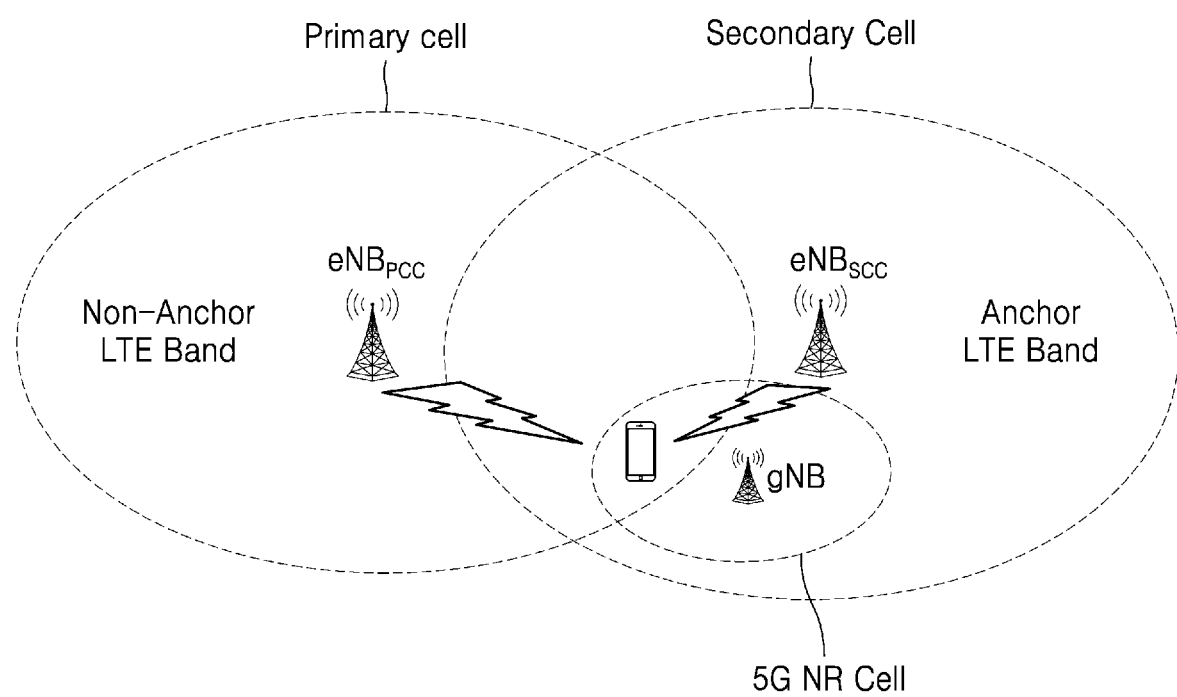
FIGS. 2A and 2B are example diagrams depicting an example method for accessing NR services using ENDC, when a Carrier Aggregation (CA) is active on a User Equipment (UE), according to embodiments.
Figure 2B:
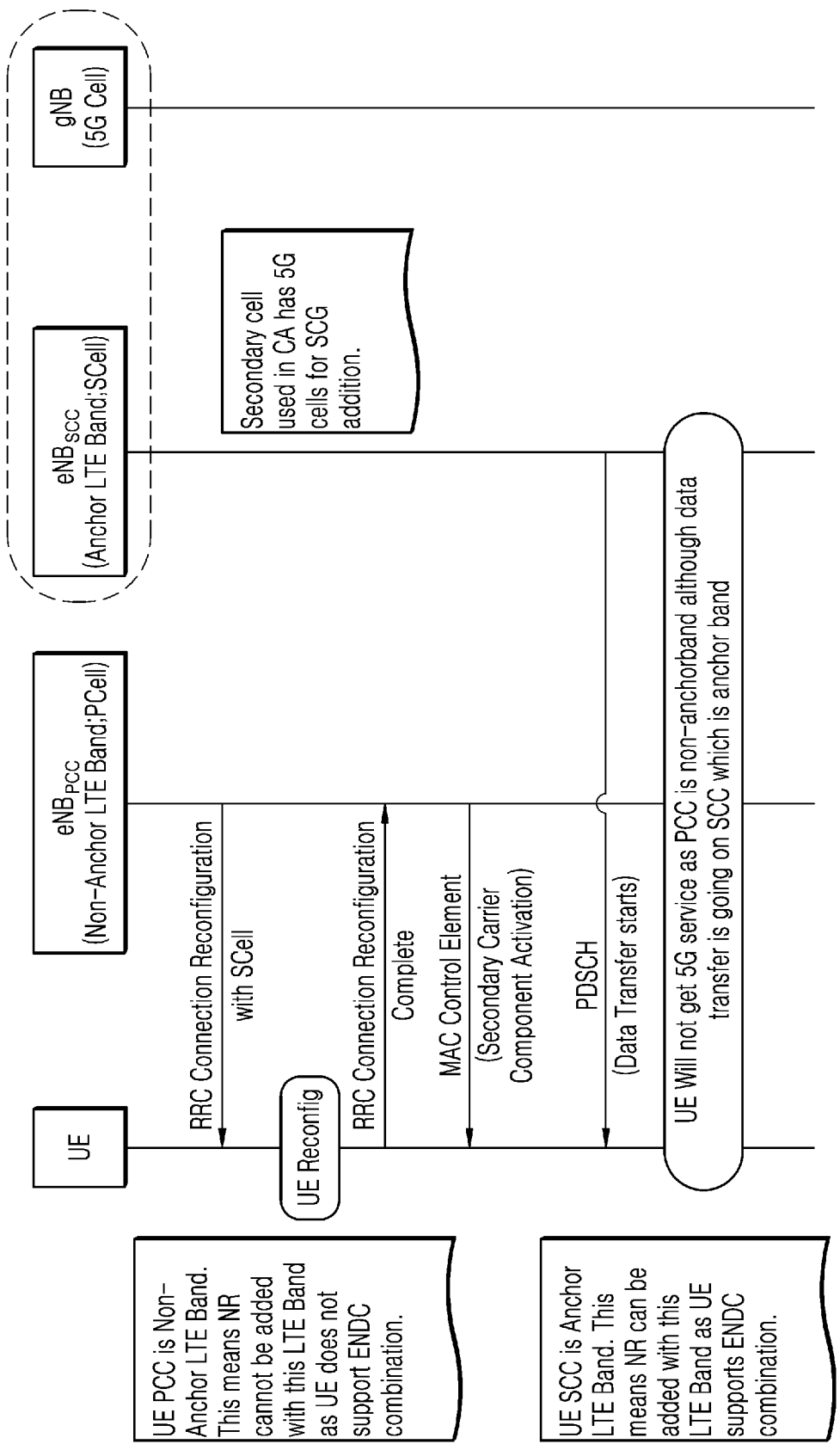

FIGS. 2A and 2B are example diagrams depicting an example method for accessing NR services using an ENDC, when a Carrier Aggregation (CA) is active on a UE. Consider an example scenario as depicted in FIGS. 2A, and 2B, a UE may be connected to two eNBs of an LTE network (a primary eNB (PCell) and a secondary eNB (SCell)) due to activation of a CA. The PCell and the SCell can be an ENDC anchor band cell or a non-ENDC anchor band cell. The ENDC anchor band cell can be a cell that supports the anchor bands (gNBs) for dual connectivity. The non-ENDC anchor band cell can be a cell that does not support the anchor bands/gNBs. In such a scenario, the UE may access NR services, only if the UE connects to the PCell that is the ENDC anchor band cell. In an example herein, consider that the UE is connected to the PCell and the SCell, wherein the PCell is the non-ENDC anchor band cell and the SCell is the ENDC anchor band cell. In such a scenario, the UE does not access the NR services, as the PCell is the non-ENDC anchor band cell, even though the SCell is the ENDC anchor band cell.

The NR dual connectivity enables the UE to connect with two gNBs simultaneously for accessing the NR services by establishing the dual connectivity.

Figure 3A:
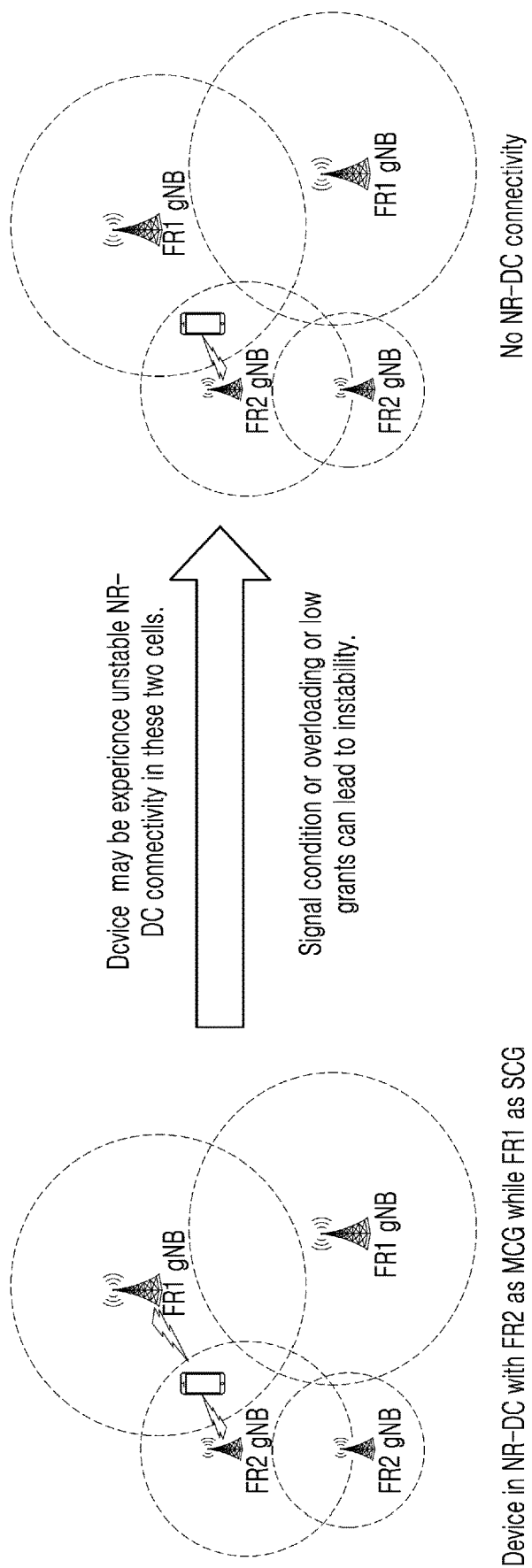
FIGS. 3A and 3B are example diagrams depicting an example method for accessing NR services using NR dual connectivity, according to embodiments.
Figure 3B:
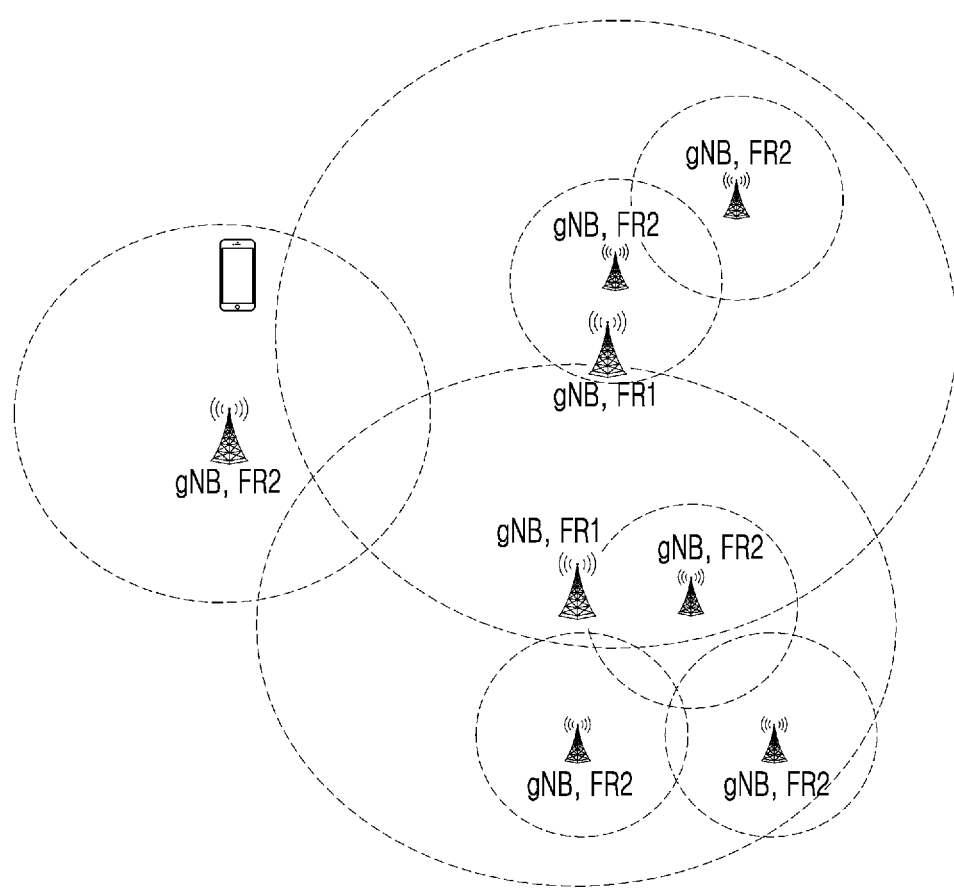

FIGS. 3A and 3B are example diagrams depicting an example method for accessing NR services using NR dual connectivity. Consider an example scenario as depicted in FIG. 3A, wherein the UE is connected to two gNBs (a master gNB/Master Cell Group (MCG) and a secondary gNB/Secondary Cell Group (SCG)) for accessing NR services by establishing dual connectivity. The MCG and the SCG can support various frequency ranges that may or may not support the dual connectivity. In an example herein consider that a PCell supports a frequency range 1 (FR1) and an SCell supports a frequency range 1 (FR1). In such a scenario, the established dual connectivity may be stable, as the MCG and the SCG support the same frequency range.

In another example herein, consider that the MCG supports an FR2, and the SCG supports an FR1. In such a scenario, the established dual connectivity may be unstable, on occurrence of at least one of Radio Link Failures (RLFs), beam failures, low grant, overload, and so on, as the MCG and the SCG support different frequency ranges. The unstable dual connectivity may further lead to poor user experience, higher power consumption, lower throughput, or the like. Thus, this method does not enable the UE to select a stable combination of the MCG and the SCG, which may provide stable dual connectivity.

Consider another example scenario as depicted in FIG. 3B, wherein a UE is connected to a PCell for accessing NR services. In an example herein, consider that the PCell supports an FR2, which does not support NR dual connectivity. Thus, camping onto the PCell, which does not support the NR dual connectivity, may lead to lower throughput. Further, this method does not enable the UE to search for neighbor cells/gNBs that may support the NR dual connectivity.

Thus, the above methods may not enable a UE to select anchor band cells or NR dual connectivity band cell for accessing NR services in multi-RAT dual connectivity.

The following embodiments disclose methods and systems for accessing NR services in a multi-RAT dual connectivity (DC) scenario.

Referring now to drawings, and particularly to FIGS. 4A through 29, where similar reference characters denote corresponding features consistently throughout the figures, example embodiments are described.

Figure 4A:
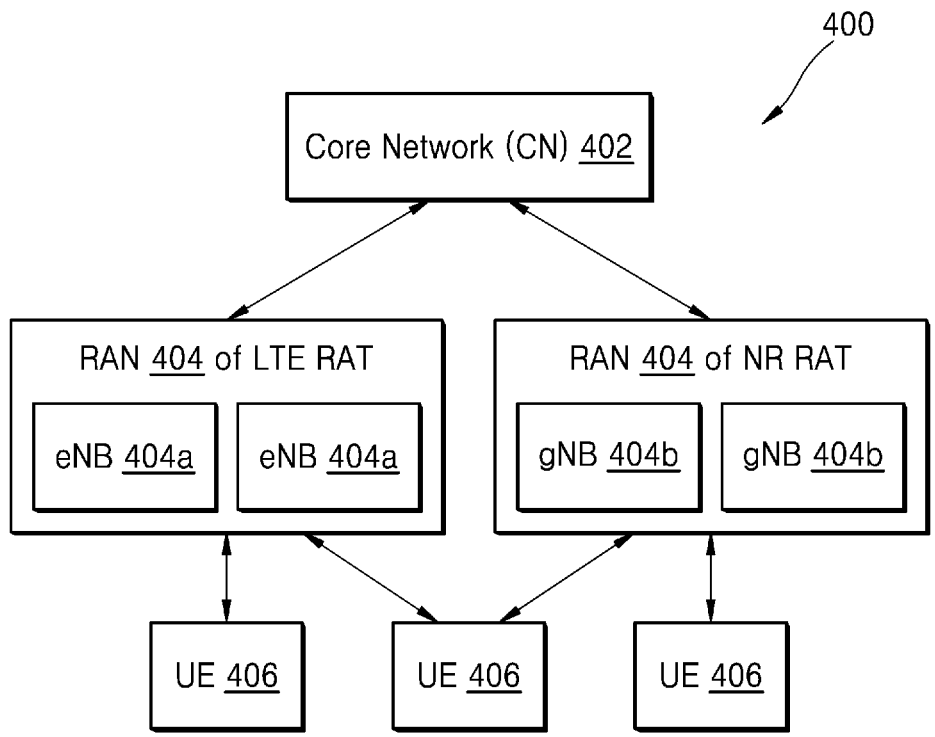
FIG. 4A depicts a communication network, according to embodiments.

FIG. 4A depicts a communication network 400, according to embodiments. The communication network 400 as referred herein can be a wireless network that supports integration of multi-RATs for providing DC to at least one UE. The RATs can be at least one of LTE, NR, or any other next generation communication network.

Figure 4B:
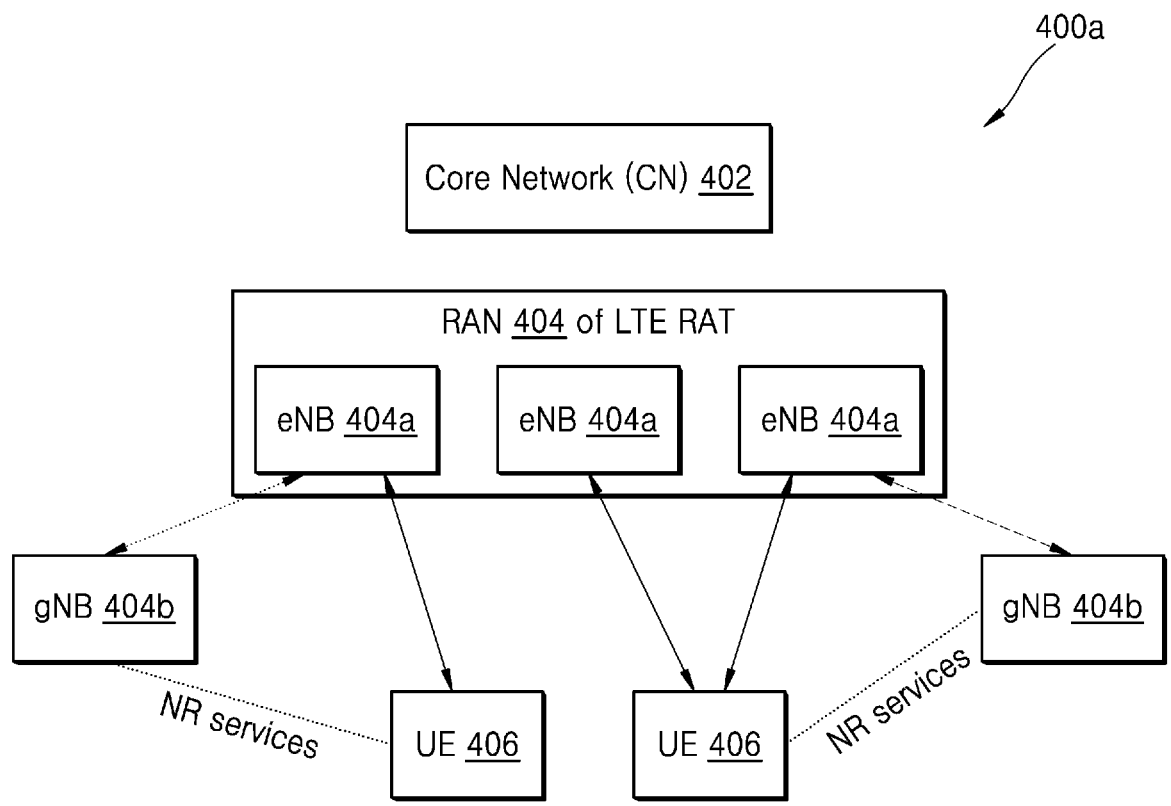
FIG. 4B depicts an NR non-standalone (NSA) network, according to embodiments.

In an embodiment, the communication network 400 can be an NR non-standalone (NSA) network 400a as depicted in FIG. 4B. The NR NSA network 400a can support E-UTRAN-NR ENDC as depicted in FIG. 4B. The ENDC involves integration of at least one LTE RAT and at least one NR RAT for providing dual connectivity to the UE.

Figure 4C:
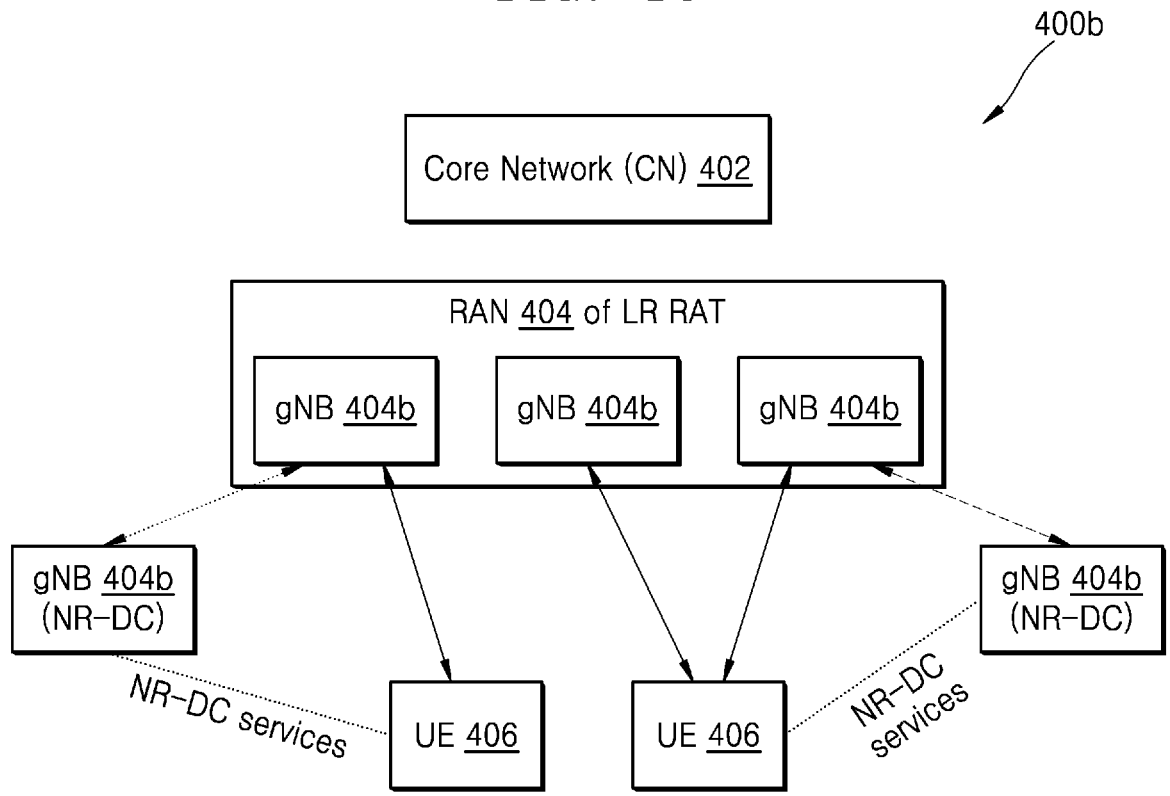
FIG. 4C depicts an NR standalone network, according to embodiments.

In an embodiment, the communication network 400 can be an NR standalone network 400b as depicted in FIG. 4C. The NR standalone network 400b can support NR DC as depicted in FIG. 4C. The NR DC involves integration of the NR RATs for providing NR services by establishing DC to the UE.

As depicted in FIG. 4A, the communication network 400 includes a Core Network (CN) 402, a plurality of Radio Access Networks (RANs) 404, and a plurality of User Equipments (UEs) 406.

The CN 402 includes at least one of an LTE core (Evolved Packet Core (EPC)), a 5G core (New Generation Core (NGC/5GC)), or any other next generation core network. In the communication network 400, the CN 402 can be integrated with the RAN 404 over a unified interface. The CN 402 can connect with the UE 406 through at least one RAN 404, and enable the UE 406 to exchange data with an external data network. Examples of the external data network can be, but not limited to, the Internet, a Public Data Network (PDN), an IP Multimedia Core Network Subsystem or the like. Examples of the data can be, but not limited to, voice packets, video packets, data packets, and so on.

The RAN 404 can include nodes/Base Station (BSs) of different RATs. The RAN 404 can include, but not limited to, eNodeBs (eNBs) 404a of the LTE RAT, gNodeBs (gNBs) 404b of the NR RAT, and so on. The RAN 404 can be configured to connect the UE 406 to the CN 402. The RAN 404 can be configured to perform radio resource management functions such as, but not limited to, radio bearer control, radio admission control, connection mobility control, dynamic allocation of resources to the UE 406 in uplink/downlink, and so on.

The UE 406 can be an electronic device supporting duel connectivity. Examples of the UE 406 can be, but not limited to, a mobile phone, a smartphone, a tablet, a phablet, a personal digital assistant (PDA), a laptop, a computer, a wearable computing device, a vehicle infotainment device, an Internet of Things (IoT) device, a Wi-Fi router, a USB dongle, or any other processing devices capable of supporting duel connectivity provided by the communication network 400.

The UE 406 can be configured to connect with the RAN 404, and to exchange signaling (for example; control data signaling and/or payload data signaling or the like) with the RAN 404 using a Radio Resource Control (RRC) protocol. According to the RRC protocol, the UE 406 may operate in various RRC states to exchange signaling with the RAN 404. The RRC states can be at least one of an RRC idle state, an RRC connected state, and so on. In the RRC idle state, the UE 406 may camp onto the RAN 404 (including at least one eNB 404a of the LTE RAT or at least one gNB 404b of the NR RAT) by performing a cell selection or a cell reselection. The cell selection and the cell reselection may be performed based on factors such as, but not limited to, radio link quality, cell status, and so on. In the RRC connected state, the UE 406 may provide the RAN 404 with downlink channel quality and neighbor cell information, so that the RAN 404 may assist the UE 406 to select a suitable node/cell (i.e., an eNBs 404a or a gNBs 404b).

The UE 406 can be configured to connect with the RAN 404 over at least one interface for accessing at least one communication service. Examples of the communication service can be, but not limited to, voice service, streaming service, data/file downloading service, and so on. In an embodiment, the UE 406 may connect with the RAN 404 including the eNB 404a over an LTE air interface for accessing communication services provided by the LTE RAT. The communication services provided by the LTE RAT can be referred to hereinafter as LTE services. In an embodiment, the UE 406 may connect with the RAN 404 including the gNB 404b over a 5G air interface for accessing communication services provided by the NR RAT. The communication services provided by the NR RAT can be referred to hereinafter as NR services.

In an embodiment, the UE 406 can be configured to operate in a Carrier Aggregation (CA) mode. In the CA mode, the UE 406 can connect with two or more nodes/cells of the RAN 404 for accessing the communication services.

In an embodiment, in the NR NSA network 400a supporting ENDC as depicted in FIG. 4B, the UE 406 can connect with two eNBs 404a of the LTE RAT as a primary cell (PCell) and a secondary cell (SCell) while operating in the CA mode. Thus, in the NR NSA network 400a, the PCell and the SCell correspond to the eNBs 404a of the LTE RAT. The PCell can be a serving cell operating on a primary frequency, in which the UE 406 can perform at least one of an initial connection establishment procedure, a connection re-establishment procedure, or the like. The PCell can perform functions such as, but not limited to, a random access (RA) procedure, radio link monitoring (RLM), a handover procedure, a Physical Uplink Control Channel (PUCCH) transmission, and so on. The SCell can be a cell operating on a secondary frequency, which can be configured once an RRC connection is established between the UE 406 and the PCell. The SCell may provide additional radio resources to the UE 406. When the CA mode is not activated, the UE 406 can connect only with the PCell/serving cell.

In the NR NSA network 400a, the eNBs 404a of the LTE RAT (that is either the PCell or the SCell) can support the gNBs 404b of the NR RAT for providing the NR services to the UE 406. The eNBs 404a of the LTE RAT can also be associated with frequency bands that support the gNBs 404b of the NR RAT (referred to hereinafter as anchor bands) for providing the NR services to the UE 406. In an embodiment, the eNBs 404a of the LTE RAT, which support the gNBs 404b or the anchor bands, can be referred to hereinafter as ENDC anchor band cells. In the NR NSA network 400a, the eNBs 404a of the LTE RAT (that is either the PCell or the SCell) may not support the gNBs 404b of the NR RAT for providing the NR services to the UE 406. The eNBs 404a of the LTE RAT may not be associated with the frequency bands that support the gNBs 404b of the NR RAT, that is, the anchor bands, for providing the NR services to the UE 406. In an embodiment, the eNBs 404a of the LTE RAT, which do not support the gNBs 404b or the anchor bands can be referred to hereinafter as non-ENDC anchor band cells. Thus, in the NR NSA network 400a, the UE 406 may connect with the ENDC anchor band cells for accessing the NR services.

In an embodiment, in the NR standalone network 400b supporting NR DC as depicted in FIG. 4C, the UE 406 can connect with two gNBs 404b of the NR RAT as the PCell and the SCell while operating in the CA mode. Thus, in the NR standalone network 400b, the PCell and the SCell correspond to the gNBs 404b of the NR RAT. The PCell can be a serving cell operating on a primary frequency, in which the UE 406 can perform at least one of an initial connection establishment procedure, a connection re-establishment pro- cedure, or the like. The SCell can be a cell operating on a secondary frequency, which can be configured once an RRC connection is established between the UE 406 and the PCell. The SCell may provide additional radio resources to the UE 406. When the CA mode is not activated, the UE 406 can connect only with the PCell.

In the NR standalone network 400b, the gNBs 404b of the NR RAT (that can be either the PCell or the SCell) may support the NR DC by supporting at least one gNB 404b of the NR RAT for providing the NR services to the UE 406. Also, the gNBs 404b of the NR RAT may not be associated with the gNB 404b of the NR RAT for providing the NR services to the UE 406, thereby not supporting NR DC. In an embodiment, the gNBs 404b of the NR RAT (that is either the PCell or the SCell), which support the NR DC can be referred to hereinafter as NR DC band cells. In an embodiment, the gNBs 404b of the NR RAT, which do not support the NR DC, can be referred to hereinafter as non-NR DC band cells. Thus, in the NR standalone network 400b, the UE 406 may connect to the NR DC band cells for accessing the NR services, while establishing the NR DC.

The embodiments herein use the terms such as "PCell", "master node", "first cell", and so on, interchangeably to refer to a serving cell, and use the terms such as "SCell", "secondary node", "second cell", "neighbor cell", and so on, interchangeably to refer to a cell other than the serving cell. The embodiments herein use the term "anchor band cell" to refer to one of the ENDC anchor band cell and the NR DC band cell. The embodiments herein use the term "NR services" to refer to NR services in the ENDC and/or NR DC services in the NR DC.

In an embodiment, the UE 406 selects an anchor band cell as a PCell for accessing NR services in the DC scenario, wherein the DC scenario includes one of the ENDC and the NR DC. As depicted in FIGS. 4A-4C, when the UE 406 wants to access the NR services while operating in the CA mode and in the RRC connected state, the UE 406 determines whether a connected PCell (serving cell) is an anchor band cell or a non-anchor band cell. The UE 406 determines whether the PCell is an anchor band cell or a non-anchor band cell based on capabilities of the UE 406. If the PCell (serving cell) is an anchor band cell, the UE 406 continues to access the NR services through the PCell as specified in 3GPP specification.

If the PCell is a non-anchor band cell, the UE 406 determines whether at least one connected SCell is an anchor band cell or a non-anchor band cell. The UE 406 determines whether the SCell is an anchor band cell or a non-anchor band cell based on the capabilities of the UE 406. If the connected SCell is a non-anchor band cell, the UE 406 may continue to access current communication services through the connected PCell.

If the SCell is an anchor band cell, the UE 406 prepares a measurement report for an event A2. The measurement report includes measured values of the PCell and the SCell. The measured values can be related to factors such as, but not limited to, radio link quality, signal strength, power, and so on, of the PCell and the SCell. On preparing the measured values, the UE 406 determines a difference between a measure value of the PCell and a measure value of the SCell. The UE 406 compares the difference with a measurement threshold. The measurement threshold can be a value that is pre-configured for the event A2. If the difference is less than or equal to the measurement threshold, the UE 406 modifies (for example, increases or decreases) the measured values of the PCell and/or the SCell in the measurement report. The UE 406 then sends the measurement report for the event A2 to the PCell, wherein the measurement report includes the modified measured values of the PCell and/or the SCell.

If the determined difference is greater than the measurement threshold, the UE 406 sends the measurement report for the event A2 to the PCell, without modifying the measured values of the PCell and/or the SCell.

After receiving the measurement report for the event A2, the PCell (which is the non-anchor band cell) and the SCell (which is the anchor band cell) are swapped for the UE 406 based on the measured values of the PCell and the SCell. The swapped SCell that is an anchor band cell adds the gNB 404*b* of the NR RAT and enables the UE 406 to access the NR services. Thus, the UE 406 may access the NR services by swapping the PCell and the SCell, when the PCell is a non-anchor band and the SCell is an anchor band cell.

In an embodiment, the UE 406 can be configured to select at least one neighbor cell that is an anchor band cell as a PCell (serving cell), when a connected PCell is a non-anchor band cell and the CA mode is not activated on the UE 406. When the CA is not activated and when the UE 406 in the RRC connected state, the UE 406 connects with only the PCell (serving cell). In such a scenario, the UE 406 determines whether the connected PCell is an anchor band cell or a non-anchor band cell. If the connected PCell is an anchor band cell, the UE 406 continues to access NR services through the connected PCell. If the connected PCell is a non-anchor band cell, the UE 406 receives RRC configurations of at least one neighbor cell from the connected PCell. In the NR NSA network 400*a*, the neighbor cell can be the eNBs 404*a* of the LTE RAT or the gNBs 404*b* of the NR RAT. The neighbor cell may support at least one other gNB 404*b* of the NR network for providing NR services to the UE 406. The neighbor cell that supports the other gNBs 404*b* of the NR network may be referred to hereinafter as a neighbor anchor band cell. The neighbor cell may not support the other gNB 404*b* of the NR network for providing the NR services to the UE 406. The neighbor cell that does not support the other gNB 404*b* of the NR network may be referred to hereinafter as a neighbor non-anchor band cell.

After receiving the RRC configurations, the UE 406 determines the neighbor anchor band cell and the neighbor non-anchor band cell. The UE 406 determines the neighbor anchor band cell and the neighbor non-anchor band cell based on the capabilities of the UE 406. The UE 406 then prepares a measurement report first for the neighbor anchor band cell. The measurement report can be prepared for reporting of an event A3 and/or an event A5. The event A3 and/or the event A5 can be as defined in the 3GPP specification. Reporting of the event A3 may be triggered when the neighbor cell becomes offset better than the PCell/serving cell. Reporting of the event A5 may be triggered when the PCell becomes worse than a threshold 1 and the neighbor cell becomes better than a threshold 2. The threshold 1 and the threshold 2 can be defined thresholds of the 3GPP specification. On preparing the measurement report for the determined neighbor anchor band cell, the UE 406 sends the measurement report for the events A3 and/or A5 to the PCell, wherein the measurement report includes the measured values of the determined neighbor anchor band cell.

In an embodiment, if the measured values of the neighbor non-anchor band cell satisfies the events A3 and/or A5, the UE 406 delays/avoids sending of the measurement report for the neighbor non-anchor band cell to the PCell for the events A3 and A5.

In an embodiment, if the measured values of the neighbor non-anchor band cell satisfies the events A3 and/or A5, the UE 406 decreases the measured values of the neighbor non-anchor band cell compared to the neighbor anchor band cell. The UE 406 may decrease the measured values of the neighbor anchor band cell, when a difference between power of the neighbor anchor band cell and power of the neighbor non-anchor band cell is less than a power threshold. The power threshold can be a value predefined for the events A3 and/or A5. The UE 406 then sends the measurement report to the PCell for the events A3 and A5, wherein the measurement report includes the measured values of the neighbor anchor band cell and the decreased measured values of the neighbor non-anchor band cell. On receiving the measurement report for the events A3 and/or A5 from the UE 406, the PCell enables the UE 406 to handover to the neighbor anchor band cell. Thus, the neighbor anchor band cell may become the PCell for the UE 406. The UE 406 further accesses the NR services through the connected anchor band PCell.

In an embodiment, the UE 406 can be configured to prioritize anchor band cells, while performing a cell selection in the RRC idle state. In the NR NSA network 400*a*, the cell selection can be performed for determining at least one eNB 404*a* and establishing a new connection with the eNB 404*a*. In the NR standalone network 400*b*, the cell selection can be performed for determining at least one gNB 404*b* and establishing a new connection with the gNB 404*b*. In the RRC idle state, when the UE 406 is powered on, the UE 406 initiates a cell search. For performing the cell search, the UE 406 determines one or more candidate cells that satisfy a cell selection criterion (S-criterion), wherein the candidate cells include one of eNBs 404*a* and gNBs 404*b*. The S-criterion can be a pre-condition/criterion that can be used by the UE 406 to determine if the candidate cells are suitable for establishing a new connection. Examples of the S-criterion for establishing the new connection can be, but not limited to, defined signal measurements for a specific BS/cell (for example, Reference Signal Received Power (RSRP)), or the like.

After determining the candidate cells that satisfy the S-criterion, the UE 406 determines cells that are anchor band cells. The UE 406 then prioritizes the candidate cells that are the anchor band cells. The UE 406 performs the cell search on the prioritized anchor band cells first, so that a probability of camping of the UE 406 onto the anchor band cells may increase. The camping of the UE 406 onto the anchor band cells may further increase a probability of accessing NR services. The UE 406 can perform the cell selection on the prioritized anchor band cells, according to the 3GPP specification.

In an embodiment, the UE 406 can be configured to prioritize anchor band cells, while performing cell reselection. The UE 406 can perform the cell reselection when the UE 406 initially selects a PCell which is a non-anchor band cell. The cell reselection can be performed to determine at least one neighbor anchor band cell for handover. For performing the cell reselection, the UE 406 determines the neighbor anchor band cell. The UE 406 determines the neighbor anchor band cell based on capabilities of the UE 406. If a System Information Block (SIB) received from a PCell includes any anchor band frequency present for the cell-reselection, the UE 406 determines at least one cell associated with a corresponding anchor band frequency as at least one neighbor anchor band cell. The UE 406 then prioritizes the neighbor anchor band cell, even though at least one neighbor non-anchor band cell is associated with higher measured values compared to the neighbor anchor band cell. The UE 406 then performs the cell reselection on the prioritized neighbor anchor band cell. The cell reselection can be performed according to the 3GPP specification.

In an embodiment, the UE 406 can be configured to select a non-anchor band cell as a PCell when the UE 406 does not want to access NR services (i.e., the UE 406 wants to access only LTE services) or the UE 406 wants to access NR services without establishing DC. The UE 406 can access LTE services by camping onto a PCell, which can be a non-anchor band cell.

When the UE 406 wants to access LTE services or NR services without establishing DC, while operating in the CA mode, the UE 406 determines whether a connected PCell/serving cell is an anchor band cell or a non-anchor band cell. If the PCell/serving cell is a non-anchor band cell, the UE 406 continues to access the LTE services or the NR services without establishing DC through the PCell as specified in 3GPP specification. If the PCell is an anchor band cell, the UE 406 determines whether at least one connected SCell is an anchor band cell or a non-anchor band cell. If the connected SCell is an anchor band cell, the UE 406 continues to access LTE services or NR services without establishing DC through the PCell. If the connected PCell is an anchor band cell and the SCell is a non-anchor band cell, the UE 406 prepares a measurement report for the event A2. The measurement report includes the measured values of the PCell and the SCell. On preparing the measured values, the UE 406 determines a difference between the measured values of the PCell and the measured values of the SCell. The UE 406 compares the determined difference with a measurement threshold. If the determined difference is less than or equal to the measurement threshold, the UE 406 modifies (increments or reduces) the measured values of the PCell and the SCell in the measurement report. The UE 406 then sends the measurement report for the event A2 to the PCell, wherein the measurement report includes the modified measured values of the PCell and the SCell. If the determined difference is greater than the measurement threshold, the UE 406 sends the measurement report for the event A2 to the PCell without modifying the measured values of the PCell and the SCell. On receiving the measurement report for the event A2, the PCell and the SCell are swapped as the SCell is the non-anchor band cell and the PCell is the anchor band cell. Thus, the UE 406 may access the LTE services or the NR services without establishing DC by swapping the PCell and the SCell, when the PCell is the anchor band cell and the SCell is the non-anchor band cell.

In an embodiment, in the NR NSA network 400a, the UE 406 can be configured to perform a forced radio resource re-establishment (RRE) for accessing NR services, when the PCell is the non-anchor band cell and the SCell is the anchor band cell. For accessing the NR services in the RRC connected state, the UE 406 determines whether the PCell is the anchor band cell or the non-anchor band cell. If the PCell is the anchor band cell, the UE 406 continues to access the NR services through the PCell. If the PCell is the non-anchor band cell, the UE 406 determines whether the SCell is the anchor band cell or the non-anchor band cell. If the SCell is the non-anchor band cell, the UE 406 continues to access the current communication services through the PCell. If the SCell is the anchor band cell, the UE 406 performs the forced RRE, according to the 3GPP specification. On performing the forced RRE, the UE 406 camps onto the SCell, which is the anchor band cell and accesses the NR services through the camped at least one SCell.

In an embodiment, in the NR standalone network 400b, the UE 406 may be connected to a Master Cell Group (MCG) and a Secondary Cell Group (SCG). The MCG and the SCG may include the PCell and at least one SCell. The MCG and the SCG may support different frequency ranges. The frequency ranges may further support the NR DC.

In an embodiment, for accessing 5G services by connecting to the MCG and the SCG that support NR DC in the CA mode, the UE 406 determines whether a combination of the MCG and the SCG is a stable cell combination or an unstable cell combination. The stable cell combination provides stable NR DC services to the UE 406. In the stable cell combination, the MCG and the SCG may support the same frequency range. The unstable cell combination provides unstable NR DC services to the UE 406 on occurrence of at least one condition. Examples of the condition can be, but not limited to, radio link failure (RLF), beam failure, overload, low grant, and so on. In the unstable cell combination, the MCG and the SCG may support the different frequency ranges.

After determining that the combination of the MCG and the SCG is a stable cell combination, the UE 406 continues to access the NR services through the MCG. On determining that the combination of the MCG and the SCG is the unstable cell combination, the UE 406 determines whether the SCG is a stable cell or an unstable cell. The stable cell can be a gNB that supports at least one other gNB of the same frequency range. The unstable cell can be a gNB that support the other gNB of the different frequency range. In an embodiment, the UE 406 may use at least one heuristic learning model/method to determine the stable cell or the unstable cell. In an example, the heuristic learning method can be at least one of a machine learning method, a deep learning method, an Artificial Intelligence (AI) method, a neural network method, and so on. The learning method involves learning a condition (the stable cell or the unstable cell) of the cell/gNB based on at least one of, but not limited to, RSRP, Reference Signals Received Quality (RSRQ), a number of beam failures, a number of radio link failures, a number of radio link failures in the cell, and so on.

After determining that the SCG is a stable cell, the UE 406 prepares a measurement report for the events A3 and/or A5. The measurement report includes only the measured values of the SCG, which is the stable cell. The UE 406 sends the measurement report for the SCG to the PCell for the events A3 and/or A5. On receiving the measurement report for the events A3 and/or A5 from the UE 406, the MCG selects at least one gNB supported by the SCG of the same frequency range as a new MCG for the UE 406. The MCG further enables the UE 406 to switch to a new MCG. Thus, the UE 406 may connect with the MCG and the SCG of the same frequency range to access stable NR DC services.

In an embodiment, a serving cell/PCell handles connectivity of the UE 406 to access at least one NR service. The serving cell includes one of the eNB 404a of the LTE RAT and the gNB 404b of the NR RAT. The serving cell determines whether the UE 406 supports DC prior to adding a CA carrier component for the UE 406, wherein the DC includes one of the ENDC and the NR DC. The serving cell performs a handover of the UE 406 to a second cell by switching a secondary carrier component (SCC) to a primary carrier component (PCC) for the UE (406), if the serving cell is the non-anchor band cell. The serving cell further adds the SCC for the UE 406 to access an NR service.

In an embodiment, when the UE 406 is in a mobility state (i.e., when the UE 406 is moving) and a serving cell is a non-anchor band cell, the serving cell receives a measurement report for at least one neighbor anchor band cell from the UE 406. The serving cell determines whether the UE 406 supports DC after receiving the measurement report from the UE 406. The serving cell performs a handover of the UE 406 to a neighbor anchor band cell of the neighbor anchor band cell, if the UE 406 supports the DC.

FIGS. 4A-4C show a plurality of components of the communication network 400, but it is to be understood that the embodiments are not limited thereto. In other embodiments, the communication network 400 may include more or less number of components. Further, the labels or names of the components are used only for illustrative purpose and does not limit the scope of the embodiments herein. One or more components can be combined together to perform the same or substantially similar function in the communication network 400.

Figure 5:
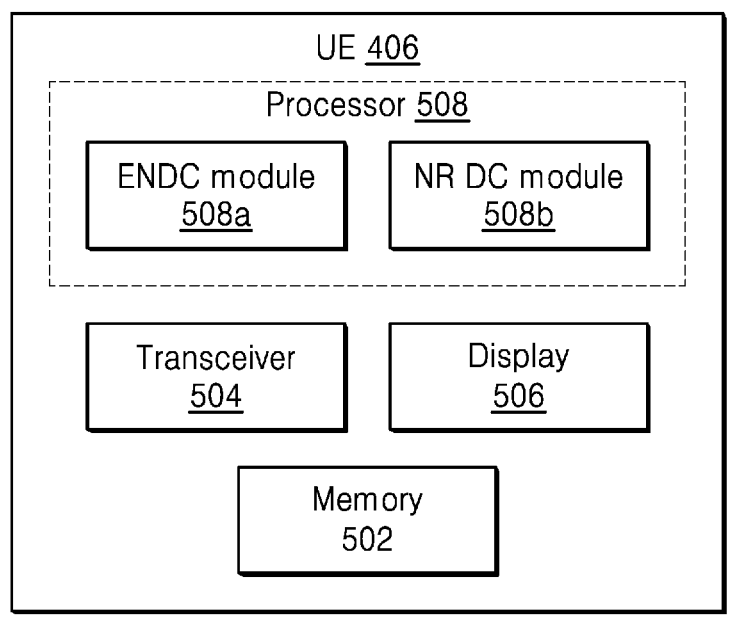
FIG. 5 is a block diagram depicting various modules of a UE, according to embodiments.

FIG. 5 is a block diagram depicting various modules of the UE 406, according to embodiments.

The UE 406 includes a memory 502, a transceiver 504, a display 506 and a controller 508. The UE 406 may also include an input/output (I/O) interface, and so on (not shown).

The memory 502 can store at least one of data, an RRC configurations, information about ENDC anchor band cells and non-ENDC anchor band cells, information about NR DC cells and non-NR DC cells, S-criteria, a measurement threshold, and so on. Examples of the memory 502 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 502 may include one or more computer-readable storage media. The memory 502 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 502 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The transceiver 504 can be configured to enable the UE 406 to communicate with at least one external entity (for example: eNBs 404a, gNBs 404b, or the like) over at least one interface. In an example, the interface can be, but is not limited to, an LTE/4G air interface, a NR/5G air interface, and so on. The communication unit may include any one or combination of a radio frequency (RF) modem, a digital modem, a WiFi chip, and related software and/or firmware.

The display 506 can be configured to allow a user to interact with the UE 406. The display 506 can allow the user to activate or deactivate the CA mode. The display 506 may be implemented by a liquid crystal display (LCD), a light-emitting diode (LED) display, or an organic light-emitting diode (OLED) display not being limited thereto.

The controller 508 may include at least one or more components, elements, modules or units (collectively "modules") embodied as various numbers of hardware, software and/or firmware structures that execute respective functions described herein. These modules may use a direct circuit structure, such as a memory, a processor, a logic circuit, a look-up table, etc. that may execute the respective functions through controls of one or more microprocessors or other control apparatuses. Also, at least one of these modules may be specifically embodied by a program, or a part of code, which contains one or more executable instructions for performing specified logic functions, and executed by one or more microprocessors or other control apparatuses. Further, at least one of these modules may include or may be implemented by a processor such as a central processing unit (CPU) that performs respective functions, a microprocessor, or the like. Two or more of these modules may be combined into one single module which performs all operations or functions of the combined two or more modules. Also, at least part of functions of at least one of these modules may be performed by another of these modules. The controller 508 can be configured to enable the UE 406 to access NR services in a multi-RAT dual connectivity.

In an embodiment, when the UE 406 is operating in the NR NSA network 400a of FIG. 4B supporting ENDC, the controller 508 can be configured at least to: (i) indicate swapping of the PCell and the SCell for the UE 406 to access the NR services when the UE 406 is connected with the PCell that is a non-ENDC anchor band cell and the SCell that is an ENDC anchor band cell in the CA mode; (ii) indicate swapping of the PCell and the SCell for the UE 406 to access the LTE services when the UE 406 is connected with the PCell that is the ENDC anchor band cell and the SCell that is the non-ENDC anchor band cell in the CA mode; (iii) enable the UE 406 to perform a forced RRE to camp onto the SCell to access the NR services when the UE 406 is connected with the PCell that is the non-ENDC anchor band cell and the SCell that is the ENDC anchor band cell in the CA mode; (iv) select at least one neighbor ENDC anchor band cell for the UE 406 to access the NR services when the UE 406 is connected only with the PCell that is the non-ENDC anchor band cell in the RRC connected state; and (v) prioritize the ENDC anchor band cell and perform cell selection or cell reselection on the prioritized ENDC anchor band cell when the UE 406 is in the RRC idle state.

In an embodiment, when the UE 406 is operating in the NR standalone network 400b of FIG. 4C supporting NR DC, the controller 508 can be configured at least to: (i) select a stable cell combination for the UE 406 to access stable NR DC services when the UE 406 is connected with an MCG and an SCG of different frequency ranges; (ii) indicate swapping of the PCell and the SCell for the UE 406 to access NR DC services when the UE 406 is connected with the PCell that is the non-NR DC band cell and the SCell that is the NR band cell in the CA mode; (iii) indicate swapping of the PCell and the SCell for the UE 406 to access NR services without the NR DC when the UE 406 is connected with the PCell that is an NR DC band cell and the SCell that is a non-NR band cell in the CA mode; (iv) select at least one neighbor NR DC band cell for the UE 406 to access the NR DC services when the UE 406 is connected only with the PCell that is the non-NR DC band cell in the RRC connected state; and (v) prioritize the NR DC band cell and perform cell selection or cell reselection on the prioritized NR DC band cells when the UE 406 is in the RRC idle state.

The controller 508 includes an ENDC module 508a and a NR DC module 508b to manage accessing NR services on the UE 406. The ENDC module 508a can operate when the UE 406 is functioning in the NR NSA network 400a supporting ENDC. The NR DC module 508b can operate when the UE 406 is functioning in the NR standalone network 400b supporting NR DC.

The ENDC module 508a can be configured to manage accessing NR services using ENDC when the UE 406 is in the RRC connected state or the RRC idle state. Embodiments herein are further explained considering that the UE 406 is in the RRC connected state as an example. When the UE 406 is connected only with a PCell initially in the RRC connected state, the ENDC module 508a may receive at least one input from a user for an activation of the CA mode. The ENDC module 508a activates the CA mode in the UE 406. After activating the CA mode, the ENDC module 508a requests and receives from the PCell an RRC Connection Reconfiguration for a SCell. The ENDC module 508a performs RRC reconfiguration according to the 3GPP TS 36.331, and sends an RRC Connection Reconfiguration Complete message to the PCell. In response to the RRC Connection Reconfiguration Complete message, the ENDC module 508a receives a Media Access Control (MAC) element from the PCell for activation of the SCell. Based on the received MAC element, the ENDC module 508a enables the UE 406 to connect with the SCell. When the UE 406 connects with the SCell, the ENDC module 508a starts receiving data from the SCell over a Physical Downlink Shared Channel (PDSCH). Thus, the UE 406 connects with both the PCell and the SCell.

In an embodiment, the ENDC module 508a can be configured to select an anchor band cell as a PCell when the UE 406 wants to access NR services (e.g., the UE 406 does not want to access LTE services). When the UE 406 connects with both the PCell and the SCell, the ENDC module 508a may identify a trigger initiated by a user for accessing the NR services. On identifying the trigger, the UE 406 determines whether the PCell is an ENDC anchor band cell or a non-ENDC anchor band cell. If the PCell cell is the ENDC anchor band cell, the ENDC module 508a enables the UE 406 to continue to access the NR services through the PCell as specified in 3GPP specification. If the PCell is the non-ENDC anchor band cell, the ENDC module 508a determines whether at least one connected SCell is an ENDC anchor band cell or a non-ENDC anchor band cell. If the connected SCell is the non-ENDC anchor band cell, the ENDC module 508a enables the UE 406 to continue to access current communication services through the connected PCell.

If the SCell is the ENDC anchor band cell, the ENDC module 508a performs a measurement operation on at least one factor of the PCell and the SCell to obtain measured values of the PCell and the SCell. The factor can be, but not limited to, signal strength, Reference Signal Receive Power (RSRP), Reference Signal Received Quality (RSRQ), and so on, of the PCell and the SCell. The ENDC module 508a determines a difference between the measured values of the PCell and the SCell, and compares the difference with a measurement threshold. The ENDC module 508a may modify the measured values by decreasing the measured values of the PCell and/or increasing the measured values of the SCell in the measurement report if the difference between the measured values of the PCell and the at least one SCell is less than or equal to the measurement threshold. The ENDC module 508a sends the measurement report with the modified measured values for the event A2 to the PCell. Alternatively, the ENDC module 508a may send the measurement report for the event A2 to the PCell without modifying the measured values of the PCell and the SCell if the difference between the measured values of the PCell and the at least one SCell is greater than the measurement threshold.

The ENDC module 508a may receive an RRC Connection Reconfiguration with a handover indication to the SCell from the PCell when the PCell (the non-ENDC anchor band cell) and the SCell (the ENDC anchor band cell) are swapped based on the measurement report. On receiving the RRC Connection Reconfiguration with the handover indication to the SCell, the ENDC module 508a reconfigures the UE 406. On reconfiguring the UE 406, the ENDC module 508a sends an RRC Connection Reconfiguration complete message to the SCell (now a PCell after the swapping). Thereafter, the ENDC module 508a receives the RRC Connection Reconfiguration from the SCell, wherein the RRC Connection Reconfiguration received from the SCell includes configurations of the SCell and the gNB 404b of the NR RAT that is supported by the SCell. On receiving the configurations of the SCell and the gNB 404b of the NR RAT that is supported by the SCell, the ENDC module 508a enables the UE 406 to connect with the SCell (the ENDC anchor band cell) as the PCell and to access the NR services from the SCell that is connected as the PCell. Thus, the UE 406 may access the NR services by selecting the ENDC anchor band cell as the PCell.

In an embodiment, the ENDC module 508a can be configured to enable the UE 406 to perform a forced RRE to camp onto an ENDC anchor band cell when the UE 406 wants to access NR services. The ENDC module 508a may identify a trigger initiated in the UE 406 for the NR services when the UE 406 is connected to a PCell and an SCell in the CA mode. On identifying the trigger for the NR services, the ENDC module 508a determines whether the PCell is an ENDC anchor band cell or a non-ENDC anchor band cell. If the PCell is the ENDC anchor band cell, the ENDC module 508a enables the UE 406 to access the NR services through the PCell. If the PCell is the non-ENDC anchor band cell, the ENDC module 508a determines whether at least one previously connected SCell is an ENDC anchor band cell or a non-ENDC anchor band cell based on information about the previous SCell and previous measurement reports of the previous SCell stored in the memory 502. If the previously connected SCell is a non-ENDC anchor band cell, the ENDC module 508a enables the UE 406 to continue to access current communication services through the connected PCell.

If the previously connected SCell is an ENDC anchor band cell, the ENDC module 508a enables the UE 406 to perform the forced RRE by camping onto the previously connected SCell as a serving cell. When the UE 406 camps onto the previously connected SCell as the serving cell, the ENDC module 508a sends an RRC connection request to the SCell and receives an RRC connection setup from the SCell. The ENDC module 508a reconfigures the UE based on the received RRC connection set up from the SCell, and sends an RRC Connection Setup Complete message to the SCell. Thereafter, the ENDC module 508a receives the RRC Connection Reconfiguration from the SCell, wherein the RRC Connection Reconfiguration received from the SCell includes configurations of the SCell and the gNB 404b of the NR RAT that is supported by the SCell. On receiving the configurations of the SCell and the gNB 404b of the NR RAT that is supported by the SCell, the ENDC module 508a enables the UE 406 to connect with the SCell (the ENDC anchor band cell) and access the NR services through the SCell. Thus, the UE 406 may access the NR services by forcefully camping onto the SCell that is an ENDC anchor band cell.

In an embodiment, the ENDC module 508a can be configured to select a non-anchor band cell as a PCell when the UE 406 does not want to access NR services (e.g., the UE 406 wants to access LTE services) in the CA mode. The ENDC module 508a may identify a trigger initiated in the UE 406 for the LTE services when the UE 406 is connected to a PCell and a SCell in the CA mode. On identifying the trigger for the LTE services, the ENDC module 508a determines whether the PCell is an ENDC anchor band cell or a non-ENDC anchor band cell. If the PCell cell is a non-ENDC anchor band cell, the ENDC module 508a enables the UE 406 to continue to access the LTE services through the PCell as specified in 3GPP specification. If the PCell is an ENDC anchor band cell, the ENDC module 508a determines whether at least one connected SCell is an ENDC anchor band cell or a non-ENDC anchor band cell. If the connected SCell is an ENDC anchor band cell, the ENDC module 508a enables the UE 406 to continue to access current communication services through the connected PCell.

If the SCell is an ENDC anchor band cell, the ENDC module 508a performs a measurement operation on at least one factor of the PCell and the SCell to obtain measured values of the PCell and the SCell. The factor can be, but not limited to, signal strength, Reference RSRP, RSRQ, and so on, of the PCell and the SCell. The ENDC module 508a determines a difference between the measured values of the PCell and the SCell, and compares the difference with a measurement threshold. The ENDC module 508a may modify the measured values by decreasing the measured values of the PCell and increasing the measured values of the SCell in the measurement report if the difference between the measured values of the PCell and the SCell is less than or equal to the measurement threshold. The ENDC module 508a sends the measurement report with the modified measured values for the event A2 to the PCell. Alternatively, the ENDC module 508a may send the measurement report for the event A2 to the PCell without modifying the measured values of the PCell and the SCell if the difference between the measured values of the PCell and the SCell is greater than the measurement threshold.

The ENDC module 508a may receive an RRC Connection Reconfiguration with a handover indication to the SCell from the PCell when the PCell (the ENDC anchor band cell) and the SCell (the non-ENDC anchor band cell) are swapped based on the measurement report. On receiving the RRC Connection Reconfiguration with the handover indication to the SCell, the ENDC module 508a reconfigures the UE 406, and enables the UE 406 to connect with the SCell (the non-ENDC anchor band cell) as a PCell. On reconfiguring the UE 406, the ENDC module 508a sends the RRC Connection Reconfiguration complete message to the SCell (a PCell after the swapping). Thereafter, the ENDC module 508a enables the UE 406 to connect with the SCell as the PCell and to access the LTE services from the SCell that is connected as the PCell. Thus, the UE 406 may access the LTE services by selecting the non-ENDC anchor band cell as the PCell.

In an embodiment, the ENDC module 508a can be configured to select at least one neighbor ENDC anchor band cell through which the UE 406 can access NR services, when the UE 406 is connected only with a PCell that is a non-ENDC anchor band cell. When the UE 406 is in the RRC connected state and the CA is not activated on the UE 406, the UE 406 may be connected only with the PCell (serving cell). In such a scenario, the ENDC module 508a requests and receives from the PCell an RRC Connection Reconfiguration, wherein the RRC Connection Reconfiguration includes configurations of at least one neighbor cell. The neighbor cell may include at least one neighbor ENDC anchor band cell and/or at least one neighbor non-ENDC anchor band cell. The ENDC module 508a may reconfigure the UE 406 using the received RRC Connection Reconfiguration, and send an RRC Connection Reconfiguration Complete message to the PCell, thereby enabling the UE 406 to receive data from the PCell over a PDSCH.

The ENDC module 508a may identify a trigger for accessing NR services, when the UE 406 is connected with the PCell. After identifying the trigger for accessing the NR services, the ENDC module 508a determines the neighbor ENDC anchor band cell and the neighbor non-ENDC anchor band cell using the received configurations of the neighbor cells from the PCell. The ENDC module 508a then measures at least one factor of the neighbor ENDC anchor band cell to obtain measured values of the neighbor ENDC anchor band cell. The ENDC module 508a prepares a measurement report including the measured values of the neighbor ENDC anchor band cell first. The ENDC module 508a then sends the measurement report to the PCell for the events A3 and/or A5. The PCell may further send a handover preparation message to the neighbor ENDC anchor band cell, on receiving the measurement report for the events A3 and/or A5 from the ENDC module 508a of the UE 406. The PCell sends an RRC Connection Reconfiguration with a handover command to the ENDC module 508a of the UE 406, on receiving an acknowledgment from the neighbor ENDC anchor band cell in response to the handover preparation message.

On receiving the RRC Connection Reconfiguration with the handover command, the ENDC module 508a reconfigures the UE 406, and sends an RRC Connection Reconfiguration complete message to the neighbor ENDC anchor band cell. Thereafter, the ENDC module 508a receives an RRC Connection Reconfiguration from the neighbor ENDC anchor band cell, wherein the RRC Connection Reconfiguration received from the neighbor ENDC anchor band cell includes configurations of the gNB 404b of the NR RAT that is supported by the neighbor ENDC anchor band cell. After receiving the configurations of the gNB 404b of the NR RAT that is supported by the neighbor ENDC anchor band cell, the ENDC module 508a enables the UE 406 to connect with the neighbor ENDC anchor band cell as a PCell and to access the NR services from the neighbor ENDC anchor band cell that is connected as the PCell. Thus, the UE 406 may access the NR services by selecting the neighbor ENDC anchor band cell as the PCell.

In an embodiment, the ENDC module 508a can be configured to prioritize ENDC anchor band cells, and perform cell selection on the prioritized ENDC anchor band cells when the UE 406 is in the RRC idle state. In the RRC idle state, the UE 406 may not connect with any of the eNBs 404a. When the UE 406 is in the RRC idle state, the ENDC module 508a receives RF signals broadcasted from the eNBs 404a of the LTE RAT. Based on the received signals, the ENDC module 508a may determine a subset of the eNBs 404a from the eNBs 404a that satisfy an S-criterion as candidate eNBs 404a for cell search. The ENDC module 508a then determines whether the candidate eNBs 404a are ENDC anchor band cells or non-ENDC anchor band cells. If at least one of the candidate eNBs 404a is an ENDC anchor band cell, the ENDC module 508a prioritizes the candidate eNB 404a (that is, an ENDC anchor band cell). The ENDC module 508a prioritizes the candidate eNB 404a (that is the ENDC anchor band cell) by assigning a higher ranking to the candidate eNB 404a compared to another candidate eNBs 404a that is a non-ENDC anchor band cell. The ENDC module 508a then performs the cell search on the prioritized candidate eNB 404a/ENDC anchor band cell. This increases a probability of the UE 406 camping on an ENDC anchor band cell for accessing NR services. The ENDC module 508a may perform the cell search according to the 3GPP specification.

In an embodiment, the ENDC module 508*a* can be configured to prioritize ENDC anchor band cells and perform cell reselection on the prioritized ENDC anchor band cells. When the UE 406 initiates the cell reselection for determining at least one neighbor cell for a handover, the ENDC module 508*a* receives information about neighbor cells of an initially selected PCell. The neighbor cells include eNBs 404*a* that support the gNBs 404*b* of the NR RAT (ENDC anchor band cells) and eNBs 404*a* that do not support the gNBs 404*b* of the NR RAT (non-ENDC anchor band cells). The ENDC module 508*a* identifies at least one neighbor ENDC anchor band cell and at least one neighbor non-ENDC anchor band cell from the neighbor cells. The ENDC module 508*a* then prioritizes the neighbor ENDC anchor band cell, even though the neighbor non-ENDC anchor band cell has higher measured values compared to the neighbor ENDC anchor band cell. The ENDC module 508*a* prioritizes the neighbor ENDC anchor band cell by assigning a higher ranking to the neighbor ENDC anchor band cell compared to the neighbor non-ENDC anchor band cell of the candidate eNBs 404*a*. On prioritizing the neighbor ENDC anchor band cell, the ENDC module 508*a* performs the cell reselection on the prioritized neighbor ENDC anchor band cell. This increases a probability of the UE 406 camping on an ENDC anchor band cell for accessing the NR services.

The NR DC module 508*b* can be configured to manage accessing NR services when the UE 406 is operating in the NR standalone network 400*b* that supports NR DC.

In an embodiment, the NR DC module 508*b* can be configured to select a stable cell combination for the UE 406 to access stable NR DC services. When the UE 406 is connected with an MCG and an SCG in the CA mode, the NR DC module 508*b* determines whether a combination of the MCG and the SCG is a stable cell combination or an unstable cell combination based on frequency ranges supported by the MCG and the SCG. The NR DC module 508*b* determines that the combination of the MCG and the SCG is a stable cell combination if the MCG and the SCG support the same frequency range. The NR DC module 508*b* determines that the combination of the MCG and the SCG is an unstable cell combination if the MCG and the SCG support different frequency ranges. On determining that the combination of the MCG and the SCG is a stable cell combination, the UE 406 continues to access NR services through the MCG. On determining that the combination of the MCG and the SCG is an unstable cell combination, the UE 406 determines whether the SCG is a stable cell or an unstable cell. The stable cell can be a gNB that supports at least one other gNB of the same frequency range. The unstable cell can be a gNB that support at least one other gNB of a different frequency range. The NR DC module 508*b* uses at least one heuristic learning model to determine whether the SCG is a stable cell or an unstable cell. In an example, the heuristic learning module can be at least one of a machine learning method, a deep learning method, a neural network method, and so on.

In an embodiment, the learning model can employ at least one learning method to determine a stable cell or an unstable cell for the UE 406. At least one of a plurality of modules may be implemented through the learning model. A function associated with the learning may be performed through a non-volatile memory, a volatile memory, and a processor.

The processor may include at least one processor. At this time, the processor may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The processor controls processing of input data in accordance with a predefined operating rule or learning model stored in the non-volatile memory and the volatile memory. The predefined operating rule or learning model is provided through training or learning.

Here, being provided through learning means by applying a learning method to a plurality of learning data, a predefined operating rule or AI model of a desired characteristic is made. The learning may be performed in the UE 406 itself in which the learning according to an embodiment is performed, and/or may be implemented through a separate server/system.

The learning model may include a plurality of neural network layers. Each layer has a plurality of weight values, and performs a layer operation through calculation of a previous layer and an operation of a plurality of weights. Examples of a neural network include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning method is used for training the UE 406 using a plurality of learning data that cause, allow, or control the UE 406 to determine a stable cell or an unstable cell. Examples of the learning method include, but are not limited to, supervised learning, unsupervised learning, semi-supervised learning, or reinforcement learning.

On determining that the SCG is an unstable cell, the NR DC module 508*b* enables the UE 406 to continue to access NR DC services through the MCG. On determining that the SCG is a stable cell, the NR DC module 508*b* measures at least one factor of the SCG to obtain measured values of the factor of the SCG. The NR DC module 508*b* prepares a measurement report for the events A3 and/or A5. The measurement report includes only the measured values of the SCG, which is a stable cell. The NR DC module 508*b* sends the measurement report for the SCG to the MCG for the events A3 and/or A5. The MCG may further switch the MCG for the UE 406 on receiving the measurement report for the events A3 and/or A5 from the NR DC module 508*b* of the UE 406. The MCG sends a handover preparation message to the gNB 404*b* supported by the SCG, based on the received measurement report for the events A3 and/or A5. The gNB 404*b* supported by the SCell may further support NR DC. The MCG sends an RRC Connection Reconfiguration with a handover command to the NR DC module 508*b*, on receiving an acknowledgment from the neighbor gNB 404*b* (supported by the SCG) in response to the handover preparation message.

On receiving the RRC Connection Reconfiguration with the handover command, the NR DC module 508*b* reconfigures the UE 406 and sends the RRC Connection Reconfiguration complete message to the gNB 404*b* supported by the SCG (that is the stable cell). Thereafter, the NR DC module 508*b* receives the RRC Connection Reconfiguration from the gNB 404*b* supported by the SCG, wherein the RRC Connection Reconfiguration received from the gNB 404*b* supported by the SCG includes information about an NR DC addition. On receiving the configurations of the gNB 404*b* of the NR RAT that is supported by the SCG, the NR DC module 508*b* enables the UE 406 to connect with the gNB 404*b* supported by the SCG as the MCG and the SCG as the stable cell combination. The NR DC module 508*b* further enables the UE 406 to access the stable NR DC services by connecting with the stable cell combination.

In an embodiment, the NR DC module 508*b* can be configured to select an NR DC band cell as a PCell for the UE 406 to access NR DC services in the RRC connected state. When the UE 406 is in the RRC connected state, the UE 406 may be initially connected with a PCell. In such a scenario, the NR DC module 508*b* receives at least one input from a user for an activation of the CA mode. The NR DC module 508*b* activates the CA mode in the UE 406. On activating the CA mode, the NR DC module 508*b* requests and receives from the PCell an RRC Connection Reconfiguration for a SCell. The NR DC module 508*b* performs RRC reconfigurations according to 3GPP specification, and sends an RRC Connection Reconfiguration Complete message to the PCell. On sending the RRC Connection Reconfiguration Complete message, the NR DC module 508*b* receives a MAC element from the PCell for activation of the SCell. Based on the received MAC element, the NR DC module 508*b* enables the UE 406 to connect with the SCell. When the UE 406 connects with the SCell, the NR DC module 508*b* starts receiving data from the SCell over a PDSCH. Thus, the UE 406 connects with both the PCell and the SCell.

In an embodiment, the NR DC module 508*b* can be configured to select an NR DC band cell as a PCell when the UE 406 wants to access NR services by establishing NR DC. When the UE 406 connects with both a PCell and an SCell, the NR DC module 508*b* may identify a trigger initiated by a user for accessing NR DC services. On identifying the trigger, the NR DC module 508*b* determines whether the PCell is an NR DC band cell or a non-NR DC band cell. If the PCell cell is an NR DC band cell, the NR DC module 508*b* enables the UE 406 to continue to access NR services through the PCell as specified in 3GPP specification. If the PCell is a non-NR DC band cell, the NR DC module 508*b* determines whether at least one connected SCell is an NR DC band cell or a non-NR DC band cell. If the connected SCell is a non-NR DC band cell, the NR DC module 508*b* enables the UE 406 to continue to access current communication services through the connected PCell.

If the connected SCell is an NR DC band cell, the NR DC module 508*b* performs a measurement operation to determine measured values of the PCell and the SCell. The measured values can be related to at least one of, but not limited to, radio link quality, signal strength, power, and so on, of the PCell and the SCell. The NR DC module 508*b* then prepares a measurement report including the measured values of the PCell and the SCell for the event A2. The NR DC module 508*b* may modify the measured values of the PCell and the SCell in the measurement report if a difference between the measured values of the PCell and the SCell is less than or equal to a measurement threshold. The NR DC module 508*b* sends the measurement report with the modified measured values for the event A2 to the PCell. Alternatively, the NR DC module 508*b* may send the measurement report for the event A2 to the PCell without modifying the measured values of the PCell and the SCell if the difference between the measured values of the PCell and the SCell is greater than the measurement threshold.

The NR DC module 508*b* may receive RRC Connection Reconfiguration with a handover indication to the SCell from the PCell when the PCell (the non-NR DC band cell) and the SCell (the NR DC band cell) are swapped based on the measurement report. On receiving the RRC Connection Reconfiguration with the handover indication to the SCell, the NR DC module 508*b* reconfigures the UE 406 based on the 3GPP TS 38.331. On reconfiguring the UE 406, the NR DC module 508*b* sends a RRC Connection Reconfiguration complete message to the SCell (a PCell after the swapping). Thereafter, the NR DC module 508*b* receives the RRC Connection Reconfiguration from the SCell, wherein the RRC Connection Reconfiguration received from the SCell includes configurations of an additional gNB 404*b* of the NR RAT supported by the PCell and the SCell. The additional gNB 404*b* may support the NR DC. On receiving the configurations of the gNB 404*b* of the NR RAT that is supported by the SCell, the NR DC module 508*b* enables the UE 406 to connect with the SCell (an NR DC band cell) as the PCell and to access the NR services from the SCell that is connected as the PCell. Thus, the UE 406 may access the NR DC services by selecting the NR DC band cell as the PCell.

In an embodiment, the NR DC module 508*b* can be configured to select a non-NR DC band cell as a PCell when the UE 406 does not want access to NR services by establishing NR DC. The NR DC module 508*b* may identify a trigger initiated in the UE 406 for the NR services without establishing NR DC when the UE 406 is connected to a PCell and a SCell in the CA mode. On identifying the trigger for the NR services without establishing the NR DC, the NR DC module 508*b* determines whether the PCell is an NR DC band cell or a non-NR DC band cell. If the PCell/serving cell is a non-NR DC band cell, the NR DC module 508*b* enables the UE 406 to continue to access the NR services through the PCell as specified in 3GPP specification (i.e., without establishing the NR DC). If the PCell is an NR DC band cell, the NR DC module 508*b* determines whether at least one connected SCell is an NR DC band cell or a non-NR DC band cell. If the connected SCell is an NR DC band cell, the NR DC module 508*b* enables the UE 406 to continue to access current communication services through the connected PCell.

If the SCell is a non-NR DC band cell, the NR DC module 508*b* determines measured values of the PCell and the SCell. The measured values can be related to at least one of, but not limited to, radio link quality, signal strength, power, and so on, of the PCell and the SCell. The NR DC module 508*b* then prepares a measurement report including the measured values of the PCell and the SCell for the event A2. The NR DC module 508*b* may modify the measured values of the PCell and the SCell in the measurement report if a difference between the measured values of the PCell and the SCell is less than or equal to a measurement threshold. The NR DC module 508*b* sends the measurement report with the modified measured values for the event A2 to the PCell. The NR DC module 508*b* may send the measurement report for the event A2 to the PCell without modifying the measured values of the PCell and the SCell if the difference between the measured values of the PCell and the SCell is greater than the measurement threshold.

The NR DC module 508*b* may receive an RRC Connection Reconfiguration with a handover indication to the SCell from the PCell, when the PCell (an NR band cell) and the SCell (a non-NR DC band cell) based on the measurement report. On receiving the RRC Connection Reconfiguration with the handover indication to the SCell, the NR DC module 508*b* reconfigures the UE 406 and enables the UE 406 to connect with the SCell (a non-NR DC band cell) as a PCell. On reconfiguring the UE 406, the NR DC module 508*b* sends an RRC Connection Reconfiguration complete message to the SCell (a PCell after the swapping). Thereafter, the NR DC module 508*b* enables the UE 406 to connect with the SCell as the PCell and to access the NR services from the SCell without establishing the NR DC. Thus, the UE 406 may access the NR services without establishing the NR DC by selecting the non-NR DC band cell as the PCell.

In an embodiment, the NR DC module 508*b* can be configured to select at least one neighbor NR DC band cell for the UE 406 to access NR services when the UE 406 is connected only to a PCell cell that is a non-NR DC band cell. When the UE 406 is in the RRC connected state and the CA is not activated on the UE 406, the UE 406 may be connected only to a PCell cell. In such a scenario, the NR DC module 508*b* may enable the UE 406 to receive an RRC Connection Reconfiguration from the PCell, wherein the RRC Connection Reconfiguration includes configurations of at least one neighbor cell. The neighbor cell can be a gNB 404*b*. The NR DC module 508*b* may reconfigure the UE 406 using the received RRC Connection Reconfiguration, and send an RRC Connection Reconfiguration Complete message to the PCell, thereby enabling the UE 406 to receive data from the PCell over a PDSCH.

The NR DC module 508*b* may identify a trigger for accessing NR DC services when the UE 406 is connected with the PCell. After identifying the trigger for accessing the NR DC services, the NR DC 508*b* determines at least one neighbor NR DC band cell and at least one neighbor non-NR DC band cell using the received configurations of the neighbor cells from the PCell. The NR DC module 508*b* prepares a measurement report for the neighbor NR DC band cell first for reporting of the events A3 and A5. The measurement report includes measured values of only the neighbor NR DC band cell. The NR DC module 508*b* sends the measurement report for the events A3 and/or A5 to the PCell. The PCell may further send a handover preparation message to the neighbor NR DC band cell, on receiving the events A3 and/or A5 from the NR DC module 508*b* of the UE 406. The PCell sends an RRC Connection Reconfiguration with a handover command to the NR DC module 508*b* of the UE 406, on receiving an acknowledgment from the neighbor NR DC band cell in response to the handover preparation message.

On receiving the RRC Connection Reconfiguration with the handover command, the NR DC module 508*b* reconfigures the UE 406, and sends an RRC Connection Reconfiguration Complete message to the neighbor NR DC band cell. Thereafter, the NR DC module 508*b* receives RRC Connection Reconfiguration from the neighbor NR DC band cell, wherein the RRC Connection Reconfiguration received from the neighbor NR DC band cell includes configurations of a gNB 404*b* of the NR RAT that is supported by the neighbor NR DC band cell. On receiving the configurations of the gNB 404*b* of the NR RAT that is supported by the neighbor NR DC band cell, the NR DC module 508*b* enables the UE 406 to connect with the neighbor NR DC band cell as a PCell and to access the NR services from the neighbor NR DC band cell that is connected as the PCell. Thus, the UE 406 may establish the NR DC and access the NR services by selecting the neighbor NR DC band cell as the PCell.

In an embodiment, the NR DC module 508*b* can be configured to prioritize NR DC band cells and perform cell selection on the prioritized NR DC band cells, when the UE 406 is in the RRC idle state. In the RRC idle state, the UE 406 may not connect with any of gNBs 404*b* of the NR RAT. When the UE 406 is in the RRC idle state, the NR DC module 508*b* receives RF signals broadcasted from the gNBs 404*b* of the NR RAT. Based on the received RF signals, the NR DC module 508*b* may determine a subset of the gNBs 404*b* that satisfies an S-criterion as candidate gNBs 404*b* for cell search. The NR DC module 508*b* then determines whether the candidate gNBs 404*b* are NR DC band cells or non-NR DC band cells. If at least one of the candidate gNBs 404*b* is an NR DC band cell, the NR DC module 508*b* prioritizes the candidate gNB 404*b* (that is, an NR DC band cell). The NR DC module 508*b* prioritizes the candidate gNB 404*b* by assigning a higher ranking to the candidate gNB 404*b*, compared to other candidate gNBs that are non-NR DC band cells. The NR DC module 508*b* then performs cell search on the prioritized candidate gNB 404*b*/NR DC band cell. This increases a probability of camping by the UE 406 on an NR DC band cell for accessing the NR services by establishing NR DC. The NR DC module 508*b* may perform the cell search according to 3GPP specification.

In an embodiment, the NR DC module 508*b* can be configured to prioritize NR DC band cells, and perform cell reselection on the prioritized NR DC band cells. When the UE 406 initiates the cell reselection for determining at least one neighbor cell for a handover, the NR DC module 508*b* receives information about a plurality of neighbor cells from an initially selected PCell. The neighbor cells includes gNBs 404*b* that support NR DC (neighbor NR DC band cells) and gNBs 404*b* that do not support the NR DC (neighbor non-NR DC band cells). The NR DC module 508*b* identifies at least one neighbor NR DC band cell and at least one neighbor non-NR DC band cell from the neighbor cells. The NR DC module 508*b* then prioritizes the neighbor NR DC band cell, even though the neighbor non-NR DC band cell has higher measured values compared to the neighbor NR DC band cell. The NR DC module 508*b* prioritizes the neighbor NR DC band cell by assigning a higher ranking to the neighbor NR DC band cell, compared to other neighbor non-NR DC band cells. After prioritizing the neighbor NR DC band cell, the NR DC module 508*b* performs the cell reselection on the prioritized the neighbor NR DC band cell. Therefore, increasing a probability of camping by the UE 406 on an NR DC band cell for accessing the NR services by establishing NR DC.

FIG. 5 shows a plurality of components of the UE 406. In other embodiments, the UE 406 may include more or less number of components. Further, the labels or names of the components are used only for illustrative purpose and does not limit the scope of the embodiments herein. One or more components can be combined together to perform the same or substantially similar function in the UE 406.

Figure 6:
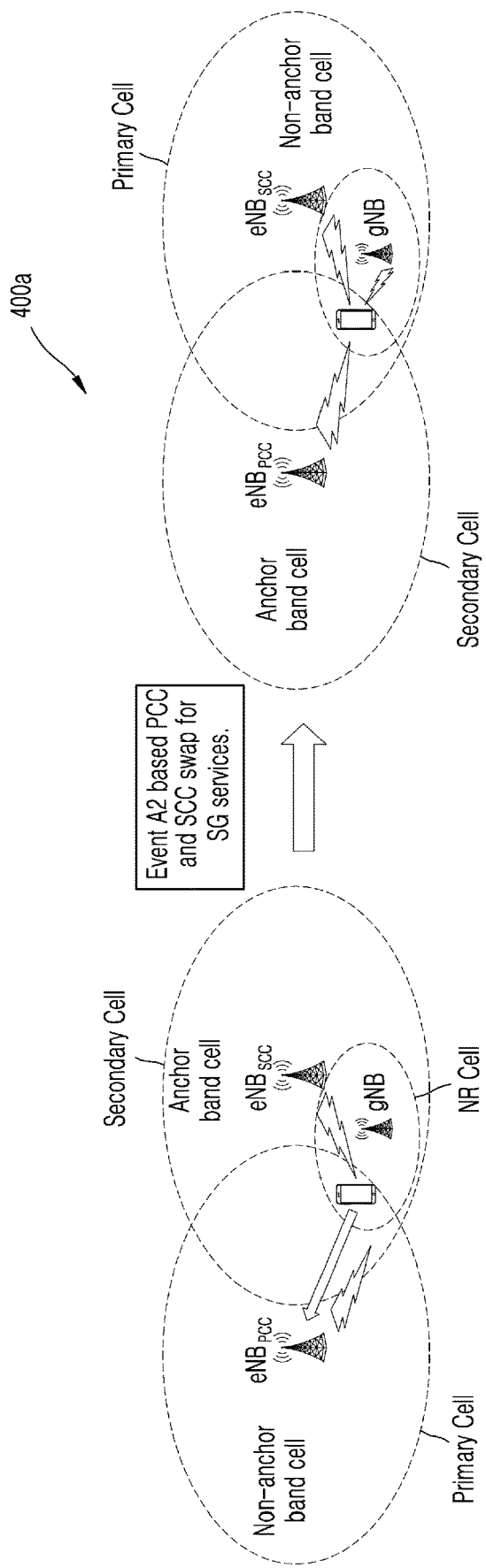
FIG. 6 is an example diagram depicting swapping of a Primary Cell (PCell) and a Secondary Cell (SCell) for a UE to access NR services in an NR NSA network supporting ENDC, according to embodiments.

FIG. 6 is an example diagram depicting swapping of a PCell and a SCell for the UE 406 to access NR services in the NR NSA network 400*a* supporting ENDC, according to embodiments.

Consider an example scenario, wherein the UE 406 is connected with a PCell and an SCell in the CA mode. The PCell and the SCell are eNBs 404*a* of the LTE RAT. In an example herein, consider that the PCell is a non-ENDC anchor band cell that does not support at least one gNB 404*b* of the NR RAT for providing NR services to the UE 406 and the SCell is an ENDC anchor band cell supporting the gNB 404*b* of the NR RAT. In such a scenario, when the UE 406 wants to access the NR services, the UE 406 sends a measurement report for an event A2 to the PCell. In an embodiment, the measurement report includes measured values of the PCell and the SCell. In an embodiment, the measurement report includes modified measured values of the PCell and the SCell.

When receiving the measurement report for the event A2, the PCell and the SCell are swapped, since the PCell is a non-ENDC anchor band cell and the SCell is an ENDC anchor band cell. When swapping the PCell and the SCell, the UE 406 connects with the SCell as a PCell, which adds the supported gNB 404b for the UE 406. Therefore, the UE 406 may access the NR services from the SCell which is an ENDC anchor band cell and connected as the PCell.

Figure 7:
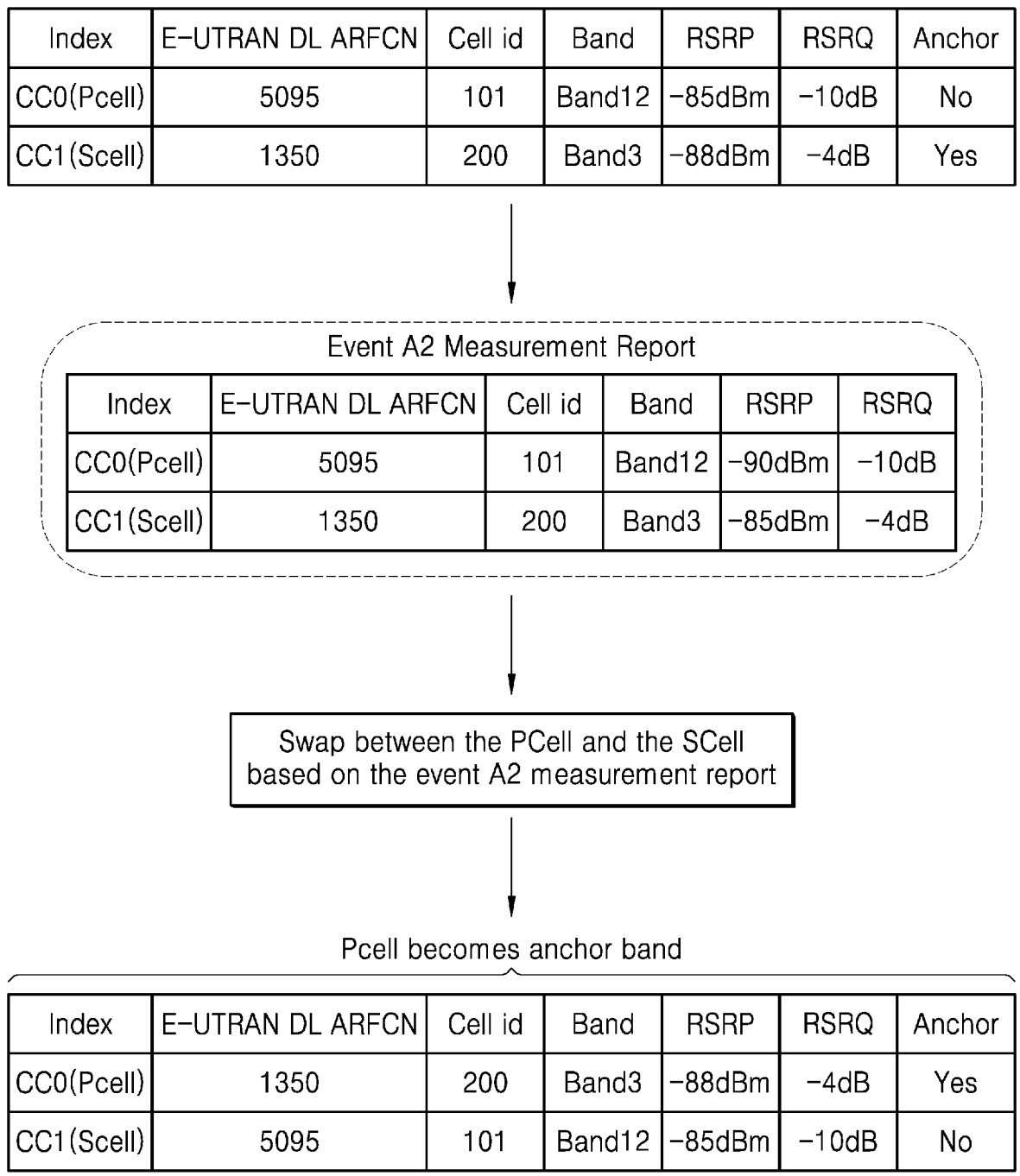
FIG. 7 is an example diagram depicting preparation of a measurement report for swapping a PCell and an SCell in an NR NSA network supporting ENDC, according to embodiments.

FIG. 7 is an example diagram depicting preparation of a measurement report for swapping a PCell and an SCell in the NR NSA network 400a supporting ENDC, according to embodiments.

In an example herein consider that in the CA mode, the UE 406 is connected with a PCell, which is a non-ENDC anchor band cell, and an SCell, which is an ENDC anchor band cell. In such a scenario, when the UE 406 wants to access NR services, the UE 406 prepares a measurement report for the PCell and the SCell. The measurement report includes measured values of at least one factor related to the PCell and the SCell. In an example herein as depicted in FIG. 7, the factor can be an RSRQ, an RSRP, and so on.

When preparing the measurement report, the UE 406 checks a difference between measured values of the PCell and measured values of the SCell with a measurement threshold. In an example herein, consider that the measurement threshold can be 5 decibels (dB). If the difference between the measured values of the PCell and the measured values of the SCell is less than or equal to 5 dB, the UE 406 modifies the measured values of the factor of the PCell and/or the SCell. In an example herein as depicted in FIG. 7, the UE 406 decreases the measured values of the RSRP of the PCell and increases the measured values of the SCell. The UE 406 sends the measurement report with the modified measured values of the PCell and/or the SCell to the PCell for an event A2.

If the difference between the measured values of the PCell and the measured values of the SCell is greater than 5 dB, the UE 406 sends the measurement report for the event A2 to the PCell without modifying the measured values of the PCell and the SCell.

On receiving the measurement report, the PCell (non-ENDC anchor band cell) and the SCell (an ENDC anchor band cell) are swapped. Thus, the UE 406 may access the NR services by connecting to the SCell as the PCell.

Figure 8:
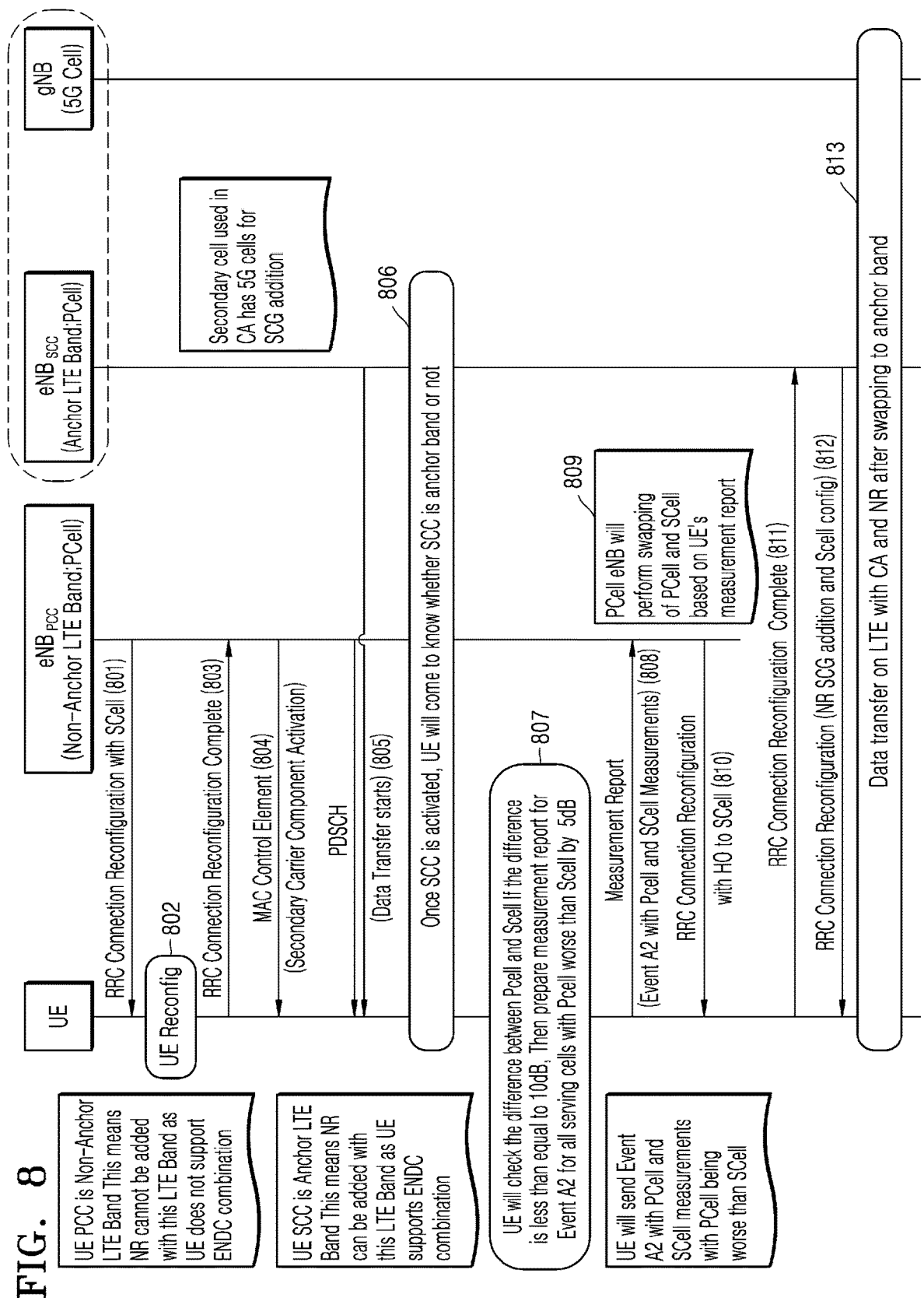
FIG. 8 is a sequence diagram depicting swapping between a PCell and an SCell for a UE to access NR services in an NR NSA network supporting ENDC, when the PCell is a non-ENDC anchor band cell and the SCell is an ENDC anchor band cell, according to embodiments.

FIG. 8 is a sequence diagram depicting swapping between a PCell and an SCell for the UE 406 to access NR services in the NR NSA network 400a supporting ENDC, when the PCell is a non-ENDC anchor band cell and the SCell is an ENDC anchor band cell, according to embodiments.

In an example herein, consider that the UE 406 is initially connected to a PCell (eNB 404a) which is a non-ENDC anchor band cell that does not support a gNB 404b of the NR RAT for providing the NR services to the UE 406. In such a scenario, the UE 406 can connect with at least one SCell (eNB 404a) in the CA mode. For connecting with the SCell, at step 801, the UE 406 receives an RRC Connection Reconfiguration for the SCell from the PCell. At step 802, the UE 406 performs a reconfiguration based on the received RRC Connection Reconfiguration. At step 803, the UE 406 sends an RRC Connection Reconfiguration Complete message to the PCell. At step 804, in response to the RRC Connection Reconfiguration Complete message, the PCell sends a MAC element to the UE 406 by activating the SCell. The UE 406 uses the MAC element to connect with the SCell. At step 805, the UE 406 starts receiving data from the SCell over a PDSCH when connected with the SCell. Thus, the UE 406 connects with both the PCell and the SCell.

When the UE 406 wants to access the NR services when connected with the PCell and the SCell, at step 806, the UE 406 determines whether the SCell is an ENDC anchor band cell or a non-ENDC anchor band cell. In an example herein, consider that the SCell is an ENDC anchor band cell. When the SCell is an ENDC anchor band cell, at step 807, the UE 406 prepares a measurement report for the PCell and the SCell for an event A2. On preparing the measurement report, the UE 406 determines a difference between measured values of the PCell and measured values of the SCell, and compares the difference with a measured threshold. If the difference is greater than the measurement threshold, the UE 406 does not modify the measured values of the PCell and/or the SCell. If the difference is less than or equal to the measurement threshold, the UE 406 modifies the measured values of the PCell and/or the SCell.

At step 808, the UE 406 sends the measurement report for the event A2 to the PCell. At step 809, the PCell and the SCell are swapped for the UE 406. Thus, the SCell, which is an ENDC anchor band cell, becomes a PCell and the PCell, which is a non-ENDC anchor band cell, becomes a SCell for the UE 406. At step 810, the PCell sends an RRC Connection Reconfiguration with a handover indication to the UE 406. At step 812, the UE 406 performs reconfiguration and sends an RRC Connection Reconfiguration complete message to the SCell (a PCell after the swapping).

At step 812, the SCell sends the RRC Connection Reconfiguration (a PCell after the swapping), wherein the RRC Connection Reconfiguration sent from the SCell includes configurations of the SCell and a gNB 404b of the NR RAT that is supported by the SCell. At step 813, the UE 406 can connect with the SCell (an ENDC anchor band cell) as the PCell, and access the NR services using the SCell that is connected as the PCell after receiving the configurations of the SCell and the gNB 404b of the NR RAT that is supported by the SCell. Thus, the UE 406 may access the NR services by selecting the ENDC anchor band cell as the PCell.

Figure 9:
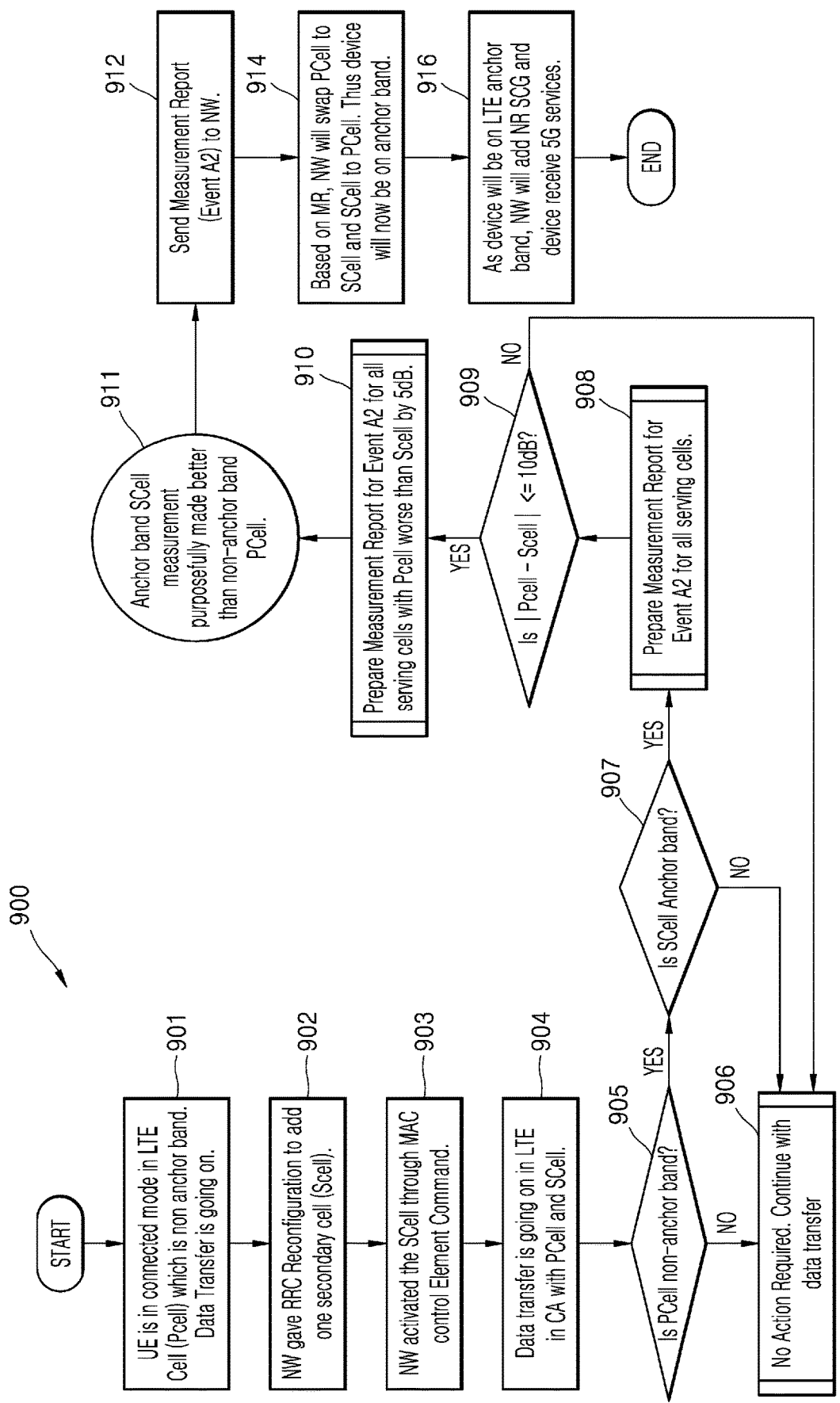
FIG. 9 is a flow diagram depicting a method for accessing NR services by swapping a PCell and an SCell, according to embodiments.

FIG. 9 is a flow diagram 900 depicting a method for accessing NR services by swapping a PCell and a SCell, according to embodiments. At step 901, the UE 406 connects to a PCell, which is a non-ENDC anchor band cell, and performs data transfer with the connected PCell. At step 902, the UE 406 receives an RRC Connection Reconfiguration from the PCell or a connected network for adding a SCell. At step 903, the PCell and/or the network activates the SCell for the UE 406 based on a MAC element. At step 904, the UE 406 connects with the PCell and the SCell in the CA mode for data transfer.

When the UE 406 wants to access NR services, at step 905, the UE 406 checks if the PCell is an ENDC anchor band cell or a non-ENDC anchor band cell. If the PCell is an ENDC anchor band cell, at step 906, the UE 406 continues to perform data transfer with the PCell. If the PCell is a non-ENDC anchor band cell, at step 907, the UE 406 checks if an SCell is an ENDC anchor band cell or a non-ENDC anchor band cell. If the SCell is a non-ENDC anchor band cell, the UE 406 performs step 906.

If the PCell is a non-ENDC anchor band cell and the SCell is an ENDC anchor band cell, at step 908, the UE 406 prepares a measurement report for an event A2. The measurement report includes measured values of the PCell and measured values the SCell. When preparing the measurement report, at step 909, the UE 406 determines a difference between the measured values of the PCell and the measured values of the SCell, and compares the difference with a measured threshold. If the difference is greater than the measurement threshold, the UE 406 performs step 906. If the difference is less than or equal to the measurement threshold, at step 910, the UE 406 decides to modify the measured values of the PCell and/or the measured values of the SCell in the measurement report. At step 911, the UE 406 decreases the measured values of the PCell and increases the measured values of the SCell.

At step 912, the UE 406 sends the measurement report with the modified measured values to the PCell for the event A2. At step 913, the PCell (non-ENDC anchor band cell) and the SCell (an ENDC anchor band cell) are swapped for the UE 406. At step 914, the UE 406 may connect with the SCell (an ENDC anchor band cell) as a PCell, and the SCell may add a supported gNB 404b of the NR RAT for the UE 406. Thus, the UE 406 can access the NR services by connecting with the ENDC anchor band cell. The various steps in method 900 may be performed in the order presented, in a different order or simultaneously. Further, in some embodiments, one or more steps shown in FIG. 9 may be omitted.

Figure 10:
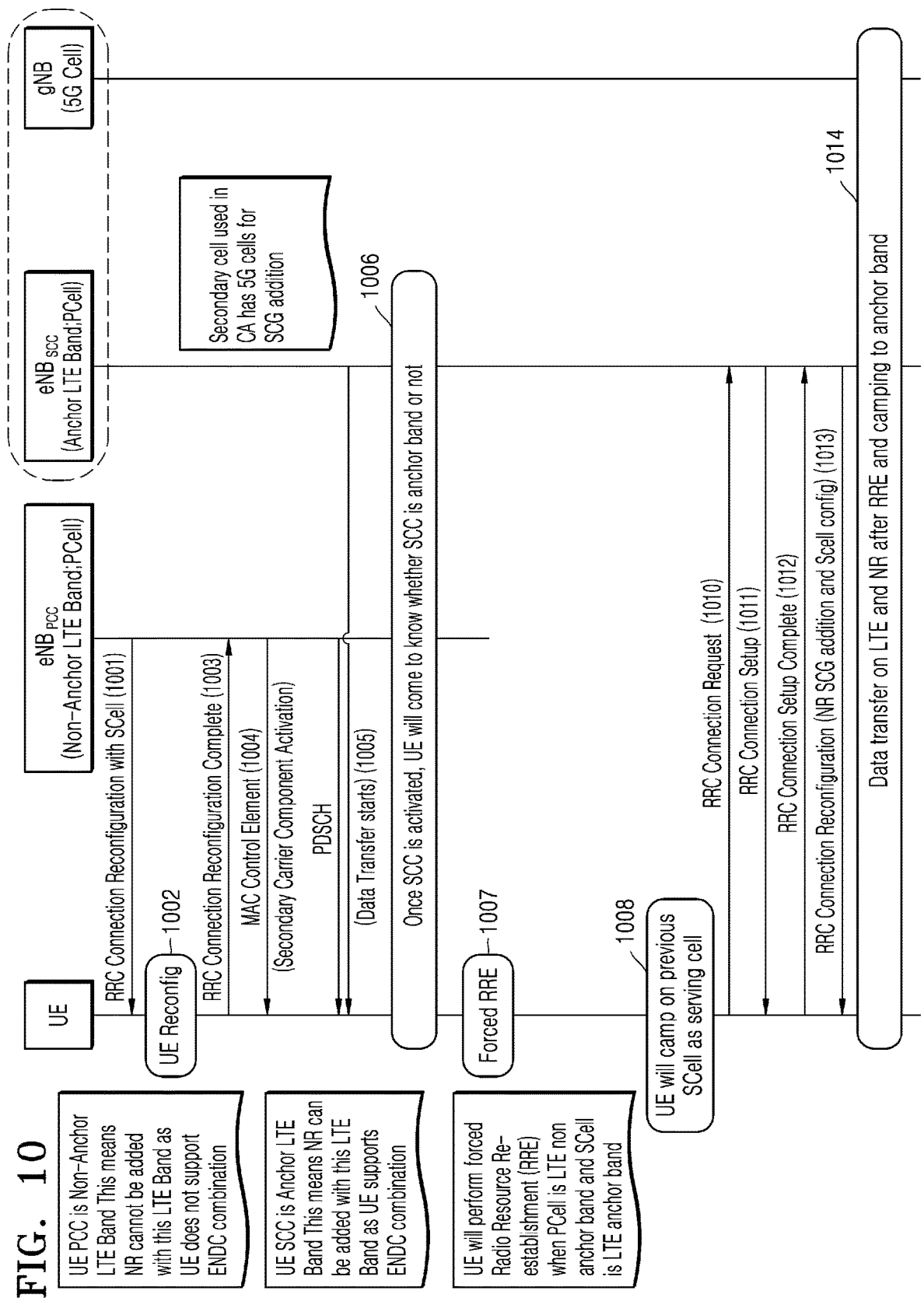
FIG. 10 is an example sequence diagram depicting accessing NR services by performing a forced radio resource establishment (RRE) in an NR NSA network supporting ENDC, according to embodiments.

FIG. 10 is an example sequence diagram depicting accessing NR services by performing a forced RRE in the NR NSA network 400a supporting ENDC, according to embodiments.

In an example herein, consider that the UE 406 is initially connected to a PCell (eNB 404a) which is a non-ENDC anchor band cell that does not support a gNB 404b of the NR RAT for providing NR services to the UE 406. In such a scenario, the UE 406 can connect with at least one SCell/eNB 404a in the CA mode. For connecting with the SCell, at step 1001, the UE 406 receives an RRC Connection Reconfiguration for the SCell from the PCell. At step 1002, the UE 406 performs a reconfiguration based on the received RRC Connection Reconfiguration. At step 1003, the UE 406 sends an RRC Connection Reconfiguration Complete message to the PCell. At step 1004, in response to the RRC Connection Reconfiguration Complete message, the PCell sends a MAC element to the UE 406 by activating the SCell. The UE 406 uses the MAC element to connect with the SCell. At step 1005, the UE 406 starts receiving data from the SCell over a PDSCH when connected with the SCell. Thus, the UE 406 connects with both the PCell and the SCell.

When the UE 406 wants to access the NR services when connected with the PCell and the SCell, at step 1006, the UE 406 determines whether the SCell is an ENDC anchor band cell or a non-ENDC anchor band cell. In an example herein, consider that the SCell is an ENDC anchor band cell. When the SCell is an ENDC anchor band cell and the PCell is a non-ENDC anchor band cell, at step 1007, the UE 406 decides to perform a forced RRE. At step 1008, the UE 406 camps onto a previously connected SCell as a serving cell. At step 1009, the UE 406 sends an RRC connection request to the currently connected SCell (an ENDC anchor band cell) after camping onto the previously connected SCell. At step 1010, the SCell sends an RRC connection setup to the UE 406. At step 1011, the UE 406 performs a reconfiguration and sends an RRC Connection Setup Complete message to the SCell. At step 1012, the SCell sends the RRC Connection Reconfiguration to the UE 406, wherein the RRC Connection Reconfiguration received from the SCell includes configurations of the SCell and a gNB 404b of the NR RAT that is supported by the SCell. At step 1013, the UE 406 connects with the SCell (an ENDC anchor band cell) and accesses the NR services to perform data transfer through the SCell after receiving the configurations of the SCell and the gNB 404b of the NR RAT that is supported by the SCell. Thus, the UE 406 may access the NR services by forcefully camping onto the SCell that is an ENDC anchor band cell.

Figure 11:
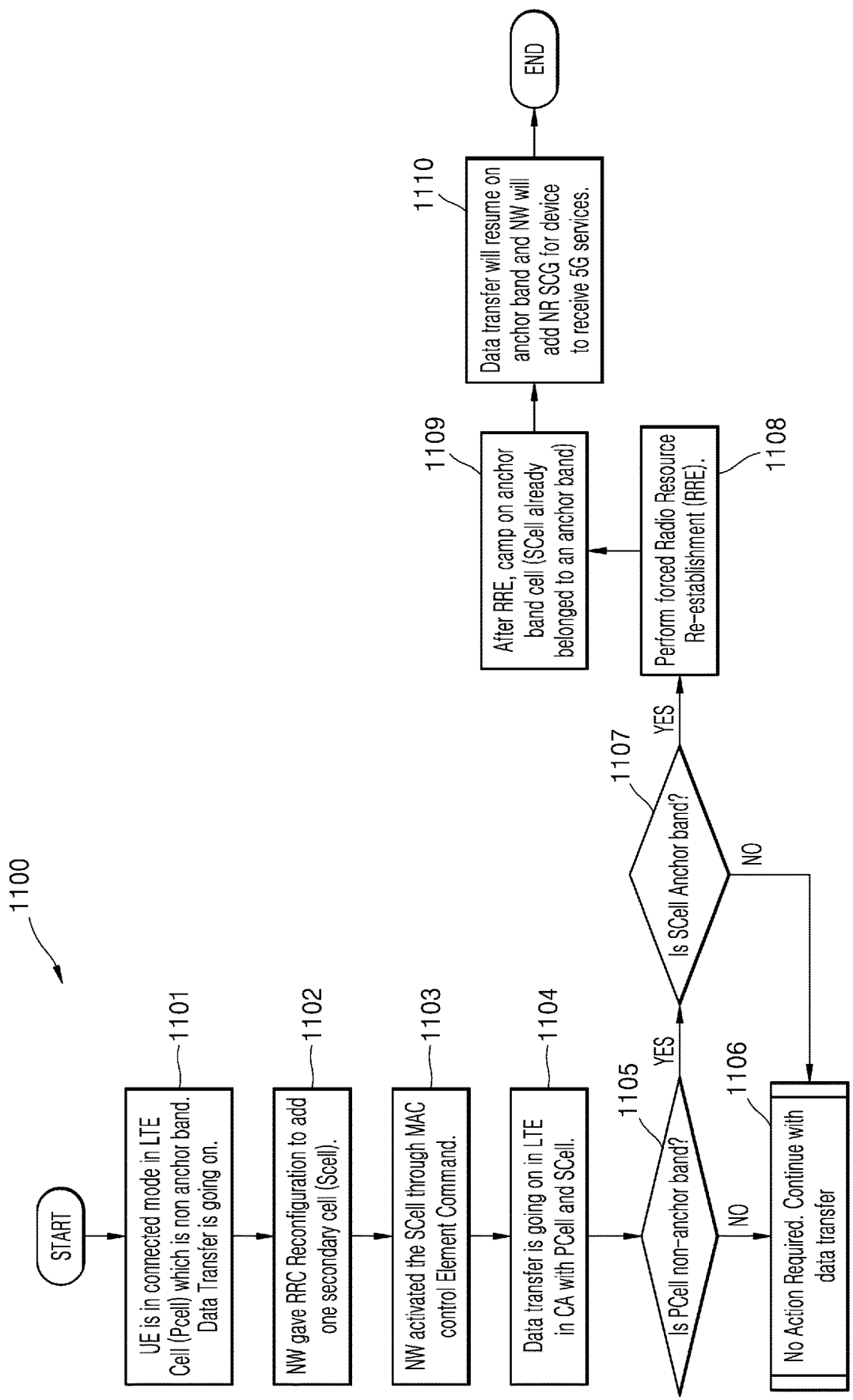
FIG. 11 is a flow diagram depicting a method for accessing NR services by performing a forced RRE in an NR NSA network supporting ENDC, according to embodiments.

FIG. 11 is a flow diagram 1100 depicting a method for accessing NR services by performing a forced RRE in the NR NSA network 400a supporting ENDC, according to embodiments. At step 1101, the UE 406 connects to a PCell, which is a non-ENDC anchor band cell, and performs data transfer with the connected PCell. At step 1102, the UE 406 receives an RRC Connection Reconfiguration from the PCell and/or a connected network for adding an SCell. At step 1103, the PCell and/or the network activates an SCell for the UE 406 based on a MAC element. At step 1104, the UE 406 connects with the PCell and the SCell in the CA mode for the data transfer.

When the UE 406 wants to access NR services, at step 1105, the UE 406 determines whether the PCell is an ENDC anchor band cell or a non-ENDC anchor band cell. If the PCell is an ENDC anchor band cell, at step 1106, the UE 406 continues to perform the data transfer with the PCell. If the PCell is a non-ENDC anchor band cell, at step 1107, the UE 406 determines whether the SCell is an ENDC anchor band cell or a non-ENDC anchor band cell. If the SCell is a non-ENDC anchor band cell, the UE 406 performs step 1106.

If the PCell is a non-ENDC anchor band and the SCell is an ENDC anchor band, at step 1108, the UE 406 performs a forced RRE to connect with the SCell, which is an ENDC anchor band cell. At step 1109, the UE 406 connects with the SCell (an ENDC anchor band cell) that supports the gNB 404b of the NR RAT. At step 1110, the UE 406 accesses the NR services to perform data transfer using the connected SCell (an ENDC anchor band cell). The various steps in method 1100 may be performed in the order presented, in a different order or simultaneously. Further, in some embodiments, one or more steps shown in FIG. 11 may be omitted.

Figure 12:
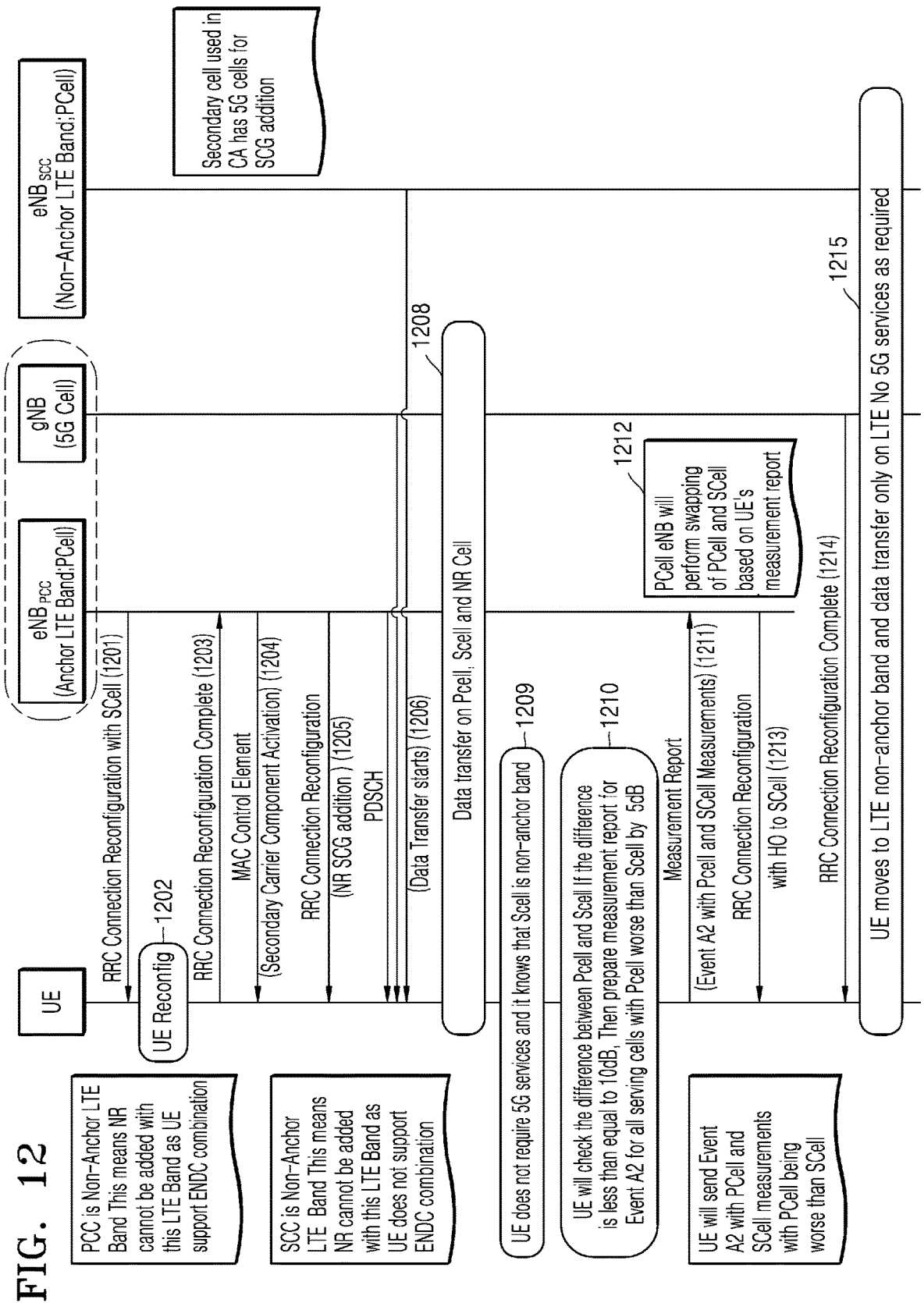
FIG. 12 is an example sequence diagram depicting swapping between a PCell and an SCell for accessing LTE services in an NR NSA network supporting ENDC, when the PCell is an ENDC anchor band cell and the SCell is a non-ENDC anchor band cell, according to embodiments.

FIG. 12 is an example sequence diagram depicting swapping between a PCell and an SCell for accessing LTE services in the NR NSA network 400a supporting ENDC, when the PCell is an ENDC anchor band cell and the SCell is a non-ENDC anchor band cell, according to embodiments.

In an example herein, consider that the UE 406 is initially connected to a PCell (eNB 404a) which is an ENDC anchor band cell that supports at least one gNB 404b of the NR RAT for providing NR services to the UE 406. In such a scenario, the UE 406 can connect with at least one SCell (eNB 404a) in the CA mode. For connecting with the SCell, at step 1201, the UE 406 receives an RRC Connection Reconfiguration for the SCell from the PCell. At step 1202, the UE 406 performs a reconfiguration based on the received RRC Connection Reconfiguration. At step 1203, the UE 406 sends an RRC Connection Reconfiguration Complete message to the PCell. At step 1204, in response to the RRC Connection Reconfiguration Complete message, the PCell sends a MAC element to the UE 406. The UE 406 uses the MAC element to connect with the SCell by activating the SCell. At step 1205, the PCell sends the RRC Connection Reconfiguration to the UE 406 for adding the SCell. At step 1206, the UE 406 sends the RRC Connection Reconfiguration Complete message to the PCell, and connects with the SCell.

At step 1207, the UE 406 starts receiving data from the SCell over a PDSCH when connected with the SCell. Thus, the UE 406 connects with both the PCell and the SCell. At step 1208, when connected with the SCell, the UE 406 determines whether the SCell is an ENDC anchor band cell or a non-ENDC anchor band cell. In an example herein, consider that the SCell is a non-ENDC anchor band cell.

At step 1209, the UE 406 wants to access only LTE services (i.e., the UE 406 does not want to access NR services). When the SCell is a non-ENDC anchor band cell and the UE 406 wants to access only the LTE services, at step 1210, the UE 406 prepares a measurement report for the PCell and the SCell for an event A2. When preparing the measurement report, the UE 406 determines a difference between measured values of the PCell and measured values of the SCell, and compares a difference with a measured threshold. If the difference is greater than the measurement threshold, the UE 406 does not modify the measured values of the PCell and/or the measured values of the SCell. If the difference is less than or equal to the measurement threshold, the UE 406 modifies the measured values of the PCell and/or the measured values of the SCell.

At step 1211, the UE 406 sends the measurement report in the event A2 to the PCell. At step 1212, the PCell and the SCell are swapped for the UE 406. Thus, the SCell (a non-ENDC anchor band cell) becomes a PCell, and the PCell (an ENDC anchor band cell) becomes a SCell for the UE 406. At step 1213, the PCell sends an RRC Connection Reconfiguration with a handover indication to the UE 406. At step 1214, the UE 406 performs a reconfiguration and sends an RRC Connection Reconfiguration Complete message to the SCell (a PCell after the swapping).

At step 1215, the UE 406 can connect with the SCell (a non-ENDC anchor band cell) as the PCell, and access only the LTE services from the SCell that is connected as the PCell. Thus, the UE 406 may access only the LTE services by selecting a non-ENDC anchor band cell as the PCell.

Figure 13:
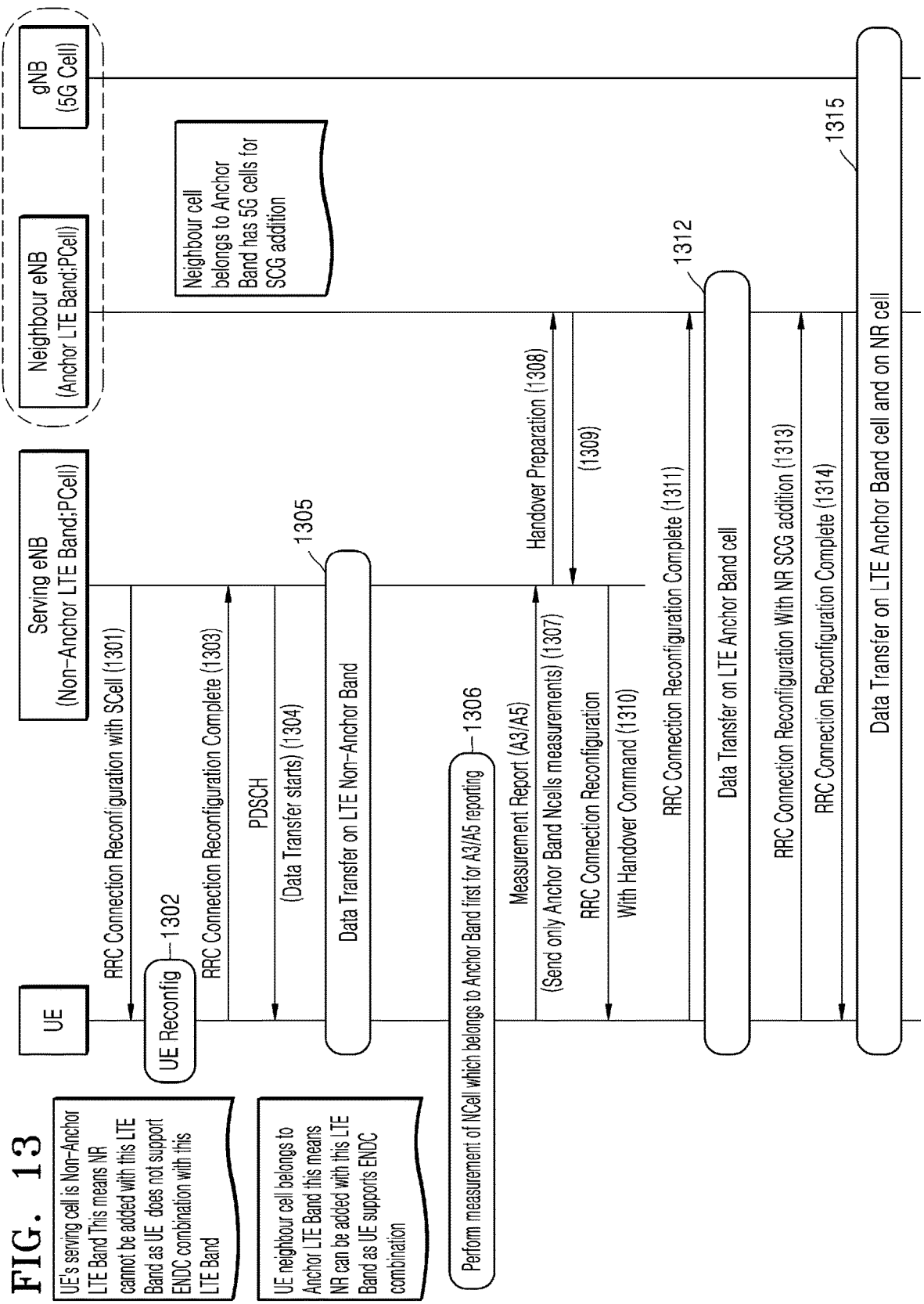
FIG. 13 is an example sequence diagram depicting selection of at least one neighbor ENDC anchor band cell for a UE to access NR service in an NR NSA network supporting ENDC, according to embodiments.

FIG. 13 is an example sequence diagram depicting selection of at least one neighbor ENDC anchor band cell for the UE 406 to access NR services in the NR NSA network 400*a* supporting ENDC, according to embodiments.

In an example herein, consider that the UE 406 is connected to only a PCell (eNB) as a serving cell) when the CA mode is not activated. The PCell is a non-ENDC anchor band cell that does not support a gNB 404*b* of the NR RAT for providing NR services to the UE 406. In such a scenario, at step 1301, the PCell sends an RRC Connection Reconfiguration to the UE 406, wherein the RRC Connection Reconfiguration includes configurations of at least one neighbor cell. At step 1302, the UE performs a reconfiguration using the received RRC Connection Reconfiguration. At step 1303, the UE 406 sends an RRC Connection Reconfiguration Complete message to the PCell. At step 1304, the UE 406 continues to receive data from the PCell over a PDSCH.

At step 1305, the UE 406 initiates a trigger for accessing NR services when the UE 406 is connected to the PCell. For accessing the NR services, the UE 406 determines at least one neighbor ENDC anchor band cell and at least one neighbor non-ENDC anchor band cell using received configurations of a plurality of neighbor cells from the PCell, as the PCell is a non-ENDC anchor band cell. At step 1306, the UE 406 prepares a measurement report for the neighbor ENDC anchor band cell first for reporting events A3 and/or A5. The measurement report includes measured values of only the neighbor ENDC anchor band cell. At step 1307, the UE 406 sends the measurement report in the events A3 and/or A5 to the PCell. At step 1308, the PCell may further send a handover preparation message to the neighbor ENDC anchor band cell. At step 1309, the PCell may receive an acknowledgment from the neighbor ENDC anchor band cell in response to the sent handover preparation message. At step 1310, the PCell sends an RRC Connection Reconfiguration with a handover command to the UE 406.

After receiving the RRC Connection Reconfiguration with the handover command, at step 1312, the UE 406 performs a reconfiguration and sends an RRC Connection Reconfiguration complete message to the neighbor ENDC anchor band cell. At step 1313, the neighbor ENDC anchor band cell sends an RRC Connection Reconfiguration to the UE 406, wherein the RRC Connection Reconfiguration received from the neighbor ENDC anchor band cell includes a configurations of a gNB 404*b* of the NR RAT that is supported by the neighbor ENDC anchor band cell. On receiving the configuration of the gNB 404*b* of the NR RAT that is supported by the neighbor ENDC anchor band cell, at step 1314, the UE 406 sends an RRC Connection Reconfiguration complete message to the neighbor ENDC anchor band cell. At step 1315, the UE 406 connects with the neighbor ENDC anchor band cell as a PCell and access the NR services from the neighbor ENDC anchor band cell that is connected as the PCell. Thus, the UE 406 may access the NR services by selecting the neighbor ENDC anchor band cell as the PCell.

Figure 14:
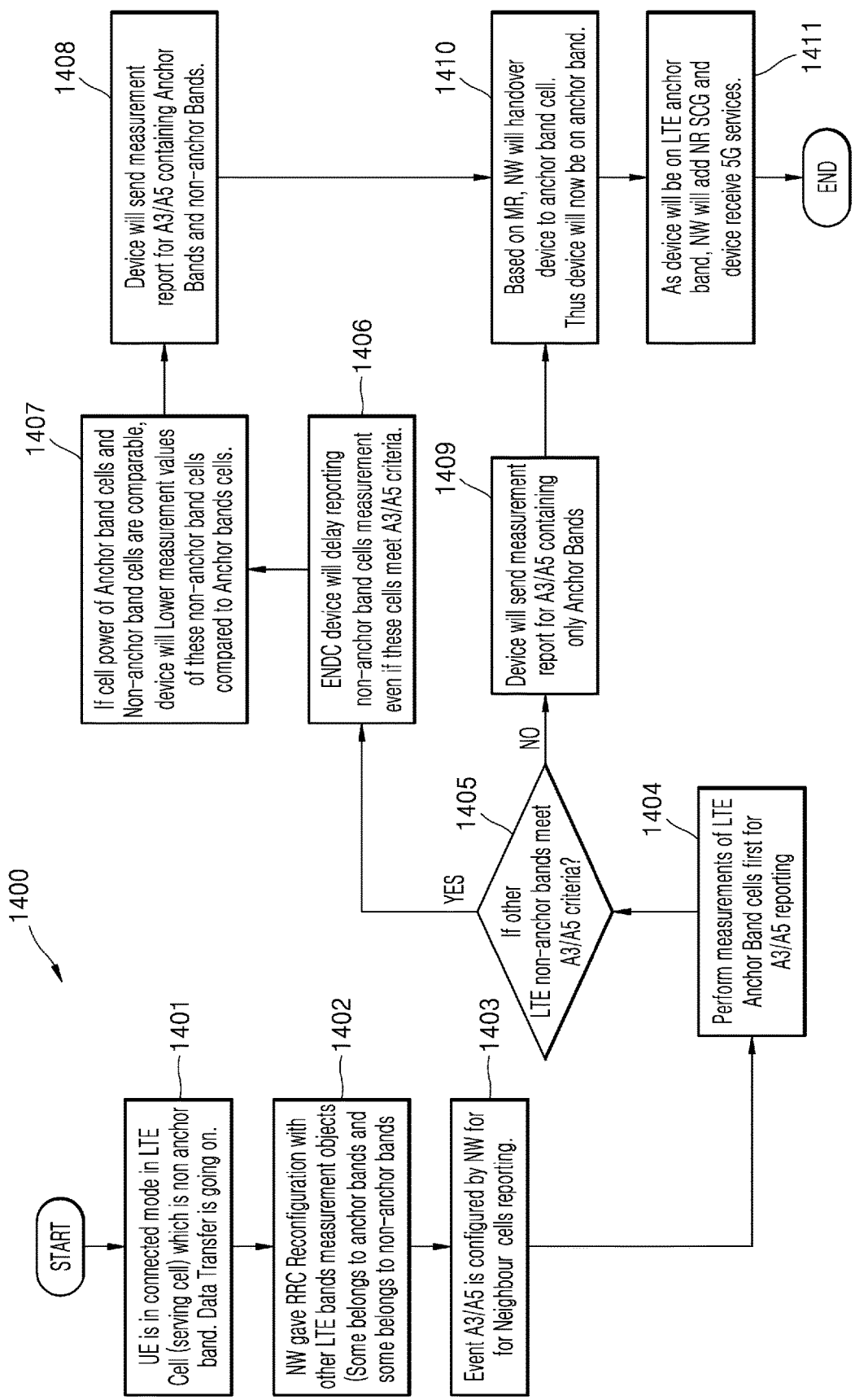
FIG. 14 is a flow diagram depicting a method for selecting at least one neighbor ENDC anchor band cell as a PCell for a UE to access NR services in an NR NSA network supporting ENDC, according to embodiments.

FIG. 14 is a flow diagram 1400 depicting a method for selecting a neighbor ENDC anchor band cell as a PCell for the UE 406 to access NR services in the NR NSA network 400*a* supporting ENDC, according to embodiments.

At step 1401, the UE 406 connects with a PCell, which is a non-ENDC anchor band cell. At step 1402, the UE 406 receives a configuration of a plurality of neighbor cells. The neighbor cells includes least one neighbor ENDC anchor band cell and at least one neighbor non-ENDC anchor band cell.

At step 1403, the UE 406 decides to prepare a measurement report for the neighbor cells that includes the neighbor ENDC anchor band cell and the neighbor non-ENDC anchor band cell for events A3 and/or A5. At step 1404, the UE 406 prepares a measurement report for the neighbor ENDC anchor band cell first. At step 1405, the UE 406 determines whether a measurement report for the neighboring non-ENDC anchor band cell satisfies the events A3 and/or A5.

If the measurement report for the neighbor non ENDC anchor band cell satisfies the events A3 and/or A5, at step 1406, the UE 406 delays/avoids sending the measurement report for the neighbor non-ENDC anchor band cell to the PCell in the events A3 and/or A5. At step 1407, the UE 406 decreases measured values of the neighbor non-ENDC anchor band cell in the measurement report, if a difference between power of the neighbor ENDC anchor band cell and power of the neighbor non-ENDC anchor band cell is less than a power threshold configured for the events A3 and/or A5. At step 1408, the UE 406 sends the measurement report including the decreased measured values for the neighbor non-ENDC anchor band cell and the measured values of the neighbor ENDC anchor band cell to the PCell.

If the measurement report for the neighbor non-ENDC anchor band cell does not satisfy the events A3 and/or A5, at step 1409, the UE 406 sends the measurement report including only the measured values for the neighbor ENDC anchor band cell to the PCell.

At step 1410, the PCell enables the UE 406 to handover to the neighbor ENDC anchor band cell after receiving the measurement report from the UE 406. At step 1411, the neighbor ENDC anchor band cell adds supported at least one gNB 404*b* for the UE 406, so that the UE 406 can access the NR services. The various steps in method 1400 may be performed in the order presented, in a different order or simultaneously. Further, in some embodiments, one or more steps shown in FIG. 14 may be omitted.

Figure 15:
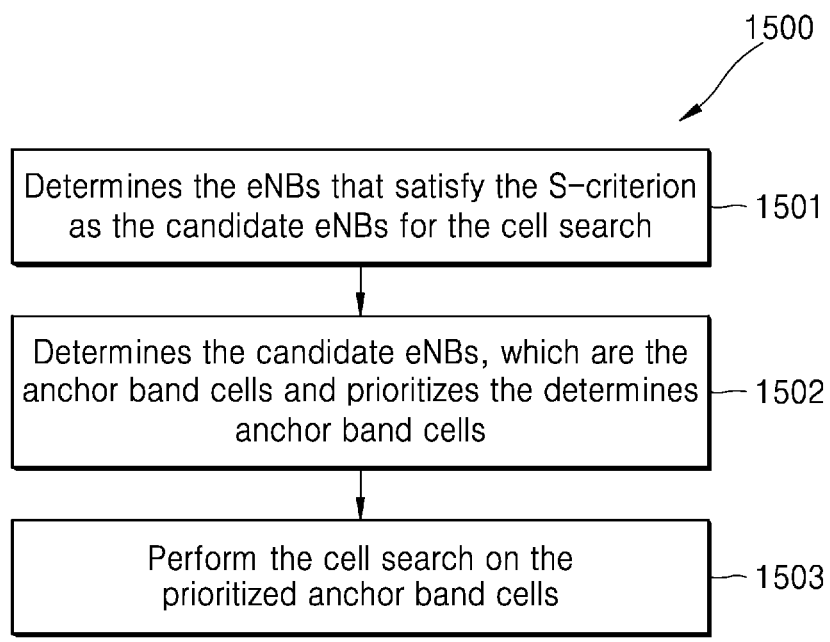
FIG. 15 is a flow diagram depicting a method for prioritizing ENDC anchor band cells for cell search in an NR NSA network supporting ENDC, when a UE is in an RRC idle state, according to embodiments.

FIG. 15 is a flow diagram 1500 depicting a method for prioritizing ENDC anchor band cells for cell search in the NR NSA network 400*a* supporting ENDC, when the UE 406 is in the RRC idle state, according to embodiments.

At step 1501, the UE 406 determines an eNBs 404a that satisfy an S-criterion as candidate eNBs 404a for cell search, when the UE 406 is powered on. At step 1502, the UE 406 determines the candidate eNBs, which are the ENDC anchor band cells and prioritizes the determined ENDC anchor band cells. At step 1503, the UE 406 performs the cell search on the prioritized ENDC anchor band cells. Thus, the UE 406 may camp onto the ENDC anchor band cells, which increases a probability of accessing NR services without failure. The various steps in method 1500 may be performed in the order presented, in a different order or simultaneously. Further, in some embodiments, one or more steps shown in FIG. 15 may be omitted.

Figure 16:
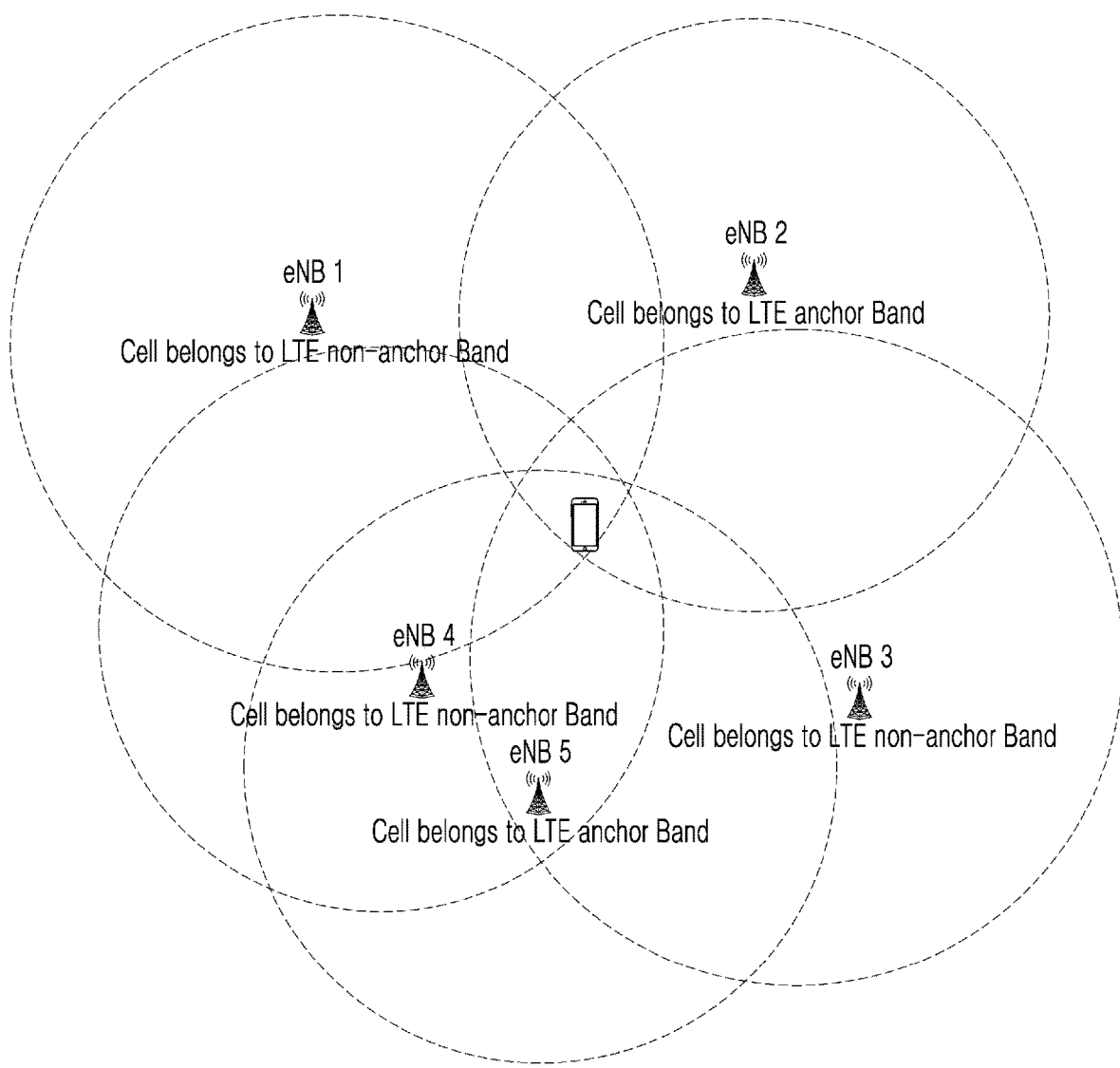
FIG. 16 is an example diagram depicting the prioritizing of ENDC anchor band cells for cell search in an NR NSA network supporting ENDC, according to embodiments.

FIG. 16 is an example diagram depicting prioritization of ENDC anchor band cells for cell search in the NR NSA network 400a supporting ENDC, according to embodiments.

Consider an example scenario as depicted in FIG. 16A, wherein the UE 406 determines five eNBs 404a (an eNB1, an eNB 2, an eNB 3, an eNB 4, and an eNB 5) that satisfy an S-criterion are candidate eNBs for cell search. The UE 406 then determines the candidate eNBs 404a which are ENDC anchor band cells. In an example herein, the eNB 2 and the eNB 5 may be ENDC anchor band cells. Thereafter, the UE 406 prioritizes the eNB 2 and the eNB 5 with respect to the eNB 1, the eNB 3 and the eNB 4. The UE 406 then performs the cell search on the prioritized eNB 2 and eNB 5 first, so that the UE 406 may camp onto the ENDC anchor band cells for accessing NR services.

FIGS. 17a and 17b are example tables depicting an order of prioritized ENDC anchor band cells for cell selection in the NR NSA network 400a supporting ENDC, according to embodiments.

Embodiments herein enable the UE 406 to prioritize ENDC anchor band cells for cell search. In an example, the UE 406 may perform an initial search when it is powered on and determines four eNBs that satisfy an S-criterion as candidate eNBs. An order of the determined candidate eNBs is depicted in the example table of FIG. 17A.

The UE 406 determines the candidate eNBs, which are ENDC anchor band cells. In an example herein, the UE 406 determines that the eNB 3 and the eNB 4 are ENDC anchor band cells. The UE 406 then reorders the candidate eNBs by assigning higher rankings to the candidate eNB3 and the eNB4, as they are ENDC anchor band cells. An order of the candidate eNBs with the priority (ranking) is depicted in the example table of FIG. 17B. The UE 406 then performs cell search on the prioritized ENDC anchor band cells.

FIG. 18 is a flow diagram 1800 depicting a method for prioritizing ENDC anchor band cells for cell reselection in the NR NSA network 400a supporting the ENDC, according to embodiments. At step 1801, the UE 406 receives information about neighbor cells (eNBs 404a) from a connected PCell. The UE 406 then determines the neighbor cells (eNBs) that satisfy an 5-criterion as candidate cells for cell reselection. At step 1802, the UE 406 determines the candidate neighbor cells, which are ENDC anchor band cells, and prioritizes the determined ENDC anchor band cells. At step 1803, the UE 406 performs the cell reselection on the prioritized ENDC anchor band cells. Thus, the UE 406 may camp onto the ENDC anchor band cells, which increases a probability of accessing NR services without failure. The various steps in method 1800 may be performed in the order presented, in a different order or simultaneously. Further, in some embodiments, one or more steps shown in FIG. 18 may be omitted.

FIGS. 19a and 19b are example tables depicting an order of prioritized ENDC anchor band cells for cell reselection in the NR NSA network 400a supporting the ENDC, according to embodiments.

Embodiments herein enable the UE 406 to prioritize ENDC anchor band cells for cell reselection. The UE 406 determines four eNBs that satisfy an S-criterion as candidate eNBs for the cell reselection in an example. An order of the determined candidate eNBs is depicted in the example table of FIG. 19A.

The UE 406 determines the candidate eNBs which are the anchor bands. In an example herein, the UE 406 determines that the eNB 3 and the eNB 4 are ENDC anchor band cells. The UE 406 then reorders the candidate eNBs by assigning higher rankings to the candidate eNB 3 and the eNB4 as they are ENDC anchor band cells. An order of the candidate eNBs with the priority (ranking) is depicted in the example table of FIG. 19B. The UE 406 then performs the cell reselection on the prioritized ENDC anchor band cells.

Figure 20:
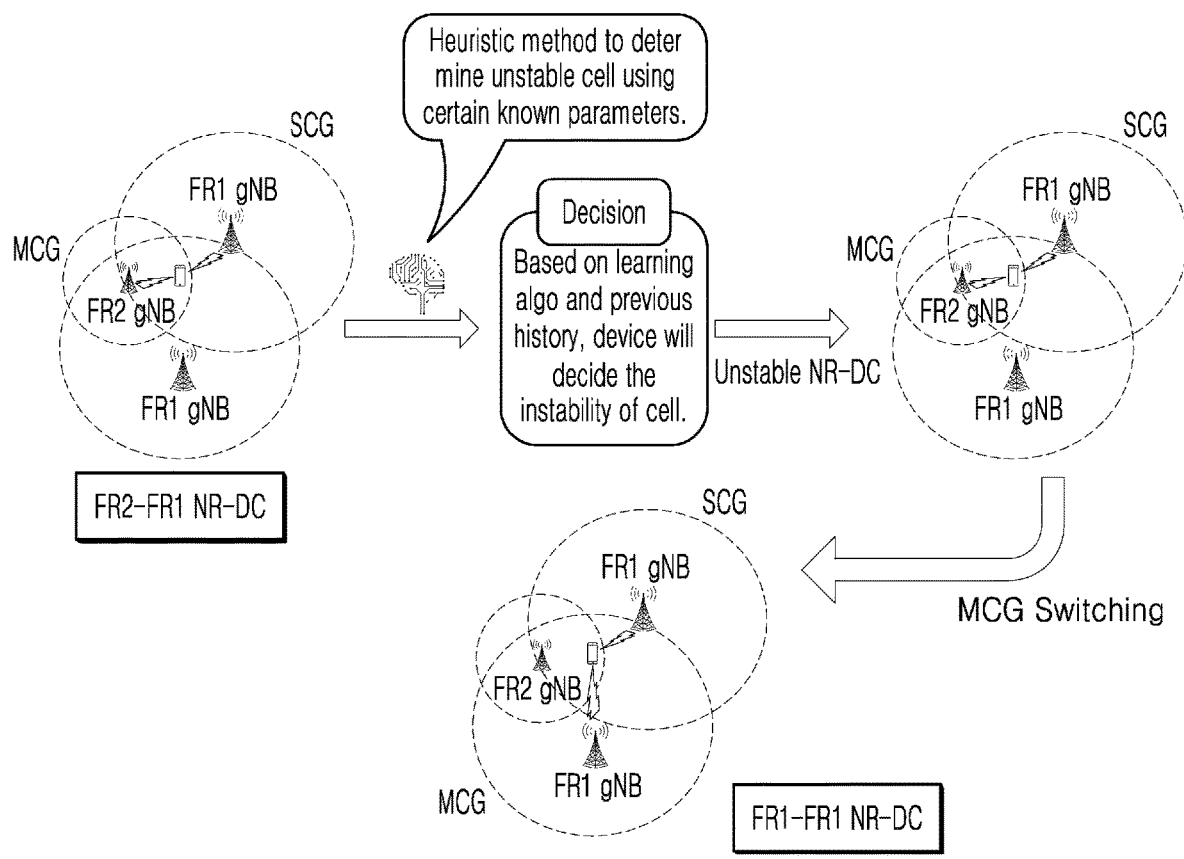
FIG. 20 is an example diagram depicting selection of a stable cell as a Master Cell Group (MCG) for establishing a stable NR DC in an NR standalone network supporting NR DC, according to embodiments.

FIG. 20 is an example diagram depicting selection of a stable cell as a PCell for establishing stable NR DC in the NR standalone network 400b supporting NR DC, according to embodiments.

Consider an example scenario as depicted in FIG. 20, wherein the UE 406 is connected to an MCG and an SCG in the CA mode. In the NR standalone network 400b, the MCG and the SCG are gNBs 404b of the NR RAT. In an example herein consider that the MCG and the SCG can be associated with frequency ranges that support NR DC. In an example, a PCell can be associated with a frequency range 2 (FR2) and an SCell can be associated with a frequency range 1 (FR1). In such a scenario, the UE 406 determines that a combination of the MCG and SCG is an unstable cell combination as the MCG and the SCG supports different frequency ranges. After determining that the combination of the MCG and SCG is an unstable cell combination, the UE 406 checks whether the SCG is a stable cell using at least one learning model. In an example herein, the SCG can be a stable cell as the SCG supports a gNB 404b in the FR1. Thereafter, the UE 406 prepares a measurement report for only the SCG, and sends the measurement report to the MCG for events A3 and/or A5.

After receiving the measurement report, the MCG performs MCG switching for the UE 406. Due to the MCG switching, the gNB 404b in the FR1 that is supported by the SCG becomes an MCG, and the SCG in the FR1 becomes an SCG for the UE 406. Thus, the UE 406 may access stable NR DC services by establishing an FR1-FR1 dual connectivity.

Figure 21:
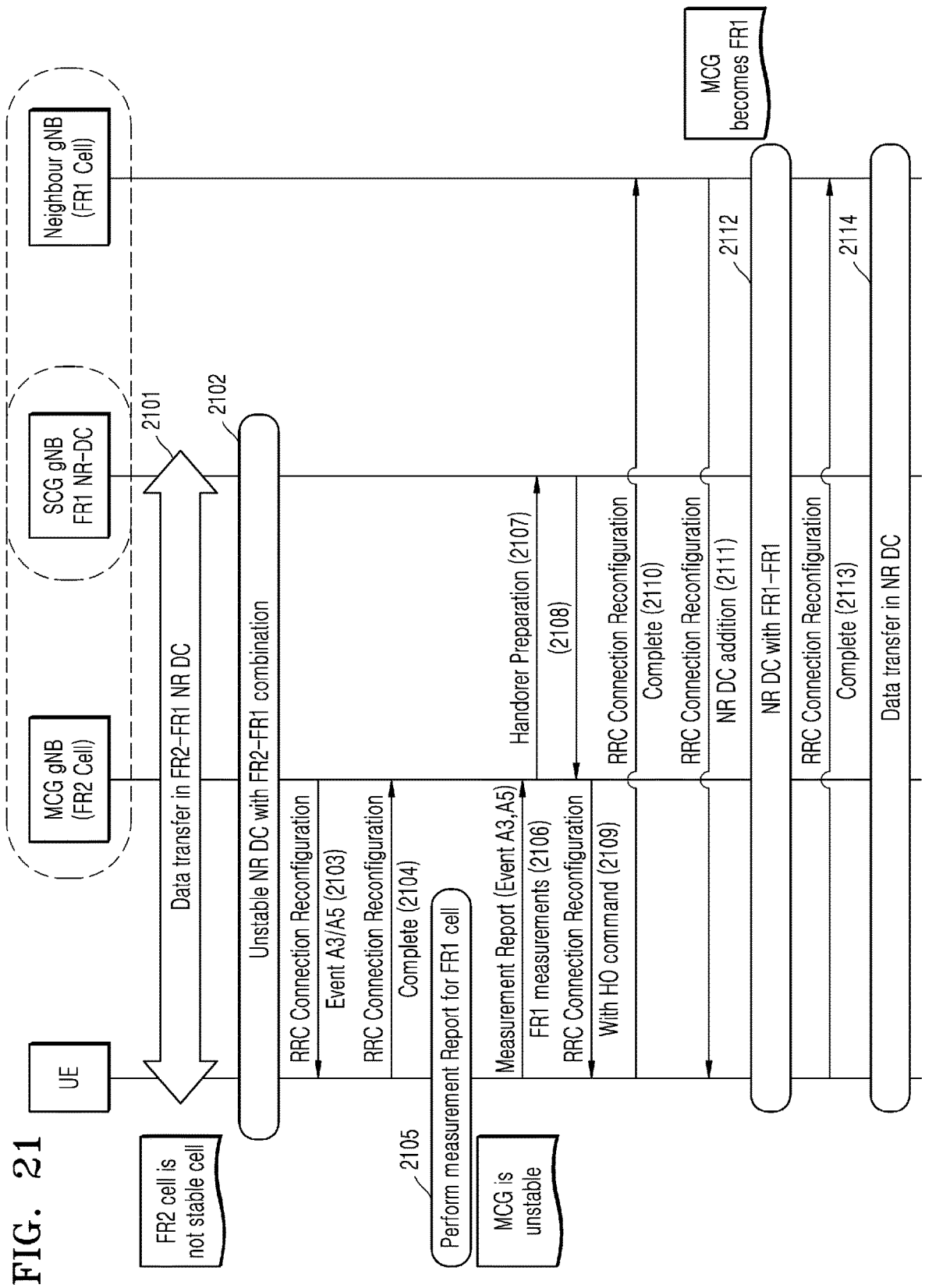
FIG. 21 is an example sequence diagram depicting selection of a stable cell as an MCG for a UE in an NR standalone network to access a stable NR DC services, according to embodiments.

FIG. 21 is an example sequence diagram depicting selection of a stable cell as an MCG for the UE 406 in the NR standalone network 400b to access stable NR DC services, according to embodiments.

In an example herein, consider that the UE 406 is connected to an MCG and an SCG that support NR DC in the CA mode. Further, the MCG supports a FR2 and the SCG supports a FR1. In such a scenario, at step 2101, the UE 406 performs data transfer in an FR2-FR1 combination band by establishing the NR DC. At step 2102, the UE 406 determines that the NR DC may become unstable in the FR2-FR1 combination band. After determining that the NR DC may become unstable, the UE 406 determines whether the SCG is a stable cell or an unstable cell using at least one learning model. In an example herein, consider that the SCG is a stable cell.

At step 2103, the UE 406 requests and receives from the MCG an RRC Connection Reconfiguration after determining that the SCG is a stable cell. The RRC Connection Reconfiguration includes a configuration of at least one neighbor gNB in the FR1 that is supported by the SCG. At step 2104, the UE 406 sends an RRC Connection Reconfiguration Complete Message to the MCG.

At step 2105, the UE 406 prepares a measurement report of the neighbor gNB in the FR1 supported by the SCG for events A3 and/or A5. At step 2106, the UE 406 sends the measurement report of the neighbor gNB supported by the SCG to a PCell in the events A3 and/or A5. After receiving the measurement report, at step 2107, the MCG performs MCG switching and sends a handover preparation command to the neighbor gNB in the FR1 that is supported by the SCG. At step 2108, the MCG receives an acknowledgement from the neighbor gNB supported by the SCG in response to the sent handover preparation command. At step 2109, the MCG sends an RRC Connection Reconfiguration with a handover command to the UE 406.

On receiving the RRC Connection Reconfiguration with the handover command, at step 2110, the UE 406 performs a reconfiguration, and sends an RRC Connection Reconfiguration Complete message to the neighbor gNB supported by the SCG. At step 2111, the neighbor gNB supported by the SCG sends an RRC Connection Reconfiguration including NR-DC addition to the UE 406. At step 2112, the UE 406 establishes NR-DC in the FR1-FR1 combination band after receiving the RRC Connection Reconfiguration from the neighbor gNB supported by the SCG. At step 2113, the UE 406 sends an RRC Connection Reconfiguration Complete message to the neighbor gNB supported by the SCG. At step 2114, the UE 206 accesses NR services or performs data transfer by establishing NR-DC in the FR1-FR1 combination band.

Figure 22:
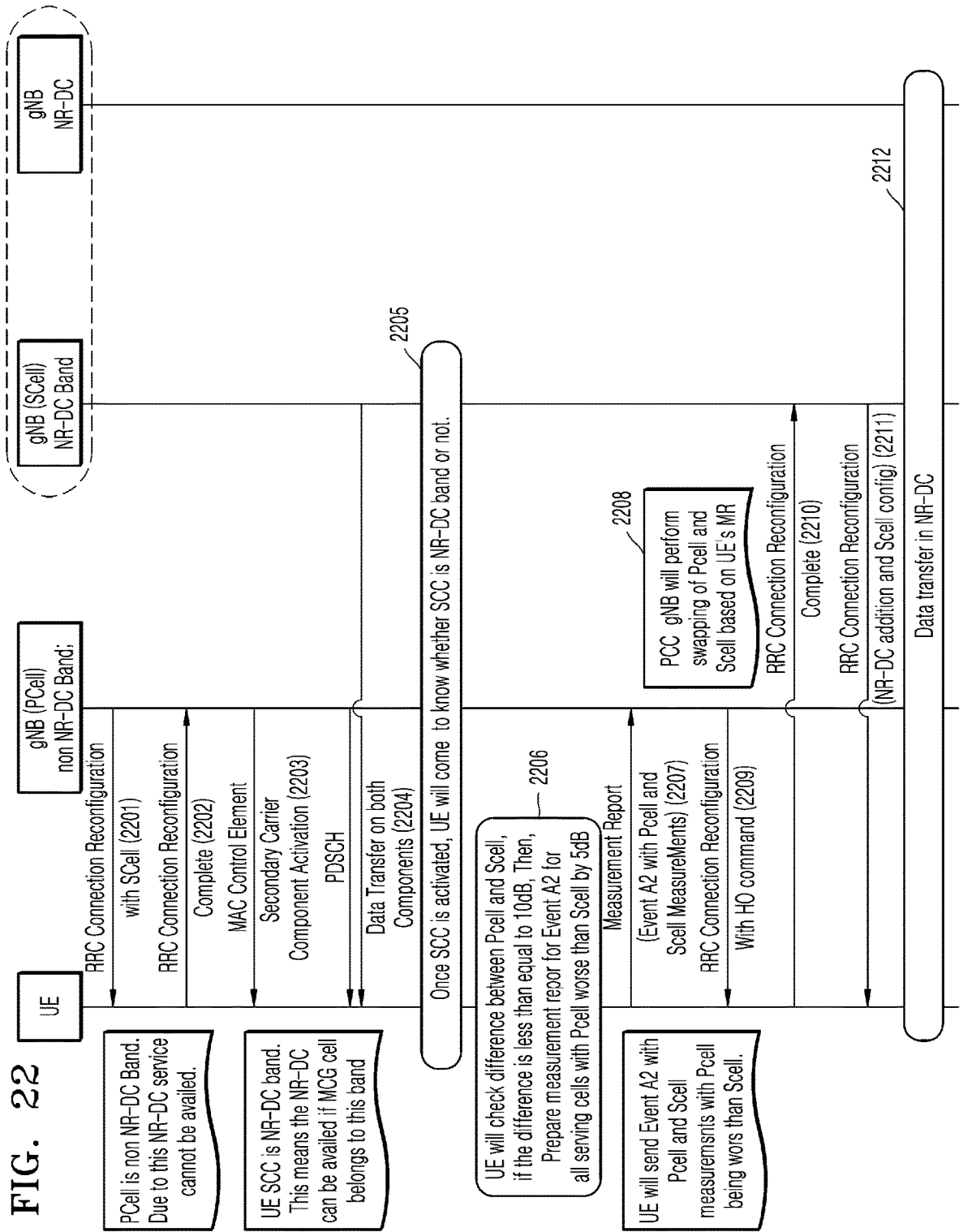
FIG. 22 is an example sequence diagram depicting swapping between a PCell and an SCell for a UE to access an NR services by establishing NR DC in an NR standalone network, when the PCell is a non-NR DC band cell and the SCell is an NR DC band cell, according to embodiments.

FIG. 22 is an example sequence diagram depicting swapping between a PCell and an SCell for the UE 406 to accessing NR services by establishing NR DC in the NR standalone network 400b, when the PCell is a non-NR DC band cell and the SCell is an NR DC band cell, according to embodiments.

In an example herein, consider that the UE 406 is initially connected to a PCell (gNB 404b) which is a non-NR DC band cell that does not support a gNB 404b of NR-DC. In such a scenario, the UE 406 can connect with an SCell (gNB 404b) after activating the CA mode. For connecting with the SCell, at step 2201, the UE 406 receives an RRC Connection Reconfiguration for the SCell from the PCell. At step 2202, the UE 406 reconfigures based on the received RRC Connection Reconfiguration, and sends an RRC Connection Reconfiguration Complete message to the PCell. At step 2203, the PCell sends a MAC element by activating the SCell to the UE 406 after receiving the RRC Connection Reconfiguration Complete message. The UE 406 uses the MAC element to connect with the SCell. At step 2204, the UE 406 starts receiving data from the SCell over a PDSCH after connecting with the SCell. Thus, the UE 406 connects with both the PCell and the SCell.

When the UE 406 wants to access NR services after connecting with the PCell and the SCell, at step 2205, the UE 406 determines whether the SCell is an NR DC band cell or a non-NR DC band cell. In an example herein, consider that the SCell is an NR DC band cell. When the SCell is an NR DC band cell, at step 2206, the UE 406 prepares a measurement report of the PCell and the SCell for an event A2. When preparing the measurement report, the UE 406 determines a difference between measured values of the PCell and measured values of the SCell, and compares the difference with a measured threshold. If the difference is greater than the measurement threshold, the UE 406 does not modify the measured values of the PCell and/or the measured values of the SCell. If the difference is less than or equal to the measurement threshold, the UE 406 modifies the measured values of the PCell and/or the measured values of the SCell.

At step 2207, the UE 406 sends the measurement report in the event A2 to the PCell. At step 2208, the PCell and the SCell are swapped for the UE 406. Thus, the SCell becomes a PCell and the PCell as an SCell for the UE 406. At step 2209, the PCell sends an RRC Connection Reconfiguration with a handover indication to the PCell. At step 2210, the UE 406 performs a reconfiguration, and sends a RRC Connection Reconfiguration Complete message to the SCell (a PCell after the swapping).

At step 2211, the SCell sends an RRC Connection Reconfiguration from the SCell (a PCell after the swapping), wherein the RRC Connection Reconfiguration received from the SCell includes a configuration of the SCell and NR-DC addition. The UE 406 can connect with the SCell, which is an NR DC band cell, as a PCell, and access NR services from the SCell that is connected as the PCell by establishing NR DC after receiving the configuration of the SCell and the NR-DC addition. Thus, the UE 406 may access the NR services by selecting the NR DC band cell as the PCell.

Figure 23:
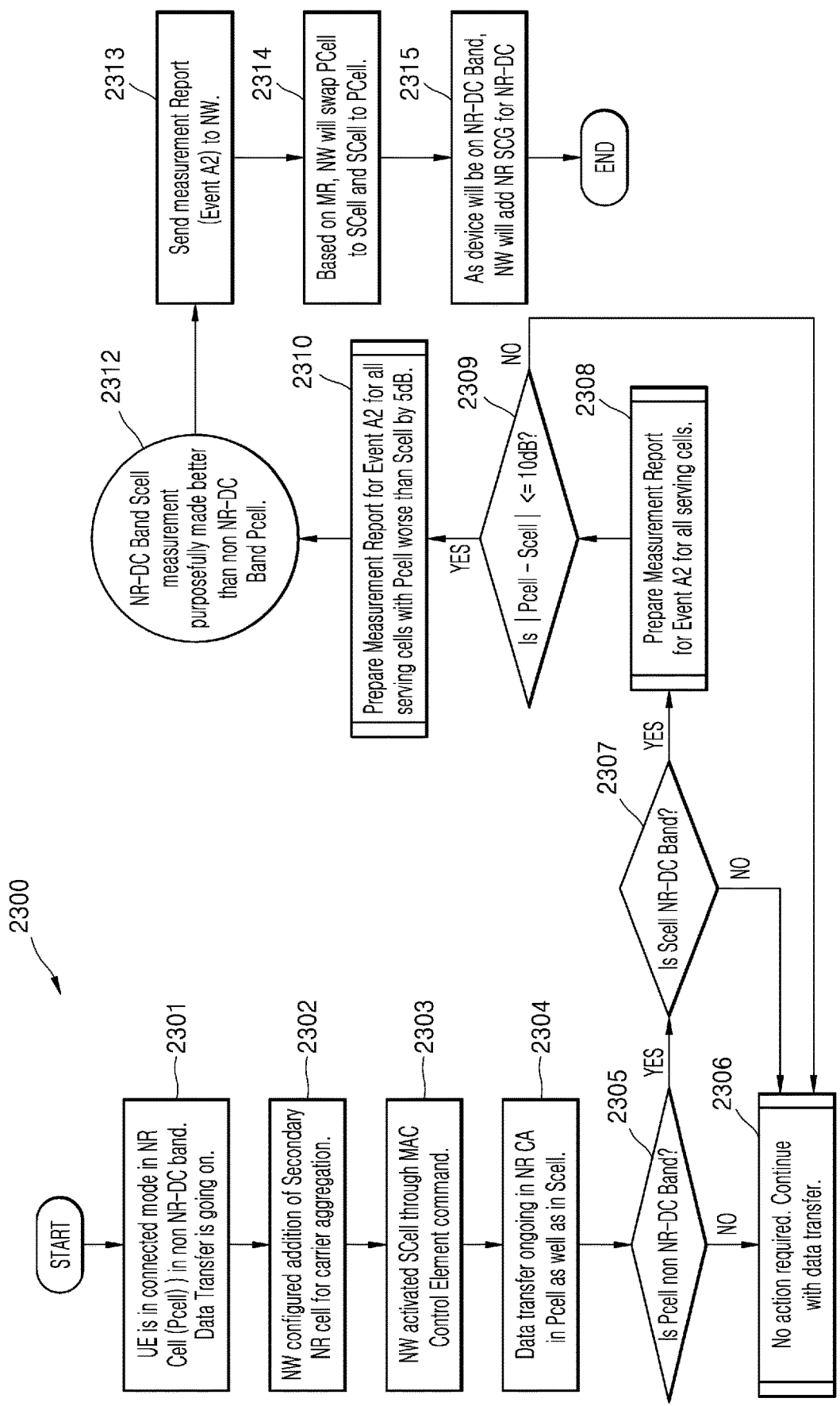
FIG. 23 is a flow diagram depicting a method for swapping a PCell and an SCell for a UE to access NR services by establishing NR DC in an NR standalone network, according to embodiments.

FIG. 23 is a flow diagram 2300 depicting a method for swapping a PCell and an SCell for the UE 406 to access NR services by establishing NR DC in the NR standalone network 400b, according to embodiments.

At step 2301, the UE 406 connects to a PCell, which is a non-NR DC band cell, and performs data transfer with the connected PCell. At step 2302, the UE 406 receives an RRC Connection Reconfiguration from the PCell and/or a connected network for adding an SCell. At step 2303, the PCell and/or the connected network activates an SCell for the UE 406 based on a MAC element. At step 2304, the UE 406 connects with the PCell and the SCell in the CA mode for data transfer.

When the UE 406 wants to access NR services, at step 2305, the UE 406 n determines whether the PCell is an NR DC band cell or a non-NR DC band cell. If the PCell is an NR DC band cell, at step 2306, the UE 406 continues to perform the data transfer with the PCell. If the PCell is a non-NR DC band cell, at step 2307, the UE 406 determines whether the SCell is an NR DC band cell or a non-NR DC band cell. If the SCell is a non-NR DC band cell, the UE 406 performs step 2306.

If the PCell is a non-NR DC band cell and the SCell is an NR DC band, at step 2308, the UE 406 prepares a measurement report for an event A2. The measurement report includes measured values of the PCell and measured values of the SCell. When preparing the measurement report, at step 2309, the UE 406 determines a difference between the measured values of the PCell and the measured values of the SCell, and compares the difference with a measured threshold. If the determined difference is greater than the measurement threshold, the UE 406 performs step 2306. If the difference is less than or equal to the measurement threshold, at step 2310, the UE 406 decides to modify the measured values of the PCell and/or the measured values of the SCell in the measurement report. At step 2311, the UE 406 decreases the measured values of the PCell and increases the measured values of the SCell.

At step 2312, the UE 406 sends the measurement report with the modified measured values to the PCell in the event A2. At step 2313, the PCell (a non-NR DC band cell) and the SCell (an NR DC band cell) are swapped for the UE 406. At step 2314, the UE 406 may connect with the SCell (an NR DC band cell) as a PCell, and the SCell may add a supported gNB (SCell 404*b*) for the UE 406, wherein the added gNB 404*b* supports NR DC. Thus, the UE 406 can establish the NR DC and access NR services by connecting with the NR DC band cell as the PCell. The various steps in method 2300 may be performed in the order presented, in a different order or simultaneously. Further, in some embodiments, one or more steps shown in FIG. 23 may be omitted.

Figure 24:
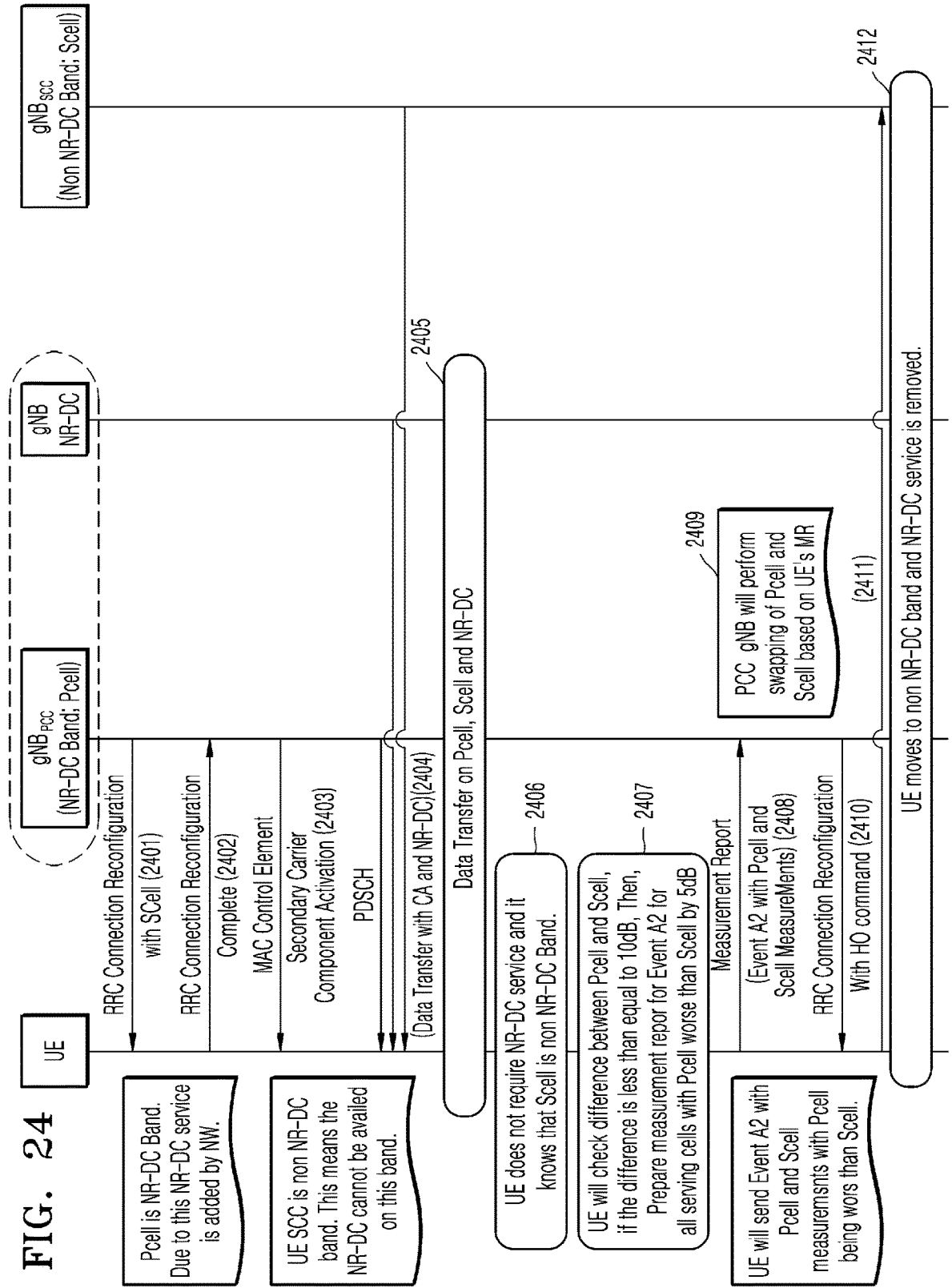
FIG. 24 is an example sequence diagram depicting swapping between a PCell and an SCell for accessing NR services without establishing NR DC in an NR standalone network, when the PCell is an NR band cell and the SCell is a non-NR band cell, according to embodiments.

FIG. 24 is an example sequence diagram depicting swapping of a PCell and an SCell for accessing NR services without establishing NR DC in the NR standalone network 400*b*, when the PCell is an NR band cell and the SCell is a non-NR band cell, according to embodiments.

In an example herein, consider that the UE 406 is initially connected to a PCell (gNB 404*b*) which is an NR DC band cell that supports at least one other gNB 404*b*, which is an NR DC band cell, for providing NR services to the UE 406. In such a scenario, the UE 406 can connect with at least one SCell (gNB 404*b*) after activating the CA mode. For connecting with the SCell, at step 2401, the UE 406 receives an RRC Connection Reconfiguration for the SCell from the PCell. At step 2402, the UE 406 reconfigures based on the received RRC Connection Reconfiguration, and sends an RRC Connection Reconfiguration Complete message to the PCell. At step 2403, in response to the RRC Connection Reconfiguration Complete message, the PCell sends a MAC element to the UE 406 by activating the SCell. The UE 406 uses the MAC element to connect with the SCell. At step 2404, the UE 406 starts receiving data from the SCell over a PDSCH after connecting with the SCell. Thus, the UE 406 connects with both the PCell and the SCell. At step 2405, the UE 406 determines whether the SCell is an NR DC band cell or a non-NR DC band cell after connecting with the SCell. In an example herein, consider that the SCell is a non-NR DC band cell.

At step 2406, the UE 406 wants to access NR services without establishing NR DC. When the SCell is a non-NR DC band cell, and the UE 406 wants to access the NR services without establishing the NR DC, at step 2407, the UE 406 prepares a measurement report of the PCell and the SCell for an event A2. When preparing the measurement report, the UE 406 determines a difference between measured values of the PCell and measured values of the SCell, and compares the difference with a measured threshold. If the difference is greater than the measurement threshold, the UE 406 does not modify the measured values of the PCell and/or the measured values of the SCell. If the difference is less than or equal to the measurement threshold, the UE 406 modifies the measured values of the PCell and/or the measured values of the SCell.

At step 2408, the UE 406 sends the measurement report in the event A2 to the PCell. At step 2409, the PCell and the SCell are swapped for the UE 406. Thus, the SCell (non-NR DC band cell) becomes a PCell and the PCell (NR DC band cell) becomes an SCell for the UE 406. At step 2410, the PCell sends an RRC Connection Reconfiguration with a handover indication to the SCell to the UE 406. At step 2411, the UE 406 performs reconfiguration and sends a RRC Connection Reconfiguration complete message to the SCell (a PCell after the swapping).

At step 2412, the UE 406 can connect with the SCell (non-NR DC band cell) as a PCell, and access the NR services from the SCell that is connected as the PCell without establishing the NR DC.

Figure 25:
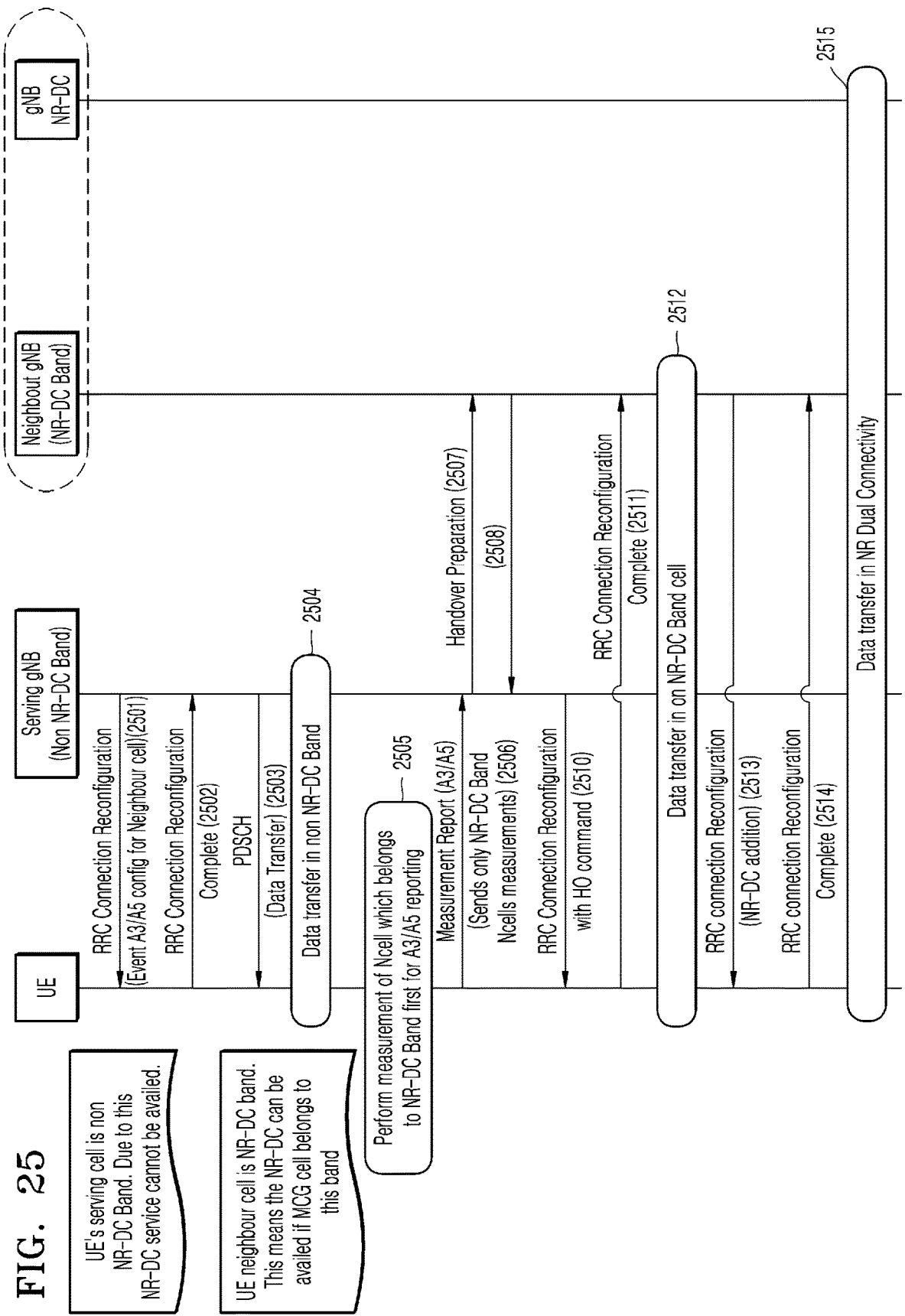
FIG. 25 is an example sequence diagram depicting selection of at least one neighbor NR band cell for a UE to access NR service by establishing NR DC, according to embodiments.

FIG. 25 is an example sequence diagram depicting selection of at least one neighbor NR band cell for the UE 406 to access NR service by establishing NR DC, according to embodiments.

In an example herein, consider that the UE 406 is connected to only a PCell (gNB 404*b*) as a serving cell when the CA mode is not activated. The PCell is a non-NR DC band cell that does not support NR DC. In such a scenario, at step 2501, the PCell sends an RRC Connection Reconfiguration to the UE 406, wherein the RRC Connection Reconfiguration includes a configuration of at least one neighbor cell. At step 2502, the UE performs a reconfiguration using the received RRC Connection Reconfiguration, and sends an RRC Connection Reconfiguration Complete message to the PCell. At step 2503, the UE 406 continues to receive data from the PCell over a PDSCH.

At step 2504, the UE 406 initiates a trigger for accessing NR services by establishing NR DC when the UE 406 is connected to the PCell. For accessing the NR services by establishing the NR DC, the UE 406 determines at least one neighbor NR DC band cell and at least one neighbor non-NR DC band cell using the received configurations of the neighbor cells from the PCell, as the PCell is a non-NR DC band cell. At step 2505, the UE 406 prepares a measurement report for the neighbor NR DC band cell first for reporting events A3 and/or A5. The measurement report includes measured values of only the neighbor NR DC band cell. At step 2506, the UE 406 sends the measurement report in the events A3 and/or A5 to the PCell. At step 2507, the PCell may further send a handover preparation message to the neighbor NR DC band cell after receiving the measurement report in the events A3 and/or A5 from the UE 406. At step 2508, the PCell may receive an acknowledgment from the neighbor NR DC band cell in response to the sent handover preparation message. At step 2509, the PCell sends an RRC Connection Reconfiguration with a handover command to the UE 406.

After receiving the RRC Connection Reconfiguration with the handover command, at step 2511, the UE 406 performs a reconfiguration and sends an RRC Connection Reconfiguration complete message to the neighbor NR DC band cell. At step 2512, the UE 406 starts performing data transfer with the neighbor NR DC band cell. At step 2513, the neighbor NR DC band cell sends an RRC Connection Reconfiguration to the UE 406, wherein the RRC Connection Reconfiguration includes information about NR-DC addition. After receiving the information about the NR-DC addition, at step 2514, the UE 406 sends an RRC Connection Reconfiguration complete message to the neighbor NR DC band cell. At step 2515, the UE 406 connects with the neighbor NR DC band cell as a PCell, and accesses NR services from the neighbor NR DC band cell that is connected as the PCell. Thus, the UE 406 may access the NR services by selecting the neighbor NR DC band cell as the PCell.

Figure 26:
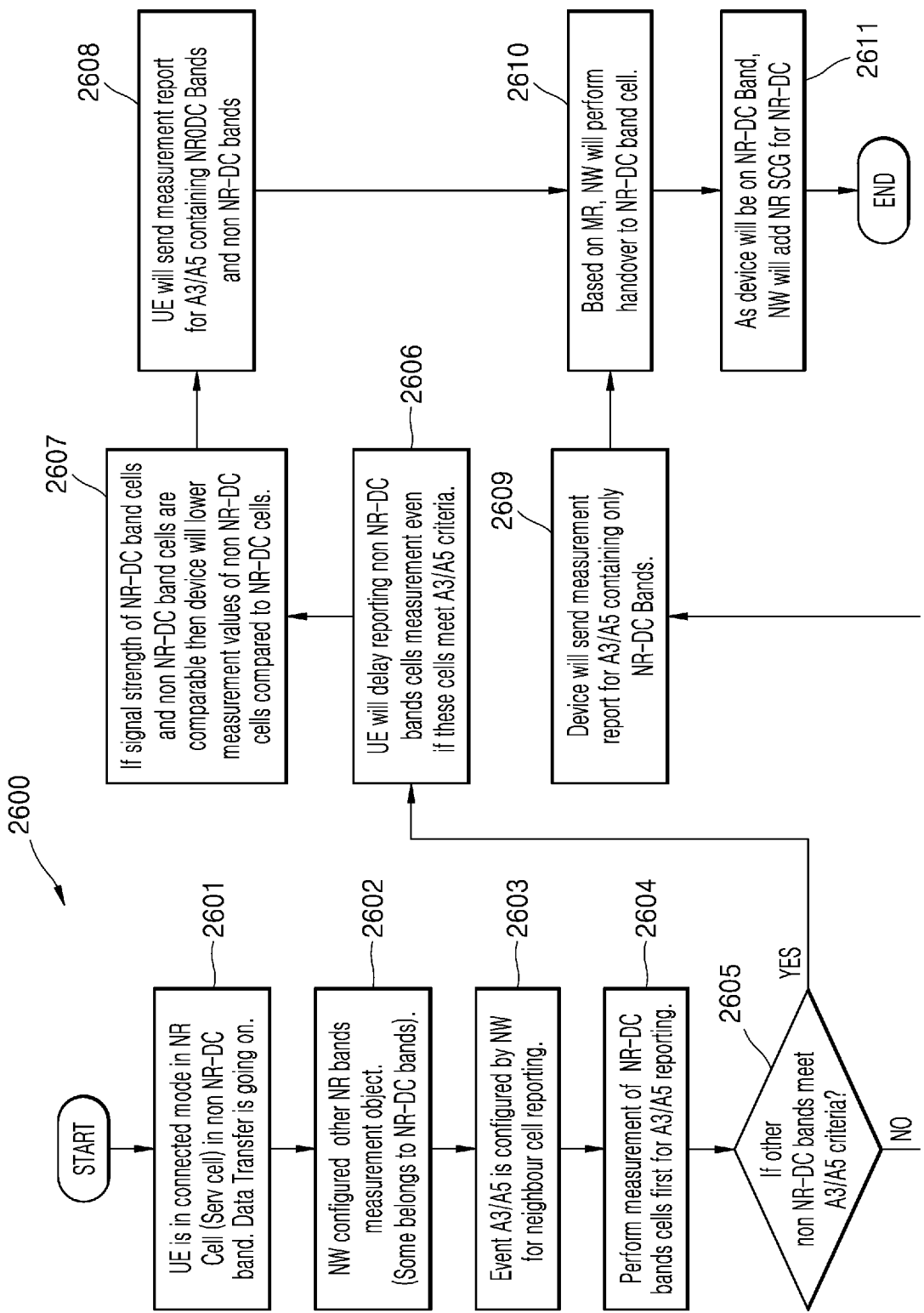
FIG. 26 is a flow diagram depicting a method for selecting at least one neighbor NR DC band cell as a PCell for a UE to access NR services by establishing NR DC, according to embodiments.

FIG. 26 is a flow diagram 2600 depicting a method for selecting at least one neighbor NR DC band cell as a PCell for the UE 406 to access NR services by establishing NR DC, according to embodiments.

At step 2601, the UE 406 connects with a PCell, which is an NR DC band cell. At step 2602, the UE 406 receives configurations of a plurality of neighbor cells. The neighbor cells includes least one neighbor NR DC band cell and at least one neighbor non-NR DC band cell.

At step 2603, the UE 406 decides to prepare a measurement report for the neighbor cells that includes the neighbor NR DC band cell and the neighbor non-NR DC band cell for the events A3 and/or A5. At step 2604, the UE 406 prepares a measurement report for the neighbor NR DC band cell first. At step 2605, the UE 406 determines whether the measurement report for the neighbor non-NR DC band cell satisfies the events A3 and/or A5.

If the measurement report for the neighbor non-NR DC band cell satisfies the events A3 and/or A5, at step 2606, the UE 406 delays/avoids sending the measurement report for the neighbor non-NR DC band cell to the PCell in the events A3 and/or A5. At step 2607, the UE 406 decreases the measured values of the neighbor non-NR DC band cell in the measurement report, if power of the neighbor non-NR DC band cell is comparable with power of the neighbor NR DC band cell. At step 2608, the UE 406 sends the measurement report including the decreased measured values of the neighbor non-NR DC band cell and the measured values of the neighbor NR DC band cell to the PCell.

If the measurement report of the neighbor non-NR DC band cell does not satisfy the event A3 and/or A5, at step 2609, the UE 406 sends the measurement report including only the measured values of the neighbor NR DC band cell to the PCell.

At step 2610, the PCell enables the UE 406 to handover to the neighbor NR DC band cell after receiving the measurement report from the UE 406. At step 2611, the neighbor NR DC band cell adds a supported at least one SCell for the UE 406 so that the UE 406 can access NR services by establishing DC. The various steps in method 2600 may be performed in the order presented, in a different order or simultaneously. Further, in some embodiments, one or more steps shown in FIG. 26 may be omitted.

Figure 27:
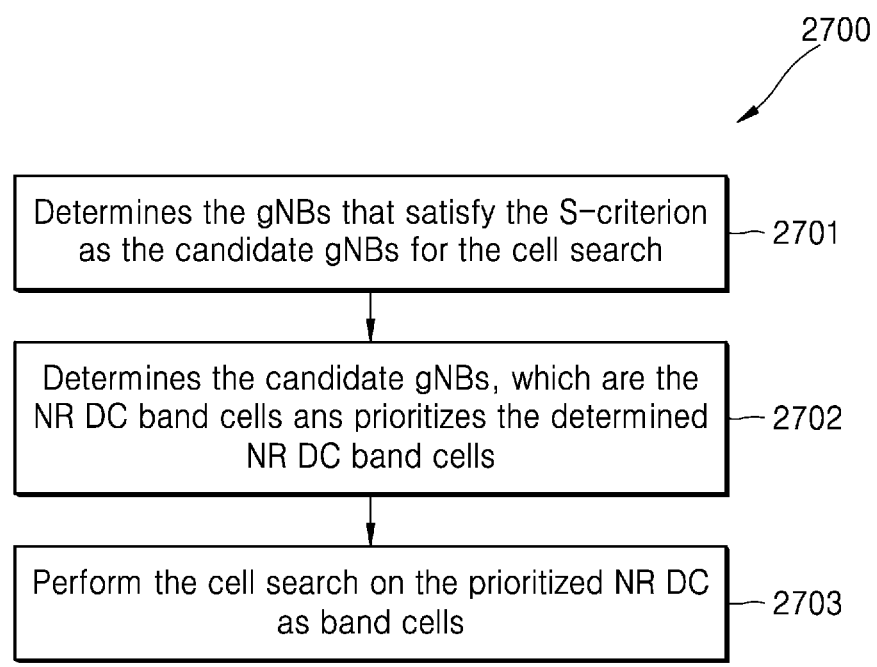
FIG. 27 is a flow diagram depicting a method for prioritizing NR DC band cells for cell search, when a UE is in an RRC idle state, according to embodiments.

FIG. 27 is a flow diagram 2700 depicting a method for prioritizing NR DC band cells for cell search when the UE 406 is in the RRC idle state, according to embodiments. At step 2701, the UE 406 determines gNBs 404*b* that satisfy an S-criterion as candidate gNBs 404*b* for cell search when the UE 406 is powered on. At step 2702, the UE 406 determines the candidate gNBs 404*b* which are NR DC band cells, and prioritizes the determined NR DC band cells. At step 2703, the UE 406 performs the cell search on the prioritized NR DC band cells. Thus, the UE 406 may camp onto the NR DC band cells, which increases a probability of accessing NR services without failure. The various steps in method 2700 may be performed in the order presented, in a different order or simultaneously. Further, in some embodiments, one or more steps shown in FIG. 27 may be omitted.

Figure 28:
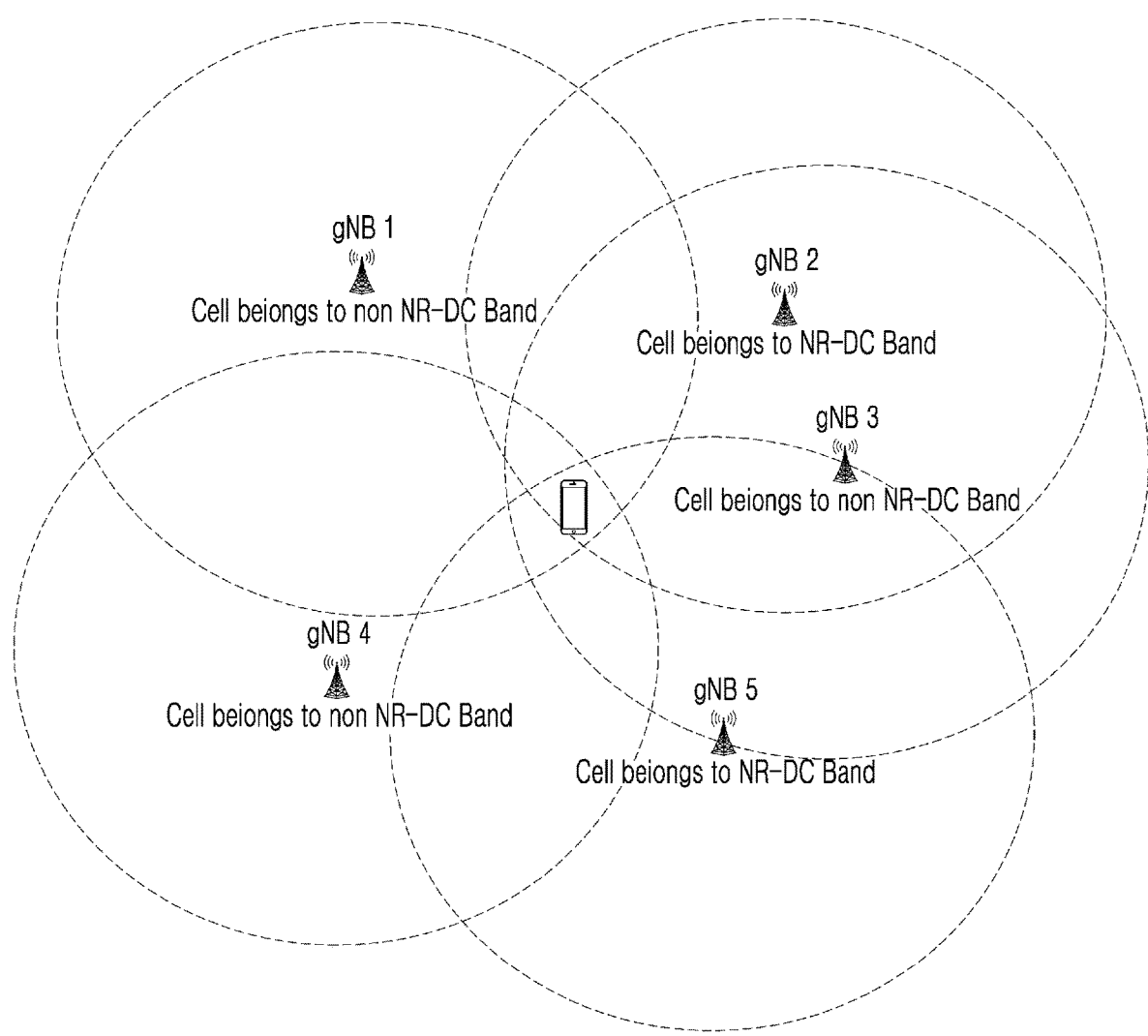
FIG. 28 is an example diagram depicting prioritizing of NR DC band cells for cell search, according to embodiments.

FIG. 28 is an example diagram depicting the prioritizing of NR DC band cells for cell search, according to embodiments.

Consider an example scenario as depicted in FIG. 28, wherein the UE 406 determines five gNBs 404*b* (gNB1, gNB2, gNB3, gNB4 and gNB5) that satisfy an S-criterion are candidate gNBs 404*b* for cell search. The UE 406 then determines the candidate gNBs 404*b* which are NR DC band cells. In an example herein, the gNB2, and the gNB5 may be NR DC band cells. Thereafter, the UE 406 prioritizes the gNB2 and the gNB5 with respect to the gNB 1, the gNB 3 and the gNB 4. The UE 406 then performs the cell search on the prioritized gNB 2 and gNB 5 first so that the UE 406 may camp onto the NR DC band cells for accessing NR services by establishing NR DC.

Figure 29:
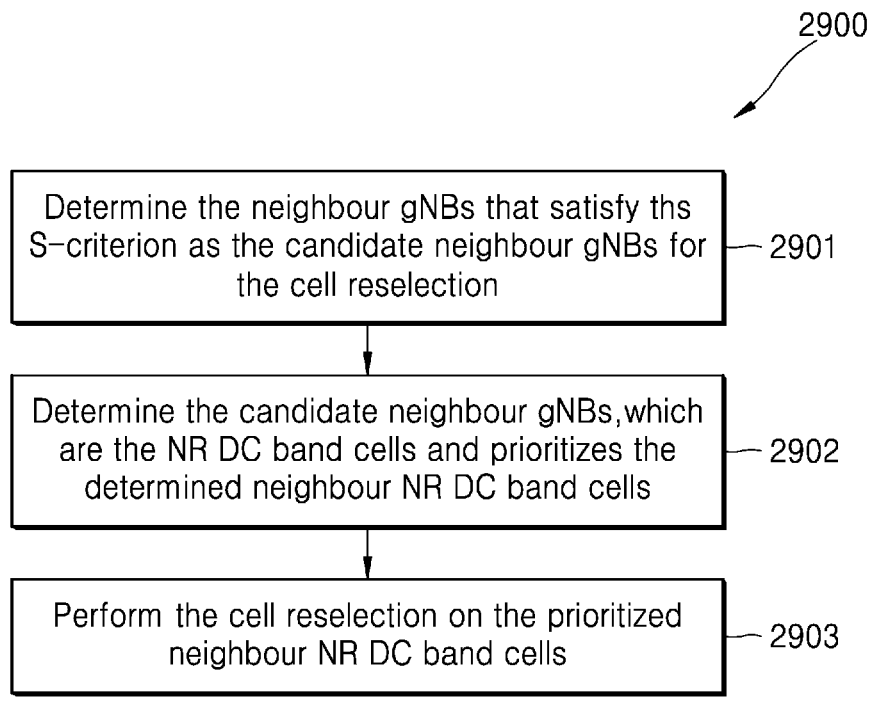
FIG. 29 is a flow diagram depicting a method for prioritizing NR DC band cells for cell reselection, according to embodiments.

FIG. 29 is a flow diagram 2900 depicting a method for prioritizing NR DC band cells for cell reselection, according to embodiments.

At step 2901, the UE 406 receives information about neighbor cells (gNBs 404*b*) from a connected PCell. The UE 406 then determines neighbor cells that satisfy the S-criterion as candidate cells for cell reselection. At step 2902, the UE 406 determines the candidate neighbor cells which are NR DC band cells, and prioritizes the determined NR DC band cells. At step 2903, the UE 406 performs the cell reselection on the prioritized NR DC band cells. Thus, the UE 406 may camp onto the NR DC band cells, which increases a probability of accessing NR services by establishing NR DC. The various steps in method 2900 may be performed in the order presented, in a different order or simultaneously. Further, in some embodiments, one or more steps shown in FIG. 29 may be omitted.

Figure 30:
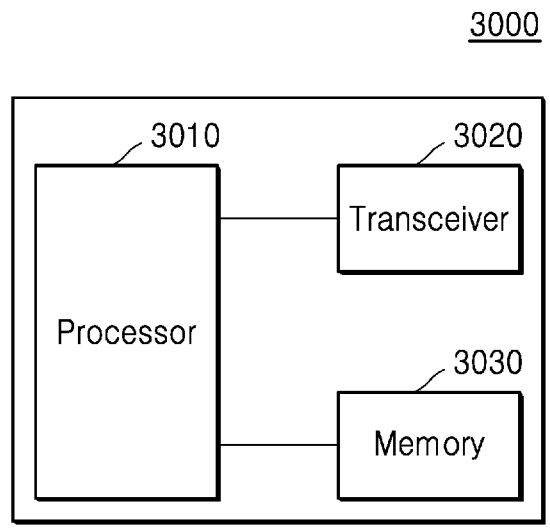
FIG. 30 illustrates a base station according to embodiments.

FIG. 30 illustrates a base station according to embodiments.

Referring to the FIG. 30, the base station 3000 may include a processor 3010, a transceiver 3020 and a memory 3030. The base station 3000 may be implemented by more or less components than those illustrated in FIG. 30. In addition, the processor 3010, the transceiver 3020 and the memory 3030 may be implemented as a single chip according to another embodiment.

The base station 3000 may correspond to a serving cell or a secondary cell described above. For example, the base station 3000 may correspond to the serving cell. For example, the processor 3010 may determines whether the UE 406 supports DC after receiving a measurement report from the UE 406. The serving cell performs a handover of the UE 406 to a neighbor anchor band cell if the UE 406 supports the DC.

The aforementioned components will now be described in detail.

The processor 3010 may include one or more processors or other processing devices that control the above-described functions, processes, and/or methods. Operation of the base station 3000 may be implemented by the processor 3010.

The transceiver 3020 may include an RF transmitter for up-converting and amplifying a transmitted signal, and an RF receiver for down-converting a frequency of a received signal. However, according to another embodiment, the transceiver 3020 may be implemented by more or less components than those describe above.

The transceiver 3020 may be connected to the processor 3010, and transmit and/or receive a signal. The signal may include control information and data. In addition, the transceiver 3020 may receive the signal through a wired and wireless network, and output the signal to the processor 3010. The transceiver 3020 may transmit a signal output from the processor 3010 through a wireless channel.

The memory 3030 may store control information or data included in a signal obtained by the base station 3000. The memory 3030 may be connected to the processor 3010 and store at least one instruction or a protocol or a parameter for the above-described functions, processes, and/or methods. The memory 3030 may include a read-only memory (ROM), a random access memory (RAM), a hard disk, a CD-ROM, a DVD and/or other storage devices.

The embodiments disclosed herein can be implemented through at least one software program running on at least one hardware device and performing network management functions to control the above-described components. The components shown in FIGS. 4 through 30 can be at least one of a hardware device, or a combination of hardware device and software module.

The foregoing description of the embodiments will so fully reveal the general nature of the embodiments herein that others can, by applying current knowledge, readily modify and/or adapt for various applications such specific embodiments without departing from the inventive concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the inventive concept as described herein.

What is claimed is:

1. A method for accessing a New Radio (NR) service by a user equipment (UE) in a communication network supporting multiple-Radio Access Technology (multi-RAT) dual connectivity (DC), the method comprising:
   determining whether a serving cell is an anchor band cell or a non-anchor band cell;
   determining whether at least one secondary cell for the DC is the anchor band cell or the non-anchor band cell in case that the serving cell is the non-anchor band cell;
   in case that the secondary cell is the anchor band cell, performing a measurement operation on at least one factor of the serving cell and the secondary cell to obtain measured values of the serving cell and the secondary cell, wherein the factor comprises at least one of a Reference Signals Received Power (RSRP) and a Reference Signals Received Quality (RSRQ);
   in case that a difference between a measured value of the serving cell and a measured value of the secondary cell is greater than a measurement threshold, preparing a measurement report comprising the measured value of the serving cell and the measured value of the secondary cell for an event A2;
   in case that the difference is less than or equal to the measurement threshold, preparing a modified measurement report by decreasing the measured value of the serving cell and increasing the measured value of the secondary cell for the event A2;
   transmitting, the measurement report or the modified measurement report for the event A2 to the serving cell to perform a handover of the UE to the secondary cell; and
   accessing the NR service by connecting with the secondary cell as a new serving cell.

2. The method of claim 1, wherein the determining whether the secondary cell is the anchor band cell or the non-anchor band cell comprises:
   receiving configurations of a plurality of neighbor cells from the serving cell; and
   determining at least one of at least one neighbor anchor band cell and at least one neighbor non-anchor band cell from the neighbor cells using the received configurations,
   wherein the secondary cell is one of the at least one neighbor anchor band cell.

3. The method of claim 1, further comprising:
   receiving a handover command to the secondary cell from the serving cell when the serving cell and the secondary cell are swapped based on the measurement report or the modified measurement report; and
   initiating the handover to the secondary cell as the new serving cell,
   wherein the secondary cell supports at least one NR cell.

4. The method of claim 1, further comprising:
   performing a measurement operation on at least one factor of at least one neighbor anchor band cell to obtain a measured value of the neighbor anchor band cell;
   preparing a measurement report comprising the measured value of only the neighbor anchor band cell, among the neighbor anchor band cell and at least one neighbor non-anchor band cell, for at least one of an event A3 and an event A5; and
   sending the measurement report comprising the measured value of only the neighbor anchor band cell to the serving cell to perform a handover of the UE to the neighbor anchor band cell,
   wherein the secondary cell is one of the at least one neighbor anchor band cell.

5. The method of claim 4, further comprising:
   receiving a handover command to handover to the neighbor anchor band cell from the serving cell when the serving cell determines the neighbor anchor band cell as the new serving cell for the UE based on the received measurement report comprising the measured value of only the neighbor anchor band cell; and
   initiating the handover to the neighbor anchor band cell,
   wherein the neighbor anchor band cell supports at least one NR cell.

6. The method of claim 4, further comprising:
   delaying preparing and sending the measurement report comprising the measured value of only the neighbor anchor band cell, in case that a measured value of at least one neighbor non-anchor band cell satisfies the at least one of the event A3 and the event A5; and
   decreasing the measured value of the neighbor non-anchor band cell compared to the measured value of the neighbor anchor band cell, and sending a measurement report including the measured value of the neighbor anchor band cell and the decreased measured value of the neighbor non-anchor band cell to the serving cell, in case that the measured value of the neighbor non-anchor band cell satisfies the at least one of the event A3 and the event A5.

7. The method of claim 1, further comprising:
   checking a plurality of cells for a cell selection when the UE is in a Radio Resource Control (RRC) idle state;
   identifying at least one anchor band cell from the cells; and
   prioritizing the anchor band cell.

8. A User Equipment (UE) in a communication network supporting multiple-Radio Access Technology (multi-RAT) dual connectivity (DC), the UE comprising:
   a memory;
   a transceiver; and
   a processor coupled to the memory and the transceiver, and configured to:
   determine whether a serving cell is an anchor band cell or a non-anchor band cell;
   determine whether at least one secondary cell for the DC is the anchor band cell or the non-anchor band cell, in case that the serving cell is the non-anchor band cell;
   in case that the secondary cell is the anchor band cell, perform a measurement operation on at least one factor of the serving cell and the secondary cell to obtain measured values of the serving cell and the secondary cell, wherein the factor comprises at least one of a Reference Signals Received Power (RSRP) and a Reference Signals Received Quality (RSRQ);
   in case that a difference between a measured value of the serving cell and a measured value of the secondary cell is greater than a measurement threshold, prepare a measurement report comprising the measured value of the serving cell and the measured value of the secondary cell for an event A2;

in case that the difference is less than or equal to the measurement threshold, prepare a modified measurement report by decreasing the measured value of the serving cell and increasing the measured value of the secondary cell for the event A2;

transmit, the measurement report or the modified measurement report for the event A2 to the serving cell to perform a handover of the UE to the secondary cell; and enable the UE to access a New Radio (NR) service by connecting with the secondary cell as a new serving cell.

9. The UE of claim 8, wherein the processor is further configured to:

receive configurations of a plurality of neighbor cells from the serving cell; and determine at least one of at least one neighbor anchor band cell and at least one neighbor non-anchor band cell from the neighbor cells using the received configurations, wherein the secondary cell is one of the at least one neighbor anchor band cell.

10. The UE of claim 8, wherein the processor is further configured to:

receive a handover command to the secondary cell from the serving cell when the serving cell and the secondary cell are swapped based on the measurement report or the modified measurement report; and initiate the handover to the secondary cell as the new serving cell, wherein the secondary cell supports at least one NR cell.

11. The UE of claim 8, wherein the processor is further configured to:

perform a measurement operation on at least one factor of at least one neighbor anchor band cell to obtain a measured value of the neighbor anchor band cell;

prepare a measurement report comprising the measured value of only the neighbor anchor band cell, among the neighbor anchor band cell and at least one neighbor non-anchor band cell, for at least one of an event A3 and an event A5; and send the measurement report comprising the measured value of only the neighbor anchor band cell to the serving cell to perform a handover of the UE to the at least one neighbor anchor band cell, wherein the secondary cell is one of the at least one neighbor anchor band cell.

12. The UE of claim 11, wherein the processor is further configured to:

receive a handover command to handover to the neighbor anchor band cell from the serving cell when the serving cell determines the neighbor anchor band cell as the new serving cell for the UE based on the received measurement report comprising the measured value of only the neighbor anchor band cell; and initiate the handover to the neighbor anchor band cell, wherein the neighbor anchor band cell supports at least one NR cell.

13. The UE of claim 8, wherein the processor is further configured to:

delay preparing and sending the measurement report comprising the measured value of only the neighbor anchor band cell, in case that a measured value of at least one neighbor non-anchor band cell satisfies at least one of an event A3 and an event A5; and decrease the measured value of the neighbor non-anchor band cell compared to the measured value of the neighbor anchor band cell, and sending a measurement report including the measured value of the neighbor anchor band cell and the decreased measured value of the neighbor non-anchor band cell to the serving cell, in case that the measured value of the neighbor non-anchor band cell satisfies the at least one of the event A3 and the event A5.

14. The UE of claim 8, wherein the processor is further configured to:

check a plurality of cells for a cell selection, when the UE is in a Radio Resource Control (RRC) idle state;

identify at least one anchor band cell from the cells; and prioritize the anchor band cell.

* * * * *